(12) United States Patent
Olmstead et al.

(10) Patent No.: US 8,939,369 B2
(45) Date of Patent: Jan. 27, 2015

(54) EXCEPTION DETECTION AND HANDLING IN AUTOMATED OPTICAL CODE READING SYSTEMS

(75) Inventors: Bryan L. Olmstead, Eugene, OR (US); Michael P. Svetal, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 274 days.

(21) Appl. No.: 13/357,459

(22) Filed: Jan. 24, 2012

(65) Prior Publication Data

US 2013/0020391 A1   Jan. 24, 2013

Related U.S. Application Data

(60) Provisional application No. 61/435,686, filed on Jan. 24, 2011, provisional application No. 61/505,935, filed on Jul. 8, 2011.

(51) Int. Cl.
*G06K 7/10* (2006.01)

(52) U.S. Cl.
USPC ............... 235/438; 235/444; 235/462.08

(58) Field of Classification Search
USPC ............ 235/462.08, 462.11, 462.42, 462.43, 235/444, 438
See application file for complete search history.

(56) References Cited

U.S. PATENT DOCUMENTS

| | | |
|---|---|---|
| 4,676,343 A | 6/1987 | Humble et al. |
| 4,741,621 A | 5/1988 | Taft et al. |
| 4,773,029 A | 9/1988 | Claesson et al. |
| 4,961,155 A | 10/1990 | Ozeki et al. |
| 4,965,829 A | 10/1990 | Lemelson |
| 5,013,927 A | 5/1991 | Tsikos et al. |
| 5,019,694 A | 5/1991 | Collins, Jr. |
| 5,105,392 A | 4/1992 | Stringer et al. |
| 5,178,234 A | 1/1993 | Sakurai et al. |
| 5,220,536 A | 6/1993 | Stringer et al. |
| 5,266,810 A | 11/1993 | Murphy |
| 5,340,970 A | 8/1994 | Wolfe, Jr. et al. |
| 5,362,970 A | 11/1994 | Pryor et al. |
| 5,384,450 A | 1/1995 | Goetz, Jr. |
| 5,408,325 A | 4/1995 | Cruickshank |
| 5,426,282 A | 6/1995 | Humble |

(Continued)

FOREIGN PATENT DOCUMENTS

| | | |
|---|---|---|
| JP | 2001-167225 A | 6/2001 |
| KR | 10-2005-0066789 A | 6/2005 |
| KR | 10-2007-0057780 A | 6/2007 |

OTHER PUBLICATIONS

Written Opinion of the International Searching Authority, PCT/US2012/022367, Sep. 19, 2012.

(Continued)

*Primary Examiner* — Karl D Frech
(74) *Attorney, Agent, or Firm* — Stoel Rives LLP

(57) ABSTRACT

An automated system for reading optical codes includes a conveyor system to automatically transport objects and an object measurement system positioned along the conveyor system to measure the transported objects. In one configuration, the object measurement system generates model data representing three-dimensional models of the objects; multiple image capture devices positioned along the conveyor system capture images as the objects are transported to enable an optical code reading system to read optical codes that are captured in the images. An exception identification system associates optical codes with the three-dimensional models to determine whether an exception has occurred.

33 Claims, 36 Drawing Sheets

(56) References Cited

U.S. PATENT DOCUMENTS

| | | | |
|---|---|---|---|
| 5,436,439 A | 7/1995 | Nishimura et al. | |
| 5,436,672 A | 7/1995 | Medioni et al. | |
| 5,479,597 A | 12/1995 | Fellous | |
| 5,497,314 A | 3/1996 | Novak | |
| 5,510,625 A | 4/1996 | Pryor et al. | |
| 5,525,786 A | 6/1996 | Dumont | |
| 5,525,788 A | 6/1996 | Bridgelall et al. | |
| 5,555,090 A | 9/1996 | Schmutz | |
| 5,617,209 A | 4/1997 | Svetkoff et al. | |
| 5,636,028 A | 6/1997 | Stringer et al. | |
| 5,659,396 A | 8/1997 | Mondie | |
| 5,670,787 A | 9/1997 | Pryor et al. | |
| 5,684,292 A | 11/1997 | Pryor et al. | |
| 5,734,172 A | 3/1998 | Pryor et al. | |
| 5,737,083 A | 4/1998 | Owechko et al. | |
| 5,770,848 A | 6/1998 | Oizumi et al. | |
| 5,811,825 A | 9/1998 | Pryor et al. | |
| 5,811,827 A | 9/1998 | Pryor et al. | |
| 5,815,275 A | 9/1998 | Svetkoff et al. | |
| 5,850,370 A | 12/1998 | Stringer et al. | |
| 5,854,491 A | 12/1998 | Pryor et al. | |
| 5,870,220 A | 2/1999 | Migdal et al. | |
| 5,880,451 A | 3/1999 | Smith et al. | |
| 5,969,823 A | 10/1999 | Wurz et al. | |
| 6,002,125 A | 12/1999 | Schubert | |
| 6,049,386 A | 4/2000 | Stringer et al. | |
| 6,124,586 A | 9/2000 | Coi | |
| 6,298,009 B1 | 10/2001 | Stringer | |
| 6,369,401 B1 | 4/2002 | Lee | |
| 6,394,351 B1 | 5/2002 | Keys et al. | |
| 6,446,870 B1 | 9/2002 | Rando | |
| 6,457,642 B1 | 10/2002 | Good et al. | |
| 6,474,556 B2 | 11/2002 | Dickson et al. | |
| 6,484,066 B1 | 11/2002 | Riess et al. | |
| 6,494,375 B1 | 12/2002 | Ishibashi et al. | |
| 6,522,777 B1 | 2/2003 | Paulsen et al. | |
| 6,540,143 B1 | 4/2003 | Matsumori | |
| 6,542,249 B1 | 4/2003 | Kofman et al. | |
| 6,554,190 B1 | 4/2003 | Tsuno | |
| 6,603,563 B1 | 8/2003 | Gagliano | |
| 6,611,617 B1 | 8/2003 | Crampton | |
| 6,683,568 B1 | 1/2004 | James et al. | |
| 6,775,011 B2 | 8/2004 | Gagliano | |
| 6,795,200 B1 | 9/2004 | Barman et al. | |
| 6,801,850 B1 | 10/2004 | Wolfson | |
| 6,837,428 B2 | 1/2005 | Lee et al. | |
| 6,858,826 B2 | 2/2005 | Mueller et al. | |
| 6,885,393 B2 | 4/2005 | Herre | |
| 6,895,329 B1 | 5/2005 | Wolfson | |
| 6,915,954 B2 | 7/2005 | Knowles et al. | |
| 6,959,868 B2 | 11/2005 | Tsikos et al. | |
| 6,965,690 B2 | 11/2005 | Matsumoto | |
| 6,968,271 B1 | 11/2005 | Wolfson | |
| 6,988,661 B2 | 1/2006 | Tsikos et al. | |
| 7,000,839 B2 | 2/2006 | Good et al. | |
| 7,084,989 B2 | 8/2006 | Johannesson et al. | |
| 7,104,453 B1 | 9/2006 | Zhu et al. | |
| 7,104,454 B2 | 9/2006 | Good et al. | |
| 7,108,187 B2 | 9/2006 | Turvy, Jr. et al. | |
| 7,274,438 B2 | 9/2007 | Doemens et al. | |
| 7,275,693 B2 | 10/2007 | Good et al. | |
| 7,307,740 B2 | 12/2007 | Lamy et al. | |
| 7,327,383 B2 | 2/2008 | Valleriano et al. | |
| 7,334,729 B2 | 2/2008 | Brewington | |
| 7,341,184 B2 | 3/2008 | Morris et al. | |
| 7,342,669 B2 | 3/2008 | Kawasaki et al. | |
| 7,357,327 B2 | 4/2008 | Odenthal | |
| 7,387,251 B2 | 6/2008 | Baker et al. | |
| 7,400,414 B2 | 7/2008 | Tobiason et al. | |
| 7,430,003 B2 | 9/2008 | Nichols et al. | |
| 7,448,542 B1 | 11/2008 | Bobbitt et al. | |
| 7,461,032 B2 | 12/2008 | Heaton et al. | |
| 7,492,973 B2 | 2/2009 | Cato | |
| 7,503,490 B1 | 3/2009 | Bobbitt et al. | |
| 7,581,681 B2 | 9/2009 | Tsikos et al. | |
| 7,583,275 B2 | 9/2009 | Neumann et al. | |
| 7,584,893 B2 | 9/2009 | Tsikos et al. | |
| 7,600,689 B2 | 10/2009 | Tsikos et al. | |
| 7,643,669 B2 | 1/2010 | Strassenburg-Kleciak et al. | |
| 7,681,796 B2 | 3/2010 | Cato et al. | |
| 7,724,379 B2 | 5/2010 | Kawasaki et al. | |
| 7,767,954 B2 | 8/2010 | Pirkl | |
| 7,784,698 B2 | 8/2010 | Knowles et al. | |
| 7,791,738 B2 | 9/2010 | Ochi et al. | |
| 7,848,905 B2 | 12/2010 | Troxler et al. | |
| 7,876,455 B2 | 1/2011 | Kawasaki et al. | |
| 7,905,410 B2 | 3/2011 | Good et al. | |
| 7,946,491 B2 | 5/2011 | Burian et al. | |
| 7,950,583 B2 | 5/2011 | Kotlarsky et al. | |
| RE42,430 E | 6/2011 | Carlsruh et al. | |
| 7,954,719 B2 | 6/2011 | Zhu et al. | |
| 2007/0181685 A1* | 8/2007 | Zhu et al. | 235/454 |
| 2008/0121689 A1* | 5/2008 | Good et al. | 235/375 |
| 2010/0163626 A1 | 7/2010 | Olmstead | |
| 2011/0060426 A1* | 3/2011 | Morton | 700/73 |

OTHER PUBLICATIONS

U.S. Appl. No. 13/357,356, filed Jan. 24, 2012 entitled Tunnel or Portal Scanner and Method of Scanning for Automated Checkout.

* cited by examiner

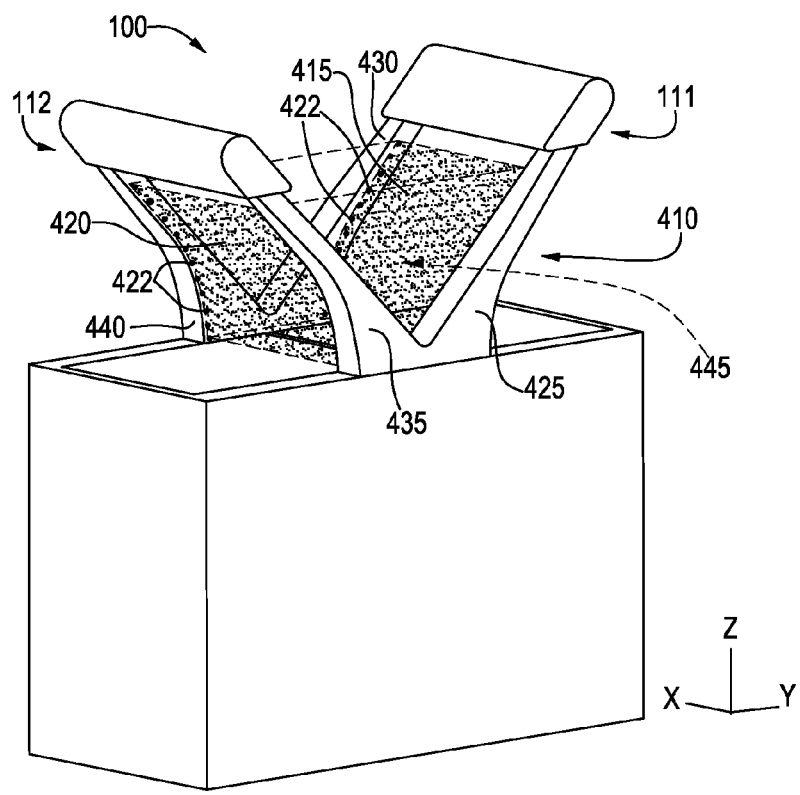
FIG. 4
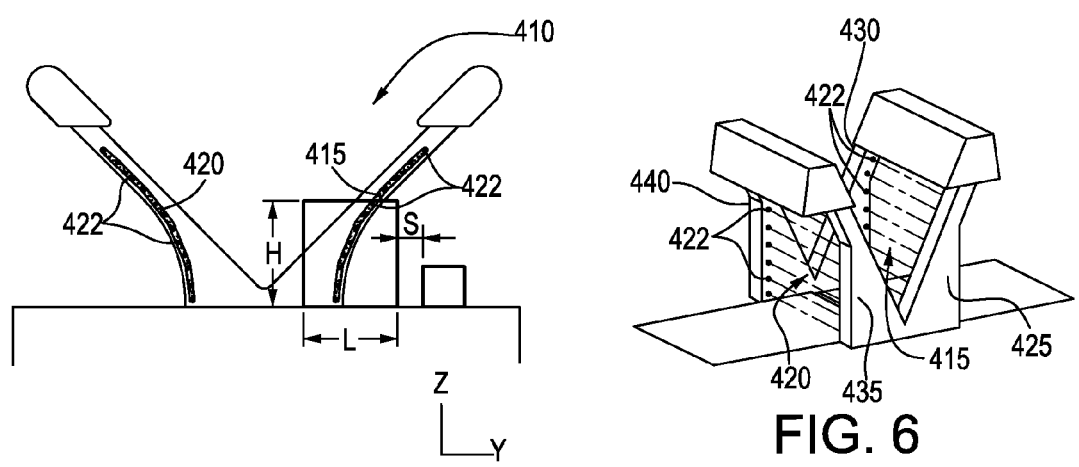
FIG. 5
FIG. 6

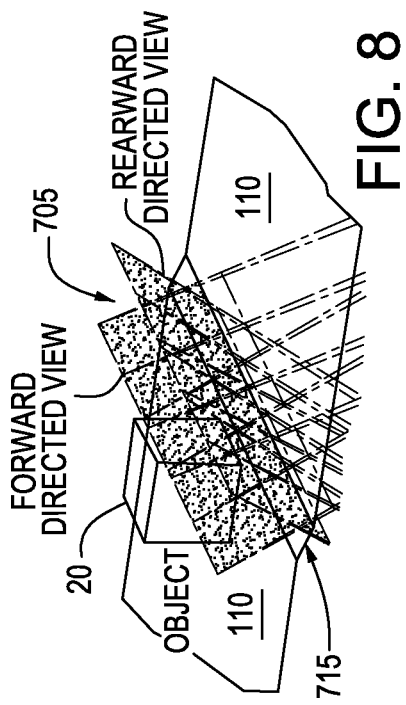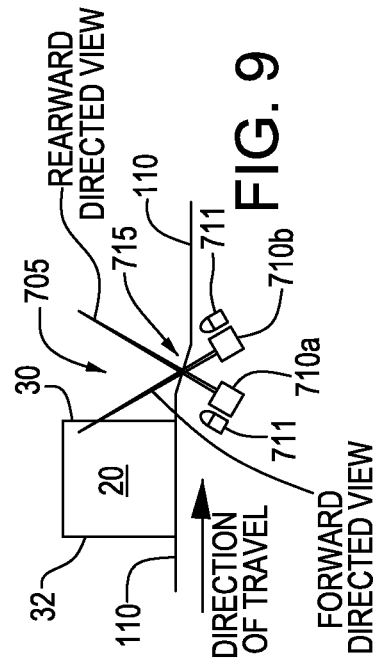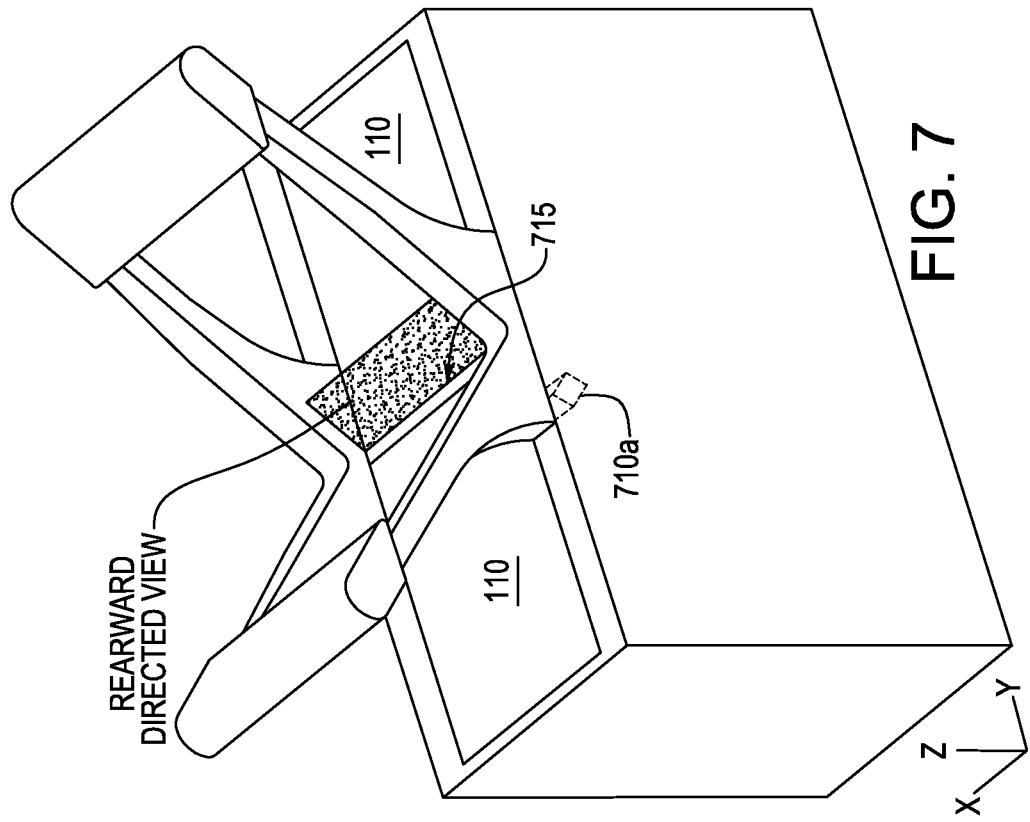

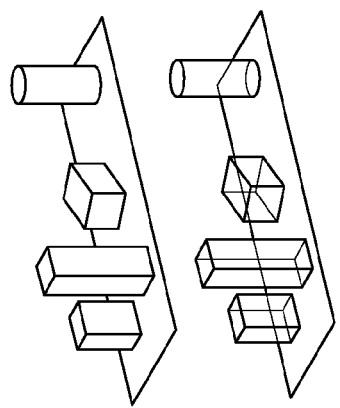
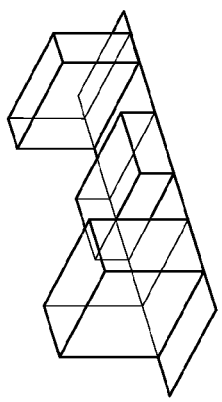
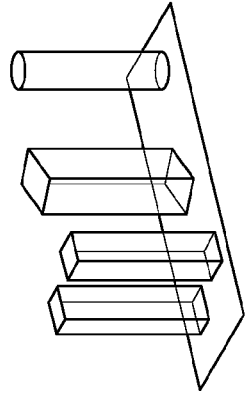
FIG. 12a OBJECTS ON BELT
FIG. 12b 3-D MODEL
FIG. 12c VOS ONLY
FIG. 12d LOS ONLY
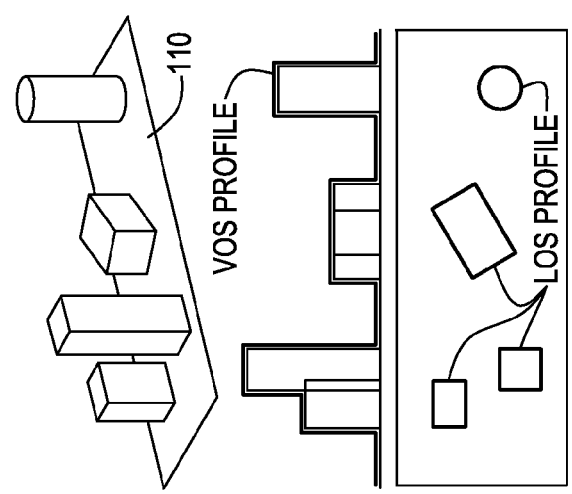
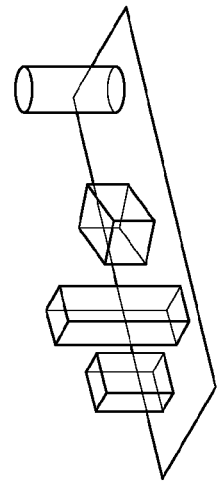
FIG. 11a OBJECTS ON BELT
FIG. 11b VERTICAL OBJECT SENSOR
FIG. 11c LATERAL OBJECT SENSOR
FIG. 11d 3-D MODEL

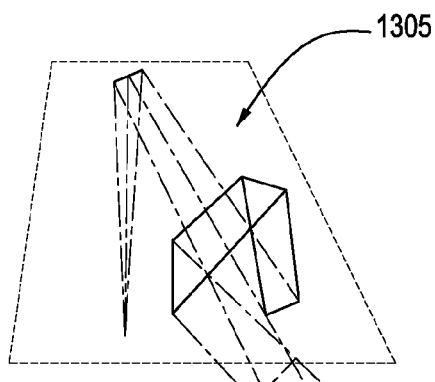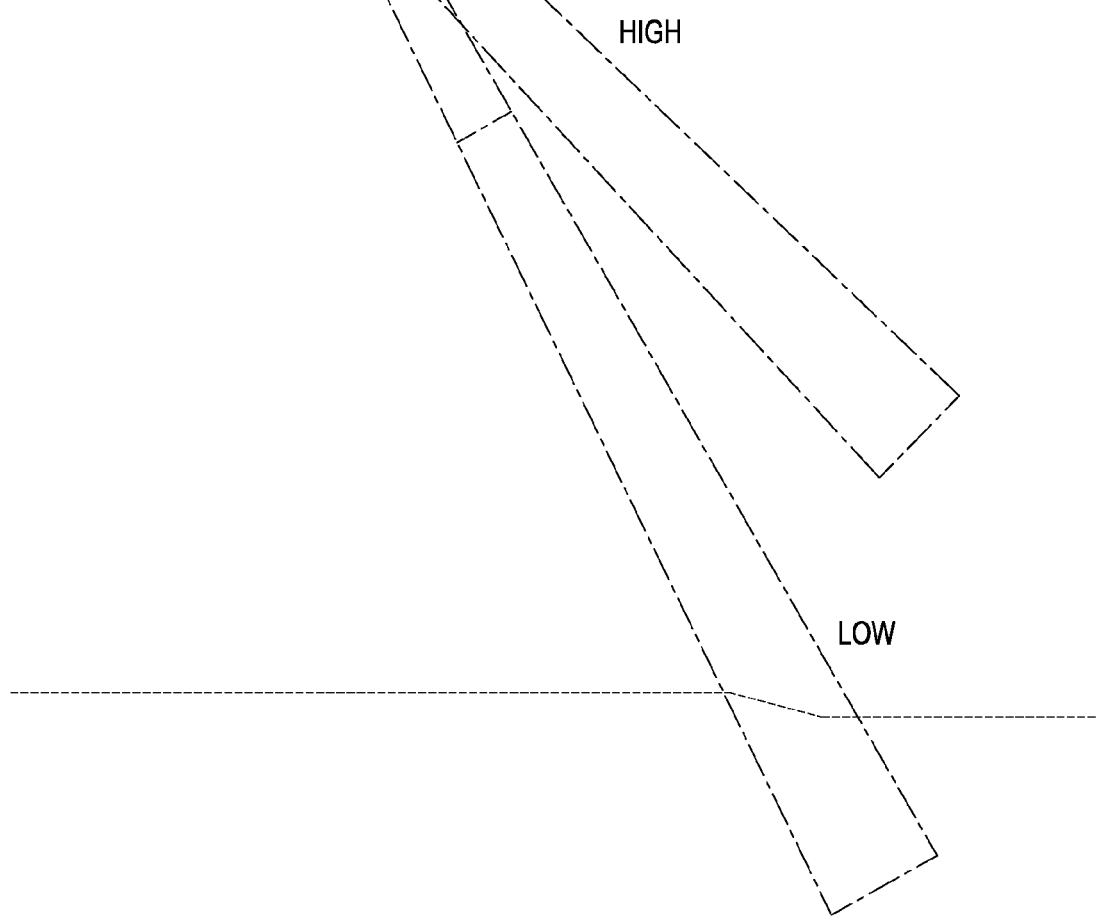
FIG. 20

VOS PROFILE

ENTRY SENSOR
3405

EXIT SENSOR
3400

EXIT AND ENTRY
SENSORS 3400, 3405

ACROSS
BELT ↓

OVERHEAD SENSOR
3420

T  T+1  TIME →

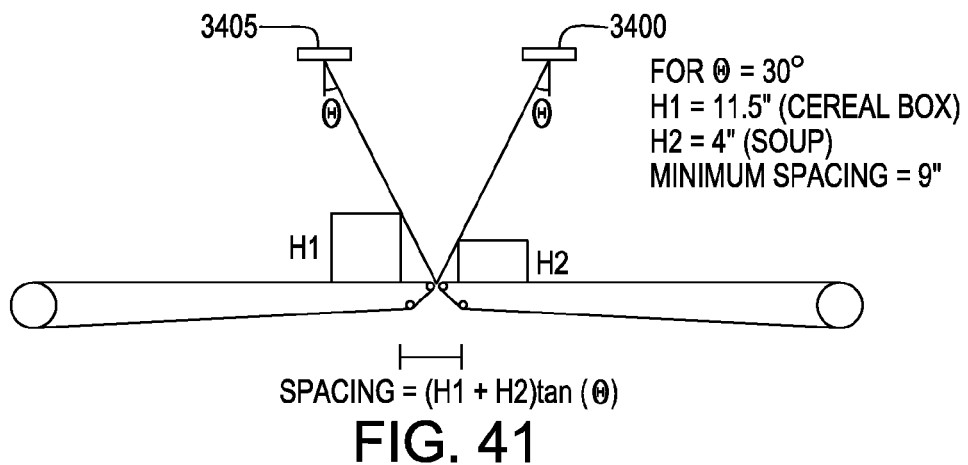
FIG. 41
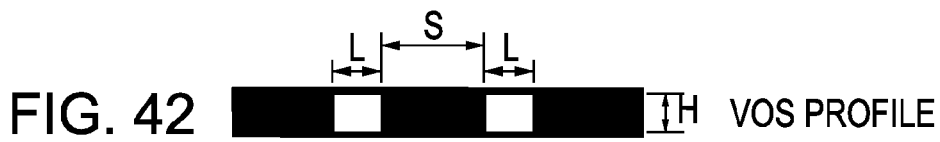
FIG. 42 — VOS PROFILE
FIG. 43 — EXIT SENSOR 3400
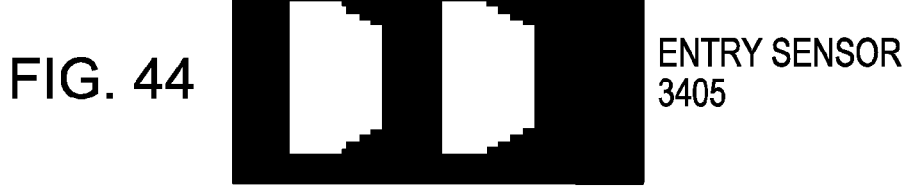
FIG. 44 — ENTRY SENSOR 3405
FIG. 45 — EXIT AND ENTRY SENSORS 3400, 3405
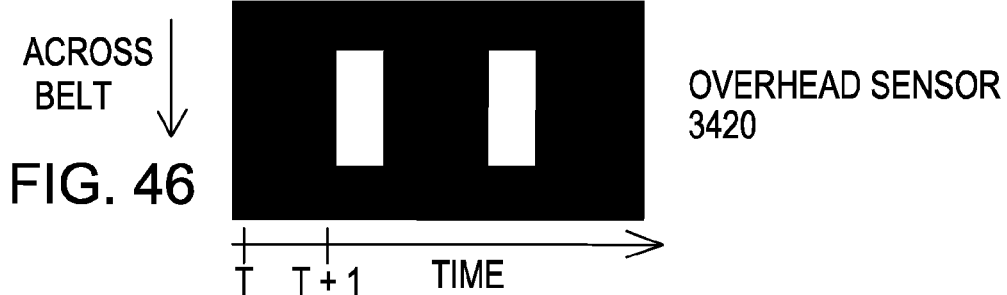
FIG. 46 — OVERHEAD SENSOR 3420

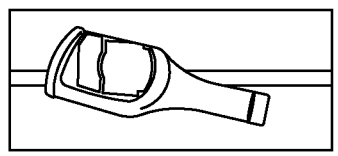  KETCHUP BOTTLE
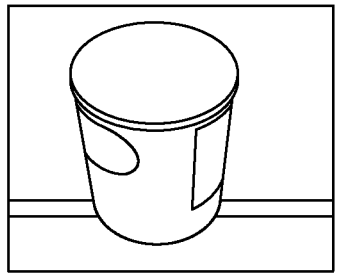 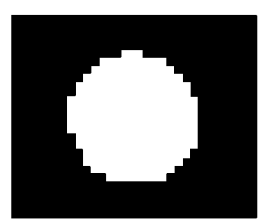 CONTAINER WITH METALLIC BOTTOM
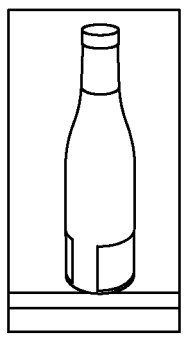 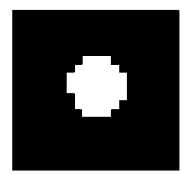 WINE BOTTLE
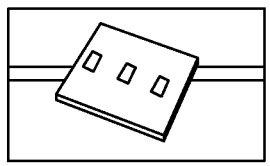  COMPACT-DISC CASE
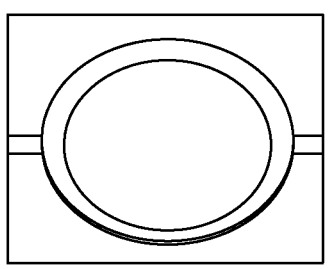 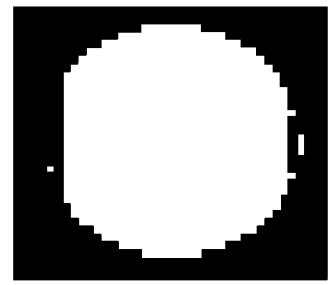 BLACK PLATE
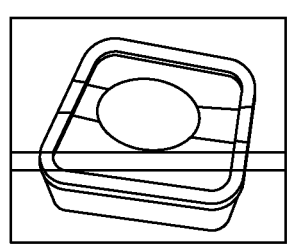 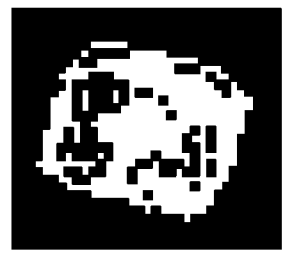 CLEAR BOX
FIG. 49

EXCEPTION DETECTION AND HANDLING IN AUTOMATED OPTICAL CODE READING SYSTEMS

RELATED APPLICATIONS

This application claims priority to U.S. Provisional Patent Application No. 61/435,686, filed Jan. 24, 2011, and U.S. Provisional Patent Application No. 61/505,935, filed Jul. 8, 2011, both applications of which are incorporated herein by reference.

BACKGROUND

The field of this disclosure relates generally to systems and methods of data reading, and more particularly but not exclusively to reading optical codes (e.g., barcodes).

Optical codes encode useful, optically-readable information about the objects to which they are attached or otherwise associated. Perhaps the best example of an optical code is the barcode. Barcodes are ubiquitously found on or associated with objects of various types, such as the packaging of retail, wholesale, and inventory goods; retail product presentation fixtures (e.g., shelves); goods undergoing manufacturing; personal or company assets; and documents. By encoding information, a barcode typically serves as an identifier of an object, whether the identification be to a class of objects (e.g., containers of milk) or a unique item.

Various types of optical code readers, such as manual readers, semi-automatic, and automated readers, are available to decode the information encoded in optical codes. In a manual or semi-automatic reader (e.g., a hand-held type reader, a fixed-position reader), a human operator positions an object relative to the reader to read the optical code associated with the object. In an automated reader (e.g., a portal or tunnel scanner), an object is automatically positioned (e.g., via a conveyor) relative to the reader to read the optical code on the object.

When an optical code reader attempts to read an optical code on an object, an error may occur. For example, when an error occurs with a manual reader, the human operator typically rescans the optical code or manually enters (e.g., via a keyboard) a number (e.g., a UPC number) corresponding to the object. In an automated reader, the reader needs to determine automatically whether an error or an unexpected event occurs. Accordingly, the present inventors have recognized a need to accurately identify and handle errors and unexpected events that occur in automated readers.

BRIEF DESCRIPTION OF THE DRAWINGS

FIG. 4 is an isometric view of the automated optical code reading system of FIG. 1 showing a vertical object sensor system of an object measurement system according to one embodiment.

FIG. 5 is a side elevation cross-sectional view of the vertical object sensor system of FIG. 4.

FIG. 6 is a vertical object sensor system of the object measurement system according to another embodiment.

FIG. 7 is an isometric view of a lateral object sensor system of the object measurement system according to one embodiment.

FIG. 8 is an isometric view of the lateral object sensor system according to one embodiment.

FIG. 9 is a side elevation view of the lateral object sensor system of FIG. 8.

FIGS. 11a, 11b, 11c, and 11d are pictorial representations of a method performed by the object measurement system to generate three-dimensional models of objects according to one embodiment.

FIGS. 12a, 12b, 12c, and 12d are pictorial representations of alternative methods performed by the object measurement system to generate three-dimensional models of objects.

FIG. 19 is an isometric view and FIG. 20 is a side elevation view of dual fields of view generated for image capture devices of FIG. 13.

FIG. 41 is a side view of the sensors of FIG. 34 that shows various measurement parameters that are used to calculate a minimum spacing between two objects to prevent the formation of merged and phantom objects by the lateral object sensor system, according to one embodiment.

FIGS. 42-46 are simulated images produced by the vertical object sensor system of FIG. 4 and the lateral object sensor system of FIG. 7 that represent two objects that are spaced apart by a distance sufficient to prevent the formation of merged and phantom objects by the lateral object sensor system, according to one embodiment.

FIG. 49 includes renderings of objects and their corresponding footprints that are produced using a transmissive light approach for the lateral object sensor system of FIG. 7.

DETAILED DESCRIPTION OF PREFERRED EMBODIMENTS

I. Overview

With reference to the above-listed drawings, this section describes particular embodiments and their detailed construction and operation. The embodiments described herein are set forth by way of illustration only and not limitation. It should be recognized in light of the teachings herein that other embodiments are possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to skilled persons in light of the teachings herein and/or where such detail would obfuscate an understanding of more pertinent aspects of the embodiments.

Various imager-based optical code readers and associated methods are described herein. In some embodiments, automated imager-based optical code readers are described with improved systems and methods for identifying and handling exceptions. Various types of exceptions are described in more detail below. In some embodiments, improved automated imager-based optical code readers are described that allow for close longitudinal (along the direction of travel) inter-object spacing, including no longitudinal inter-object spacing between objects.

Figure 1:
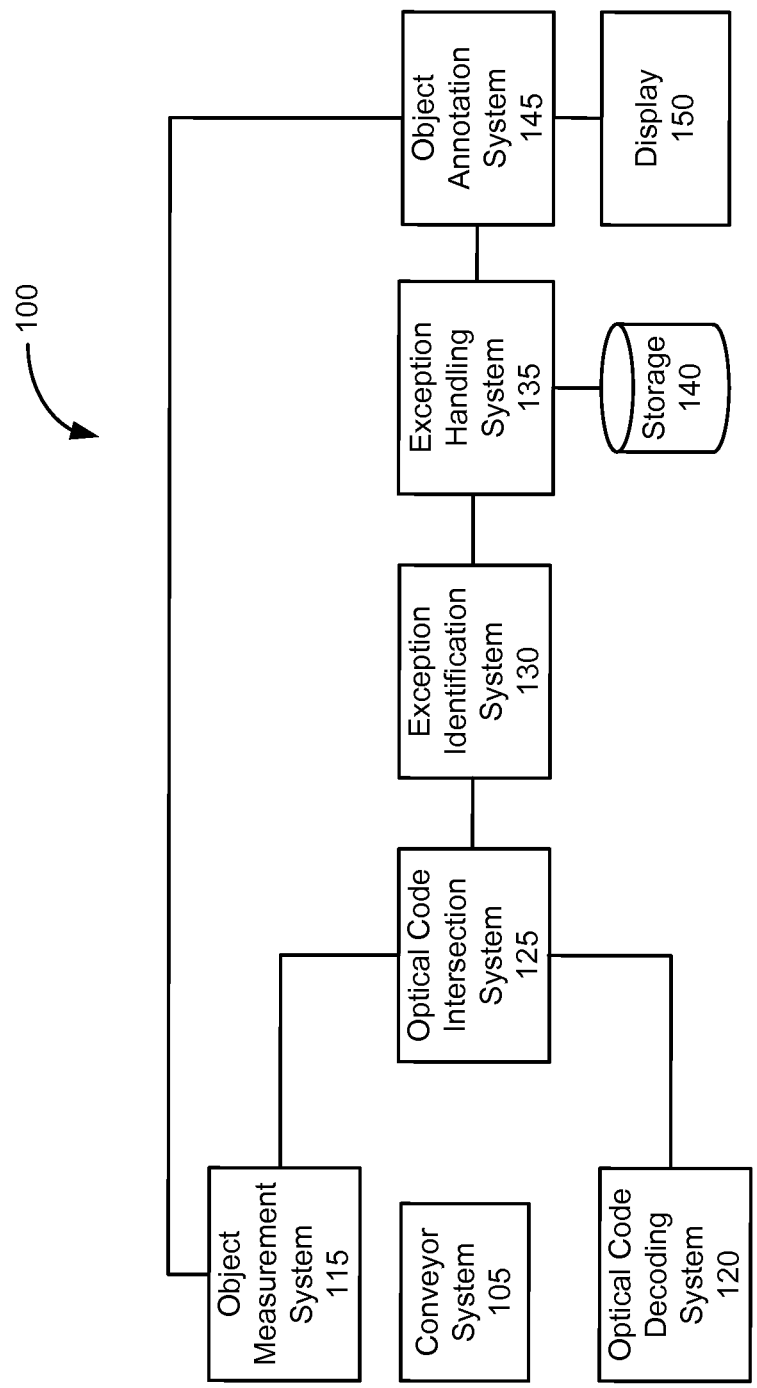
FIG. 1 is a block diagram of an automated optical code reading system according to one embodiment.

FIG. 1 is a block diagram of an automated optical code reading system 100 according to one embodiment. System 100 is configured to automatically position objects within or move objects through a read zone, read optical codes disposed on objects, and identify when an exception occurs. An exception corresponds to an occurrence in which an ideal event does not happen—an ideal event corresponding to when system 100 successfully reads an optical code and confidently associates the optical code to an object passing through system 100 (e.g., the optical code is associated with only one object and the object has only one optical code associated with it). Various types of exceptions are possible. For example, one type of exception corresponds to an event in which an object passes through system 100, but an optical code is not read by system 100 (called a "no code" exception). Another type of exception corresponds to an event in which an optical code is read, but system 100 does not detect that an object has passed through system 100 (called a "no object" or "phantom read" exception). Another type of exception correspond to an event in which one optical code read by system 100 is associated with multiple objects passing through system 100 (called a "multiple objects" exception). Another type of exception corresponds to an event in which multiple different optical codes read by system 100 are associated with one object passing through system 100 (called a "multiple codes" exception). Various subsets of the above-described exceptions, as well as other types of exceptions, are possible and applicable to the systems/methods described herein.

System 100 includes various modules or subsystems to perform various tasks. These subsystems are described in greater detail below. One or more of these systems may include a processor, associated software or hardware constructs, and/or memory to carry out certain functions performed by the systems. The processors of the systems may be embodied in a single central processing unit, or may be distributed such that a system has its own dedicated processor. Moreover, some embodiments may be provided as a computer program product including a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

Figure 2:
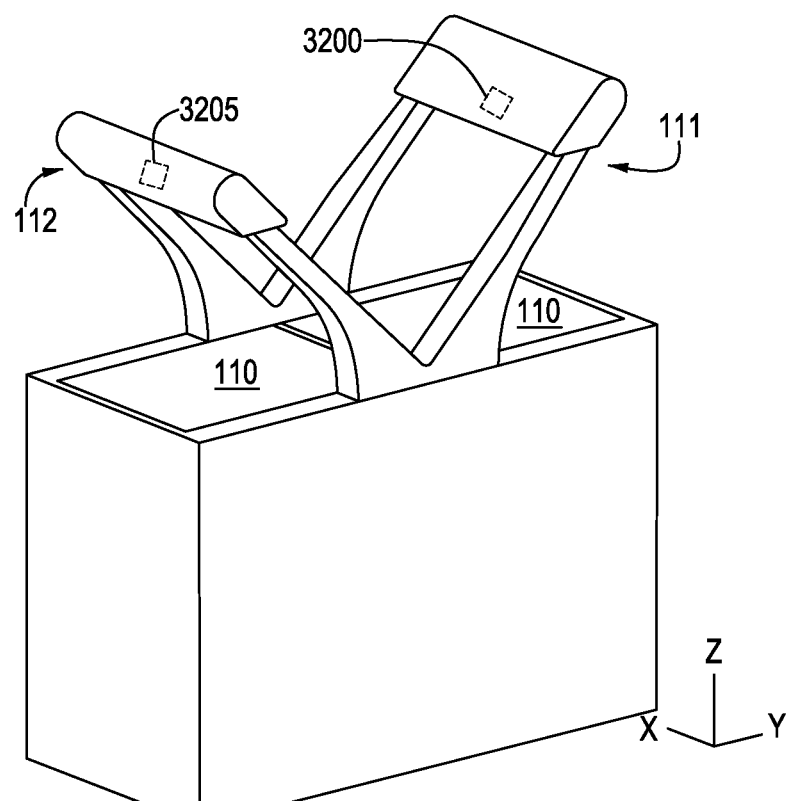
FIG. 2 is an isometric view of the automated optical code reading system of FIG. 1.
Figure 3:
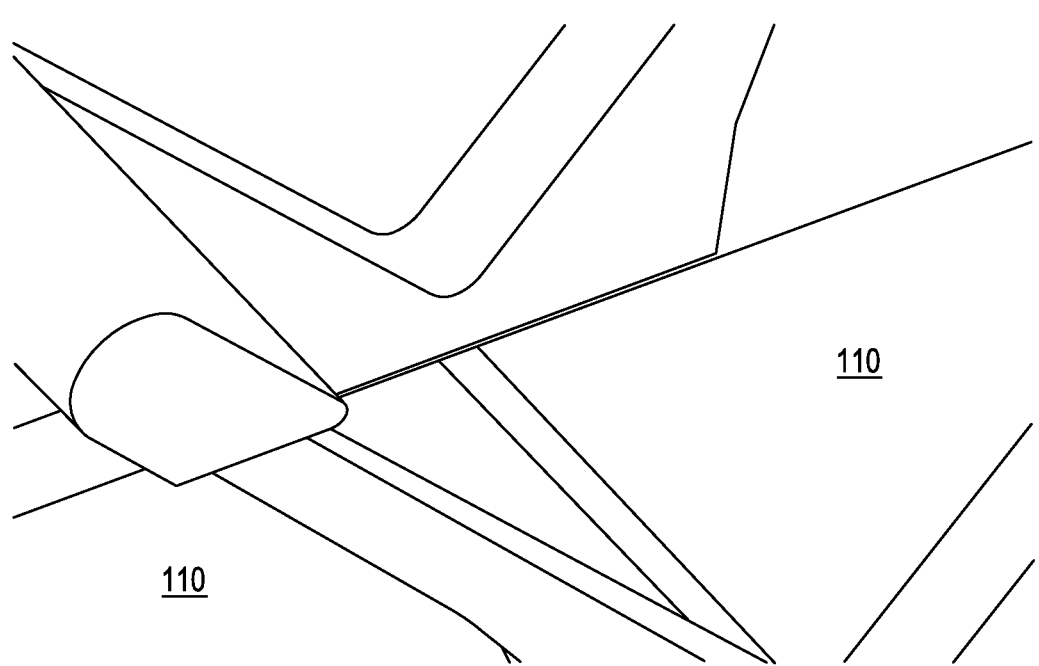
FIG. 3 is a close-up isometric view of part of the automated optical code reading system of FIG. 1 showing a conveyor system according to one embodiment.

To automatically move objects through it, system 100 includes a conveyor system 105. Conveyor system 105 may include one or more various types of mechanical conveying systems to automatically transport objects through a three-dimensional view volume so that optical codes disposed on the objects may be read, the objects identified, and the objects added to an item transaction list, for example. FIG. 2 is an isometric view of one embodiment of system 100, and FIG. 3 is a close-up isometric view of part of system 100. As shown in FIGS. 2 and 3, conveyor system 105 may include one or more conveyors 110 (FIGS. 2 and 3 show two conveyors 110) and corresponding driving mechanisms to move conveyors 110 so that objects placed thereon automatically move in a longitudinal direction (corresponding to the Y-axis) through system 100. In one example, conveyor system 105 is operable to move items in the longitudinal direction at a relatively fast rate (e.g., 200-400 millimeters/second (mm/sec)) so that objects can be quickly added to the item transaction list. Conveyor system 105 moves items relative to data capture devices 111, 112 that form arches over conveyors 110. Data capture devices 111, 112 include various components to capture information corresponding to the objects that move through the arches. Although data capture devices 111, 112 shown include an open space between them, data capture devices 111, 112 may be embodied in an elongated tunnel formed over conveyors 110. Details of a data capture system are further described in U.S. Patent Application No. 61/435,777, filed Jan. 24, 2011, and U.S. patent application Ser. No. 13/357,357, filed Jan. 24, 2012, both applications of which are incorporated herein by reference.

As shown in FIG. 1, system 100 also includes an object measurement system 115 positioned along conveyor system 105 to measure objects that are transported by conveyor system 105. Object measurement system 115 generates model data that represent three-dimensional models of the objects that are transported by conveyor system 105. Object measurement system 115 is described in greater detail below with reference to FIGS. 7-12 and 34-51.

System 100 may also include an optical code reading system 120, shown in FIG. 1, that is operable to capture images of objects as the objects are transported by conveyor system 105. Optical code reading system 120 identifies whether optical codes disposed on the objects are captured in the images and decodes those optical codes that are captured. Skilled persons will recognize that optical code reading system 120 may include different decoders (e.g., software algorithms, hardware constructs) to decode various types of optical codes including one-dimensional (e.g., linear) codes (e.g., UPC, codabar, code 25, code 39, code 93, code 128, code 11, EAN8, EAN13, plessey, POSTNET), stacked linear codes (e.g., GS1 Databar, PDF417), and two-dimensional (e.g., matrix) codes (e.g., aztec code, maxicode, QR code, high-capacity color barcode, data matrix).

Optical code reading system 120 is also operable to generate projection data for optical codes represented in the images it captures. The projection data represent back projection rays that project into a three-dimensional view volume of optical code reading system 120. These back projection rays are associated with locations of the representations of the optical codes in the images. Optical code reading system 120 is described in greater detail below with reference to FIGS. 14-24.

System 100 may also include an optical code intersection system 125 that is configured to receive the model data from object measurement system 115 and the projection data from optical code reading system 120. Optical code intersection system 125 uses the model data and the projection data to determine whether the back projection rays generated for decoded optical codes intersect with the three-dimensional models. Optical code intersection system 125 is described in greater detail below with reference to FIGS. 25 and 26.

System 100 includes an optional exception identification system 130 in communication with optical code intersection system 125. Exception identification system 130 is configured to determine whether optical codes read by optical code reading system 120 are associated with three-dimensional models generated by object measurement system 115. In one example, exception identification system 130 determines that the optical codes are associated with the three-dimensional models based on intersection determinations made by optical code intersection system 125. From the associations (or lack of associations) of the optical codes and three-dimensional models, exception identification system 130 may determine whether exceptions occur. For example, if an object passes through system 100 and object measurement system 115 generates a three-dimensional model of the object, but no optical code is associated with the three dimensional model (e.g., no back projection ray of an optical code intersects the three-dimensional model), exception identification system 130 identifies this event as a "no code" exception. Exception identification system 130 is also operable to classify and categorize exceptions by types and subtypes and to generate exception category identification information indicative of the exceptions' types and/or subtypes. Exception identification system 130 is described in greater detail below with reference to FIGS. 27 and 28.

System 100 may also include an optional exception handling system 135 in communication with exception identification system 130. Exception handling system 135 determines in what manner to handle (e.g., resolve) an exception identified by exception identification system 130 based on the exception's type. To this end, the exception category identification information generated by exception identification system 130 is communicated to exception handling system 135. Exception handling system 135 is operable to determine that an exception should be resolved in one of multiple ways. For example, exception handling system 135 may determine that an exception is to be automatically resolved (e.g., ignoring the exception) or manually resolved by an operator. Exception handling system 135 may communicate with an optional storage device 140 that stores various types of information associated with exceptions. Exception handling system 135 is described in greater detail below with reference to FIG. 31.

System 100 may also include an optional object annotation system 145 that is operable to generate annotated image data corresponding to visual representations of exceptions to enable an operator to easily identify which objects transported through system 100 have exceptions associated with them. The annotated image data generated by object annotation system 145 are communicated to a display screen 150, which displays the visual representations of the exceptions. Object annotation system 145 is described in greater detail below with reference to FIGS. 30 and 31.

II. Object Measurement System

Object measurement system 115 includes one or more sensors positioned along conveyor system 105 and an associated processor to measure one or more dimensions of objects moving along conveyor system 105. In one embodiment, object measurement system 115 includes a vertical object sensor. In another embodiment, object measurement system 115 includes a lateral object sensor. In another embodiment, object measurement system 115 includes both a vertical object sensor and a lateral object sensor.

FIG. 4 is an isometric view and FIG. 5 is a cut-away side elevation view of system 100 depicting a vertical object sensor system 410 of object measurement system 115, according to one embodiment. Vertical object sensor system 410 includes dual light curtains 415, 420 made of sensing elements 422 (e.g., sensors) spaced apart along side arms 425, 430, 435, 440 of data capture devices 111, 112. FIG. 6 is an isometric view of an alternative design of side arms 425, 430, 435, 440, together with an alternative arrangement of elements 422 of dual light curtains 415, 420. In one embodiment, light curtains 415, 420 bound exit and entry vertical sides of a three-dimensional view volume 445 in which images of objects are captured by optical code reading system 120. Having dual light curtains 415, 420 that bound view volume 445 enables object measurement system 115 to detect when an object enters and exits view volume 445. Dual light curtains 415, 420 may also allow system 100 to function properly even when conveyors 110 vary in speed or even stop or start. Although the embodiments of FIGS. 4, 5, and 6 show dual light curtains 415, 420, vertical object sensor system 410 need not include two light curtains. For example, vertical object sensor system 410 may include only one of light curtains 415, 420 (e.g., the exit light curtain 415), or may include three or more vertical light curtains.

Elements 422 of light curtains 415, 420 may be aligned in various arrangements. For example, elements 422 of FIGS. 4 and 5 are arranged along a curved line that follows the side profile shape of arms 425, 430, 435, 440. Alternatively, elements 422 may be arranged along a straight line or an irregular shaped line. Moreover, elements 422 may be evenly spaced vertically along arms 425, 430, 435, 440. Alternatively, elements 422 may be unevenly spaced vertically along arms 425, 430, 435, 440. For example, elements 422 may be more closely spaced near the bottoms of arms 425, 430, 435, 440 compared to the tops to increase the height resolution for relatively short objects. Sensor elements 442 may include a transmitter on one side of conveyors 110, which transmitter may be an infrared light emitting diode (LED) with a transmission wavelength within the infrared wavelength band (e.g., a wavelength of 950 nm), and a receiver on the opposite side of conveyors 110, which receiver may be a photodiode that is operable to detect infrared wavelengths. A suitable example of a transmitter of light curtains 415, 420 is a model SFH-4555 available from Osram AG of Munich, Germany, and a suitable example of a receiver of light curtains 415, 420 is a model TEMD1000 available from Vishay Intertechnology, Inc. of Malvern, Pa.

Vertical object sensor system 410 is operable to provide a number of measurements corresponding to objects passing through view volume 445. For example, vertical object sensor system 410 measures height (H), longitudinal position (which enables the longitudinal length (L) to be determined), and inter-object longitudinal spacing (S) parameters of objects as shown in FIG. 5. In one example, vertical object sensor system 410 measures these parameters based on dead reckoning in which objects move along conveyors 110 at a measured or estimated speed. As objects pass between opposing arms 425, 430 and opposing arms 435, 440, one or more paths between certain vertically associated elements 422 on opposing arms are blocked by the objects. Vertical object sensor system 410 measures which elements 422 in light curtains 415, 420 are blocked versus time. The pattern created by blocked elements 422 is propagated by a longitudinal distance corresponding to the time between measurements captured by vertical object sensor system 410 divided by speed of conveyors 110. Based on which elements 422 are blocked over time and the calculated longitudinal distance, a Y-Z map (longitudinal length (L) versus height (H)) is generated. The physical Y-Z coordinates of elements 422 are used to make the Y-Z map. By creating this Y-Z map using dual light curtains 415, 420 and compensating for the distance between them, object measurement system 115 is operable to determine whether an object has moved at a constant speed between curtains 415, 420.

In one embodiment, dual light curtains 415, 420 enable vertical object sensor system 410 to determine whether an object rolls or falls between the time it enters and exits view volume 445. For example, Y-Z maps are generated for each light curtain 415, 420. The physical distance between light curtains 415, 420 is compensated for so that the Y-Z maps of light curtains 415, 420 can be compared. From the comparison of the Y-Z maps, it can be determined whether the object has moved at a constant speed between light curtains 415, 420. If the object rolls or falls between light curtains 415, 420, the Y-Z maps corresponding to the shape of the object may be different. Vertical object sensor system 410 is operable to detect the differences between the Y-Z maps and to compensate for objects that roll or fall while in view volume 445. In one example of a rolling object, the time difference between the blocking and unblocking of light curtains 415, 420 may be about the same because the object may be moving (rolling) at a constant speed, but perhaps not at the speed of conveyors 110. If the time difference (e.g., longitudinal length (L) measurement) of light curtains 415, 420 is about the same, the rolling velocity of the object may be computed by calculating the distance between light curtains 415, 420 divided by the time difference between the blocking of each light curtain 415, 420. In an example of a falling object, if an object is present at the exit light curtain (e.g., light curtain 420) at an expected time delay (e.g., the distance between light curtains 415, 420 divided by conveyor belt speed) from when it was present at the entry light curtain (e.g., light curtain 415), then any shape (e.g., length (L), height (H)) measurement difference between light curtains 415, 420 may be assumed to be caused by the object falling. Typically, if the object falls, the fall occurs at a transition between conveyors 110. In this case, the object can be modeled as the shape measured by the entry light curtain moving at the conveyor belt speed until the object reaches the transition between conveyors 110. The object is then modeled as falling over, and then moving on the exit conveyor at the belt speed and having the shape measured by the exit light curtain.

FIGS. 7 and 8 are isometric views, and FIG. 9 is a side elevation view, of system 100 depicting a lateral object sensor system 705 of object measurement system 115. Lateral object sensor system 705 may include one or more sensors 710a, 710b positioned underneath conveyors 110. In one example, sensors 710a, 710b may be embodied in a line-scan camera system. Line-scan data from sensors 710a, 710b is binarized (e.g., thresholded) to yield the presence or absence of an object at discrete locations across conveyors 110 laterally (e.g., corresponding to the X-axis). Successive scans by sensors 710a, 710b as the object moves longitudinally along conveyors 110 enables an X-Y map or footprint of the object to be generated. Lateral object sensor system 705 may implement reflective light techniques to create a footprint of the object. For example, lateral object sensor system 705 may include artificial illumination sources 711 positioned near sensors 710a, 710b that produce light that reflects off of an object and impinges on sensors 710a, 710b.

Sensors 710a, 710b are aimed to view the underside of objects as the objects pass over a gap 715 between conveyors 110. In the embodiments of FIGS. 7, 8, and 9, sensors 710a, 710b are positioned longitudinally away from gap 715 so as not to be positioned directly under it. Thus, sensors 710a, 710b may avoid being blocked or otherwise contaminated by debris that may fall through gap 715. Sensors 710a, 710b may be aimed in directions that form non-right angles with the opposing major planes of conveyors 110. In an alternative embodiment, sensors may be placed directly under gap 715 and aimed directly up, and a protective screen that the sensors can see through may be positioned between the sensors and gap 715.

Figure 10:
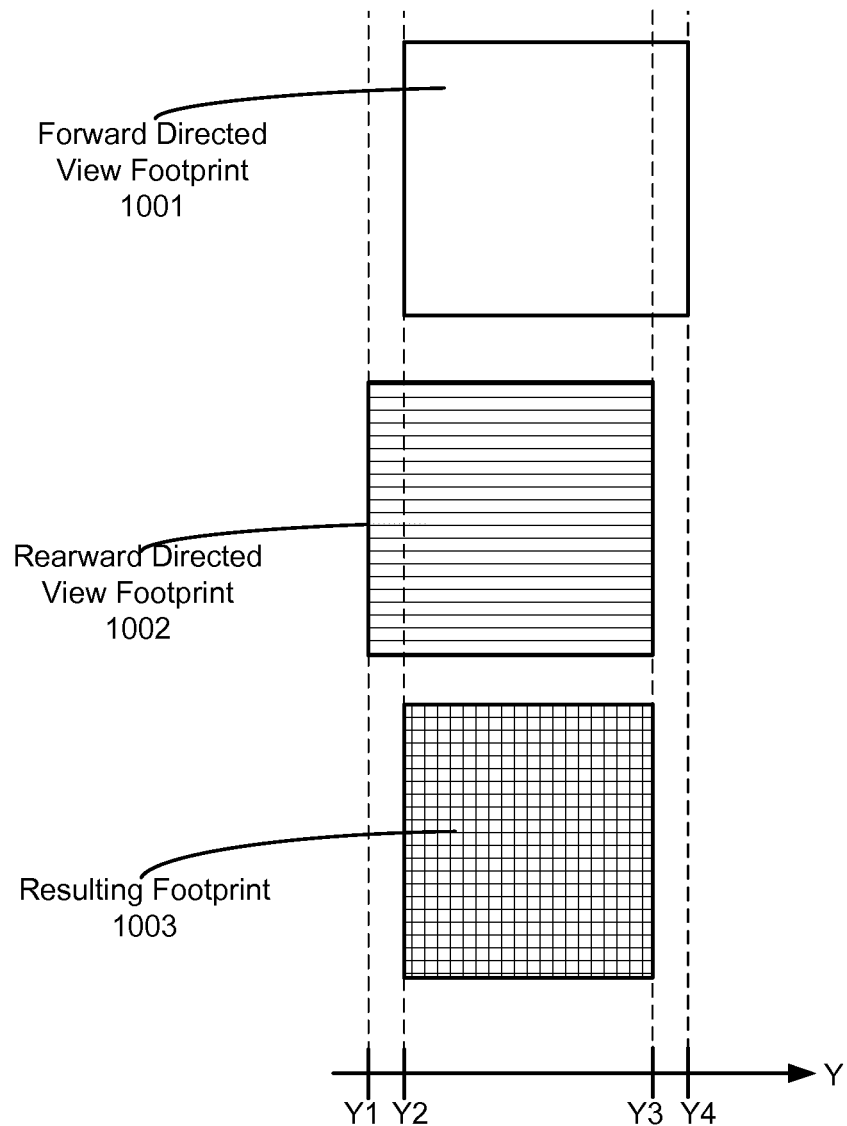
FIG. 10 is a representation of footprints of an object generated by sensors of the lateral object sensor system of FIGS. 8 and 9 according to one example.

In the example of FIG. 7, lateral object sensor system 705 includes one or more sensors 710a that are aimed in one direction to provide either a leading or trailing view of objects. In the example of FIGS. 8 and 9, lateral object sensor system 705 includes multiple sensors 710a, 710b that are aimed in two directions to provide a forward directed view and a rearward directed view of objects. Sensor(s) 710a is/are aimed rearwardly and this will impinge on the trailing side 32 of object 20; sensor(s) 710b is/are aimed forwardly and this will impinge on the leading side 30 of object 20. Because sensors 710 are not aimed directly up in the embodiment of FIGS. 8 and 9, parts of the leading and trailing sides 30, 32 of object 20 may be mistakenly determined to be part of the footprint of the object. Having sensors 710a, 710b positioned to provide views of both leading and trailing sides 30, 32 of objects as shown in FIGS. 8 and 9 allows for compensation of potential incorrect footprint determinations. For example, lateral object sensor system 705 is operable to perform an AND logic operation in which the footprint of object 20 corresponds to the footprint determined by the forward directed view sensor(s) 710b AND the footprint determined by the rearward directed view sensor(s) 710a, with the longitudinal position of the object over time being taken into consideration. FIG. 10 is a pictorial representation of the AND operation performed by lateral object sensor system 705 when an object's leading and trailing edges are aligned with (e.g., parallel to) the X-axis shown in FIG. 7. FIG. 10 shows a footprint 1001 produced by forward directed view sensor(s) 710b. Footprint 1001 extends along the Y-axis from points Y2 to Y4. FIG. 10 also shows a footprint 1002 produced by rearward directed view sensor(s) 710a. Footprint 1002 extends along the Y-axis from Y1 to Y3. An AND operation is performed in the Y-direction to produce a resulting footprint 1003 extending from Y2 to Y3 along the Y-axis. The AND operation may also be performed in the X-direction to account for objects that may not be aligned with the X-axis.

FIGS. 11a, 11b, 11c, and 11d are pictorial representations demonstrating how object measurement system 115 generates three-dimensional models of objects based on vertical object sensor system 410 and lateral object sensor system 705. FIG. 11a is an isometric view of objects on conveyor 110. FIG. 11b is a Y-Z map (or VOS profile) of the objects that was generated by vertical object sensor system 410. FIG. 11c is a X-Y map (or LOS profile) of the objects that was generated by lateral object sensor system 705. Object measurement system 115 combines data corresponding to the Y-Z map and X-Y map to generate model data representing three-dimensional models of the objects as shown in FIG. 11d. In one example, the three-dimensional models of the objects are generated by generating the VOS profile, and then generating the LOS profile. When the LOS profile is generated, regions corresponding to the objects are given a height corresponding to the median height from the VOS profile within the longitudinal spread of the object in the LOS profile. Alternatively, the height given to regions corresponding to the objects may be given the average height from the VOS profile within the longitudinal spread of the object, or the height given to the object regions may correspond to the actual heights from the VOS profile for the locations within the object regions. In another embodiment, the three-dimensional model may be expanded (e.g., by 0.5-4 centimeters (cm)) in one or more directions to compensate for system imprecisions (e.g., conveyor belt speed calculation errors, spacing between light curtain elements 422, and the like).

FIGS. 12a, 12b, 12c, and 12d are pictorial representations showing alternative embodiments for generating three-dimensional models of objects. FIG. 12a corresponds to FIG. 11a, and FIG. 12b corresponds to FIG. 11d. FIG. 12c shows three-dimensional models of the objects that are generated according to one alternative embodiment. In this alternative embodiment, object measurement system 115 uses vertical object sensor system 410, but not lateral object sensor system 705. Object measurement system 115 uses the VOS profile generated by vertical object sensor system 410 and generates the three-dimensional models of the objects assuming that the objects extend from belt edge to belt edge. In this alternative embodiment, if objects are not spaced apart from one another longitudinally, vertical object sensor system 410 may collapse multiple objects into a single three-dimensional model as demonstrated by the two leftmost objects.

FIG. 12d shows three-dimensional models of the objects that are generated according to another alternative embodiment. In this alternative embodiment, object measurement system 115 uses lateral object sensor system 705, but not vertical object sensor system 410. Object measurement system 115 uses the LOS profile generated by lateral object sensor system 705 and generates the three-dimensional models of the objects assuming that the objects extend from the top surface of conveyors 110 to the top of view volume 445.

III. Optical Code Reading System

Figure 13:
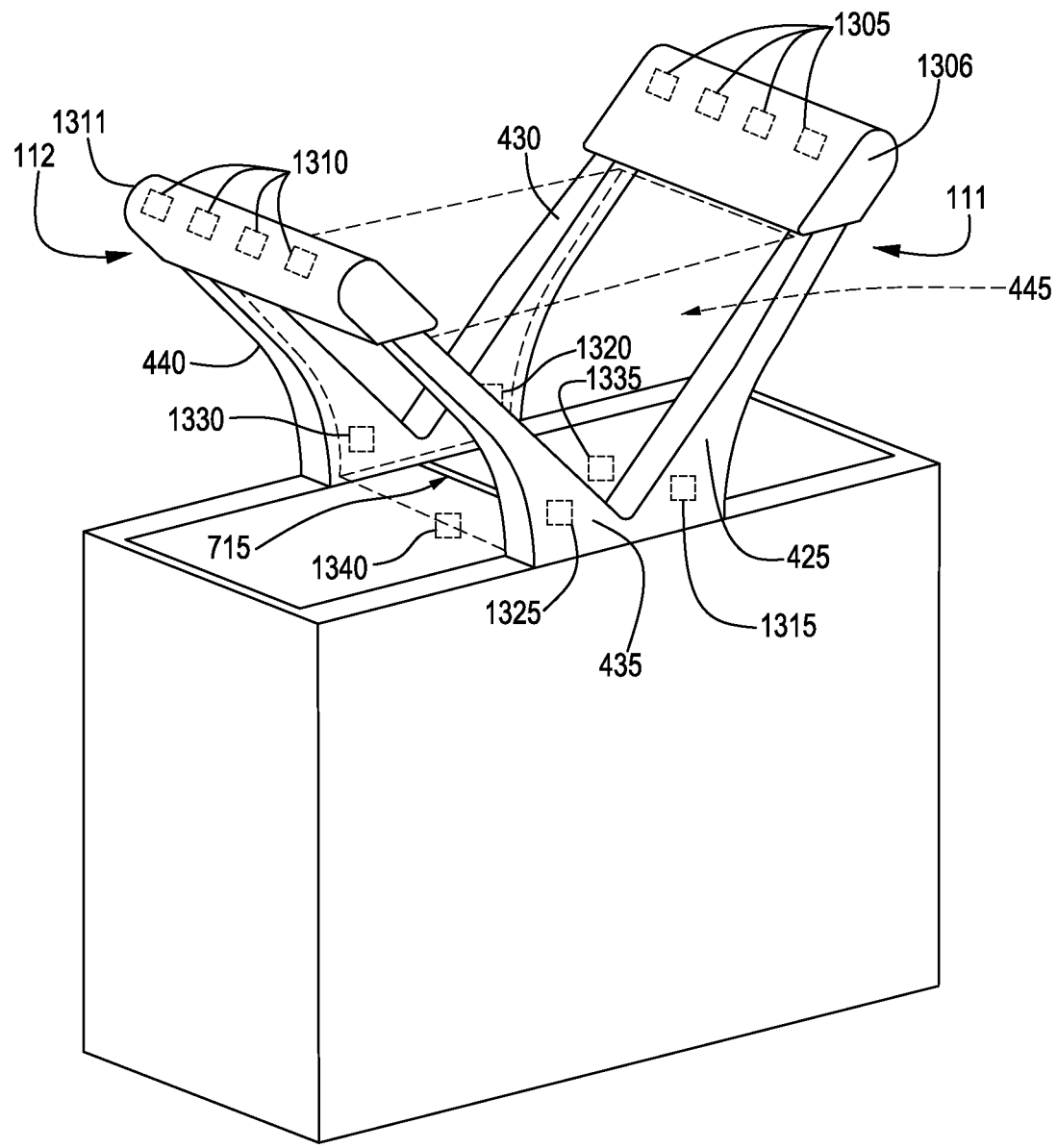
FIG. 13 is an isometric view of the automated optical code reading system of FIG. 1 showing image capture devices of an optical code reading system according to one embodiment.

Optical code reading system 120 includes one or more image capture devices positioned along conveyors 110 for capturing images of objects as the objects pass through view volume 445 of optical code reading system 120. In one embodiment, optical code reading system 120 includes multiple image capture devices positioned at different locations along conveyors 110 to provide different fields of view of view volume 445. For example, optical code reading system 120 may include 14 image capture devices as shown in FIG. 13. According to the example of FIG. 13, four image capture devices 1305 are positioned along a top portion 1306 of data capture device 111; four image capture devices 1310 are positioned along a top portion 1311 of data capture device 112; one image capture device 1315 is positioned along side arm 425 of data capture device 111; one image capture device 1320 is positioned along side arm 430 of data capture device 111; one image capture device 1325 is positioned along side arm 435 of data capture device 112; one image capture device 1330 is positioned along side arm 440 of data capture device 112; and two image capture devices 1335, 1340 are positioned below conveyors 110 on one or more sides of gap 715. Image capture devices 1335, 1340 are shown on opposite sides of gap 715 in FIG. 13, but image capture devices 1335, 1340 may be positioned on the same side away from gap 715. The arrangement of image capture devices shown in FIG. 13 is just one example; various other arrangements are possible and contemplated. Image capture devices 1305, 1310, 1315, 1320, 1325, 1330, 1335, and 1340 may each include associated artificial illumination sources to illuminate view volume 445 from different directions. The associated artificial illumination sources may be located in close proximity to their corresponding image capture devices, or the sources may be some distance away. For example, illumination sources for image capture devices 1305 may be mounted on top portion 1306 of data capture device 111, or they may be mounted on top portion 1311 of data capture device 112, or they may be mounted in both locations.

Figure 14:
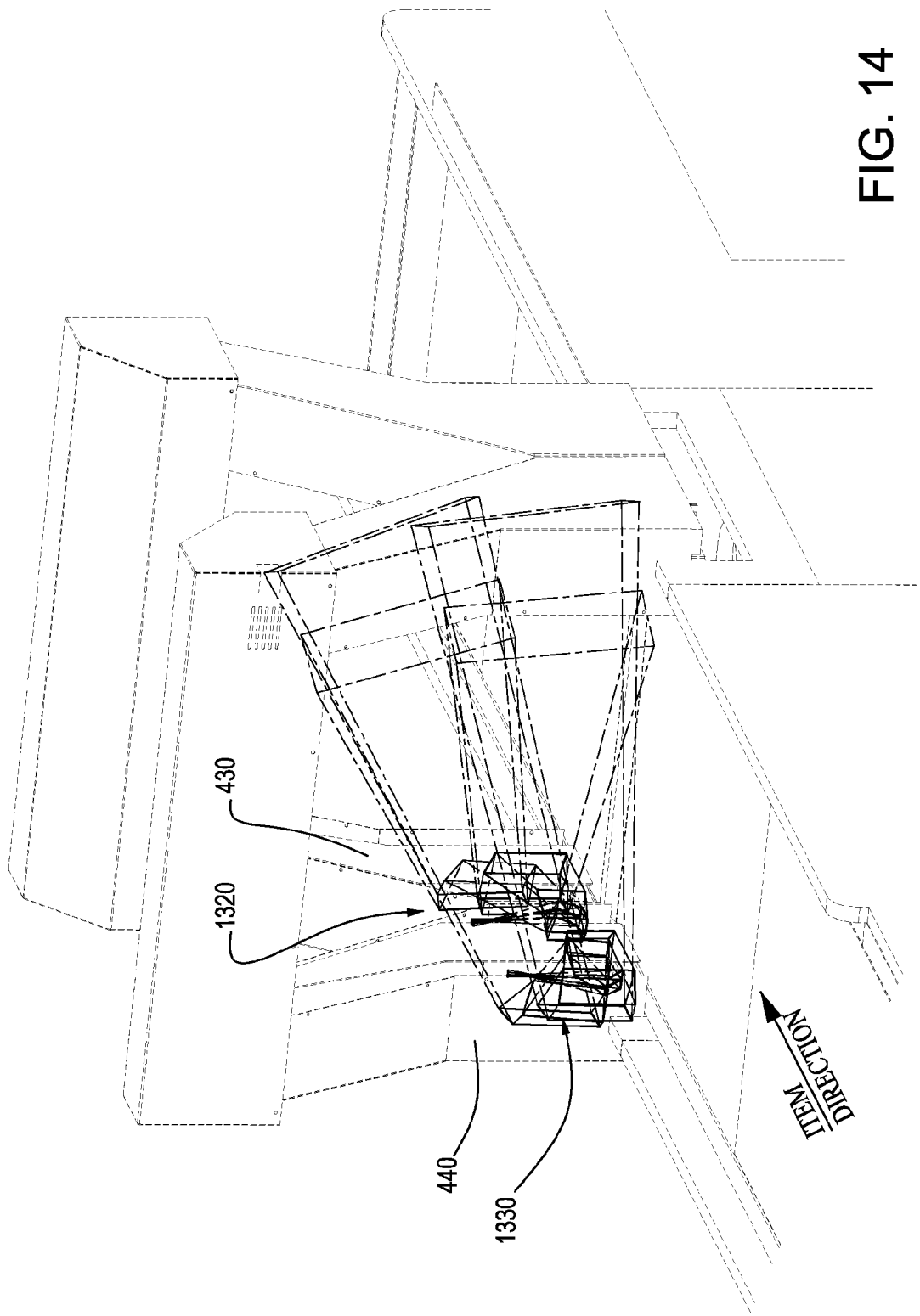
FIGS. 14-18 are isometric views of the automated optical code reading system of FIG. 1 showing fields of view of the image capture devices of FIG. 13.
Figure 15:
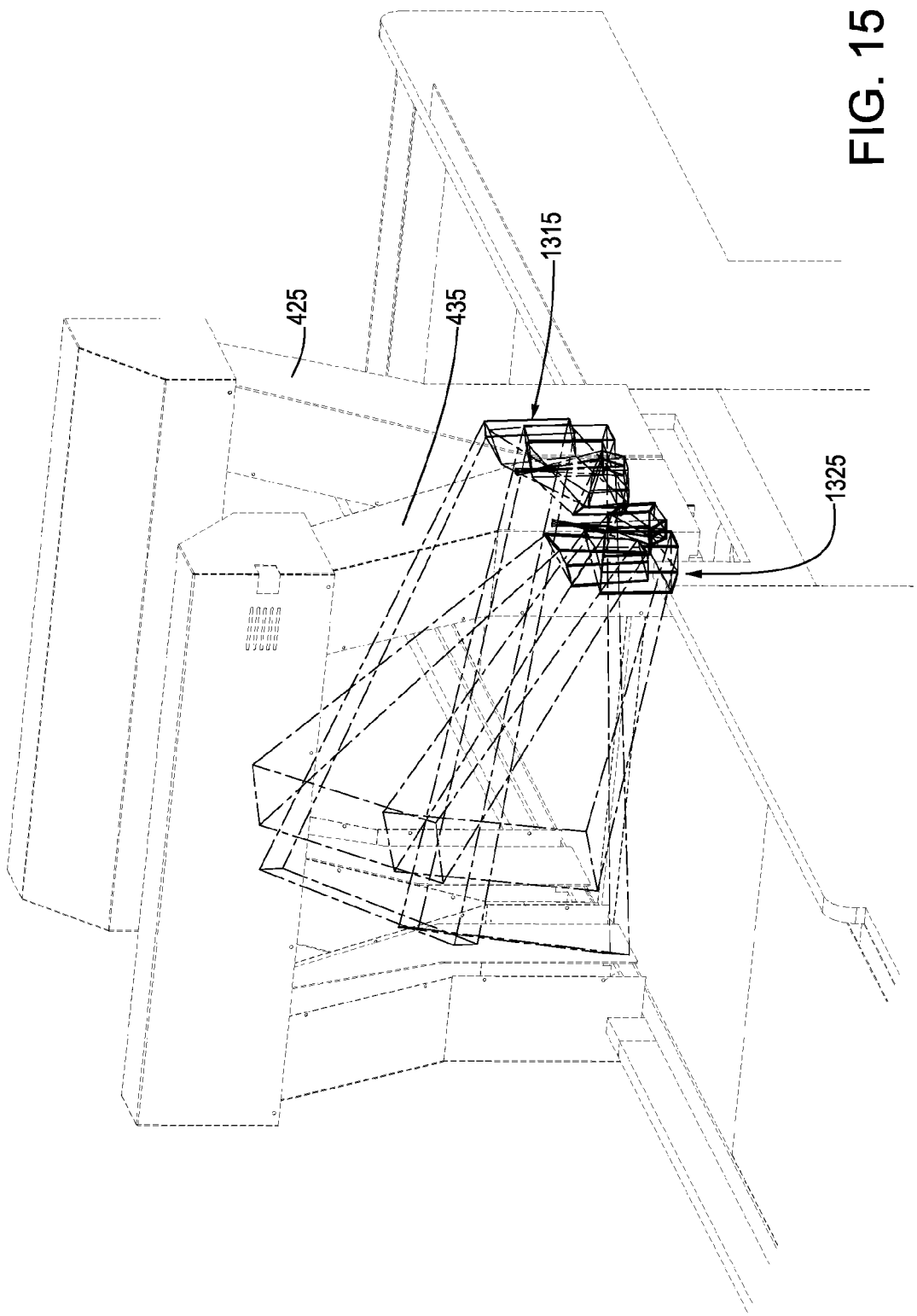
Figure 16:
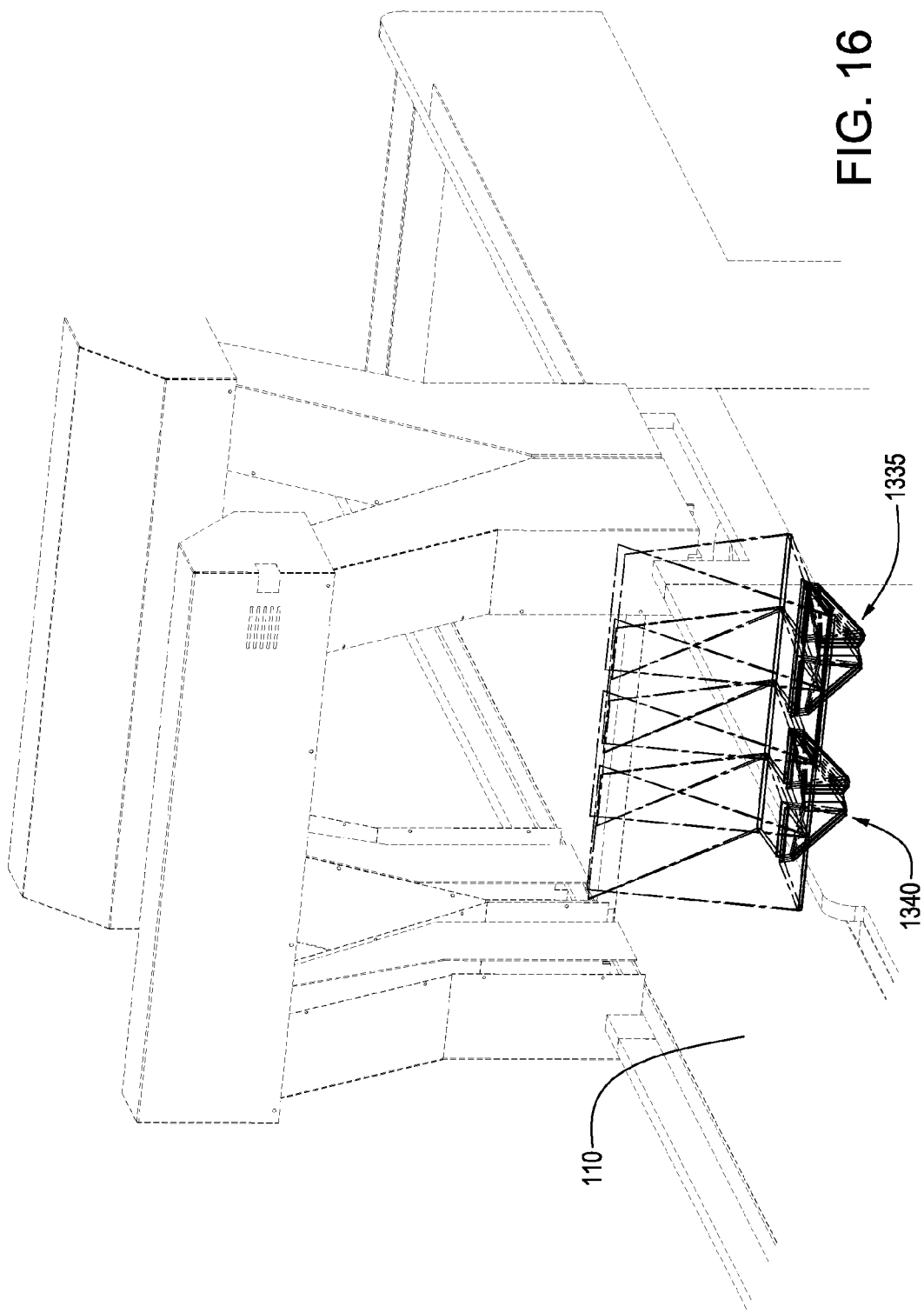
Figure 17:
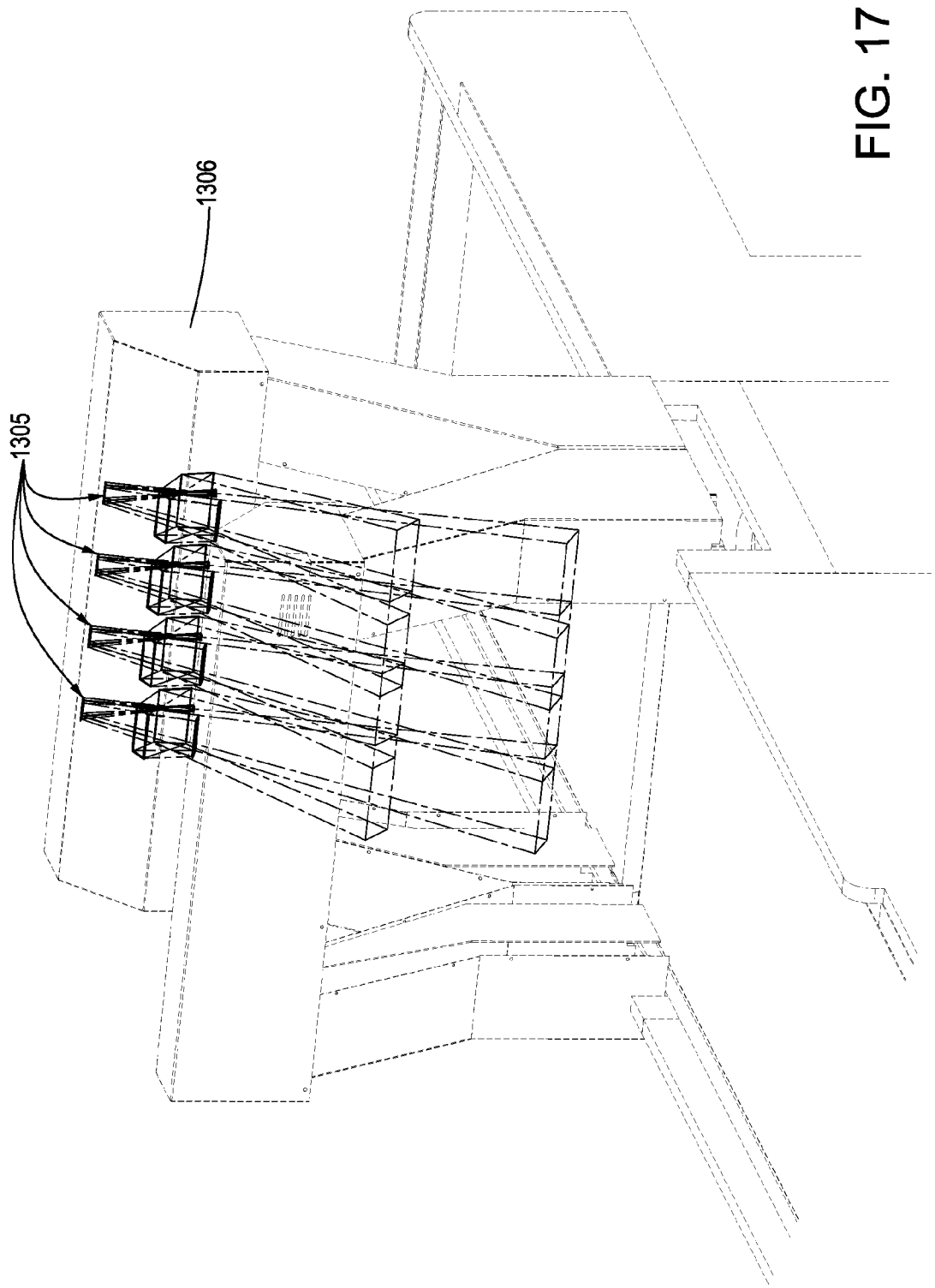
Figure 18:
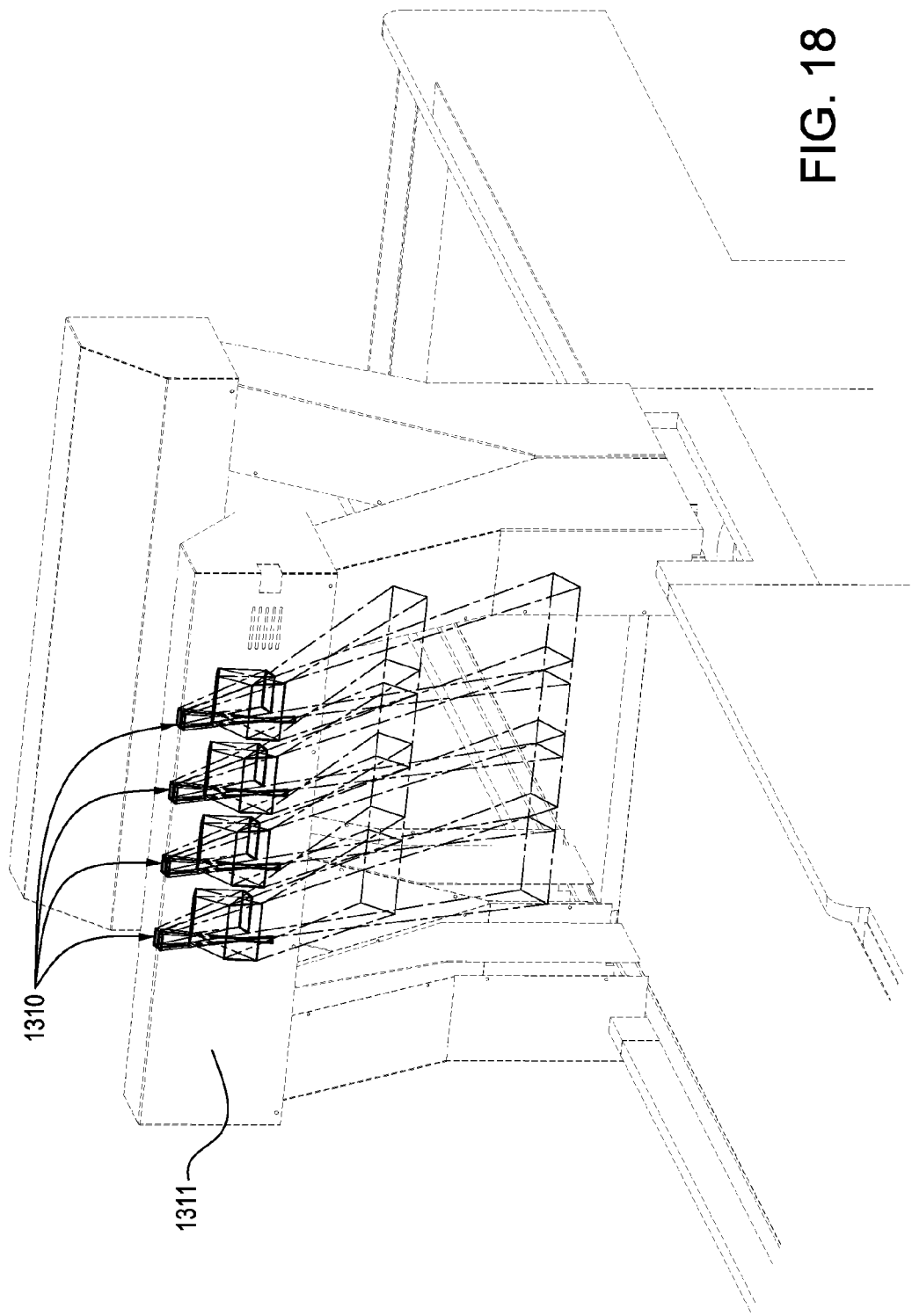

Image capture devices 1305, 1310, 1315, 1320, 1325, 1330, 1335, and 1340 may be configured to capture images at certain times. For example, they may be configured to capture images from when object measurement system 115 detects that an object enters view volume 445 and until object measurement system 115 detects that the object has left view volume 445. Image capture devices 1305, 1310, 1315, 1320, 1325, 1330, 1335, and 1340 (and their associated artificial illumination sources) may be synchronized to capture images (and illuminate view volume 445) at the same time as one another or synchronized to capture images (and illuminate view volume 445) at different times. Image capture devices 1305, 1310, 1315, 1320, 1325, 1330, 1335, and 1340 are aimed in various directions so that their fields of view cover at least some of view volume 445. The fields of view of image capture devices 1305, 1310, 1315, 1320, 1325, 1330, 1335, and 1340 may overlap one another. FIGS. 14-18 show various examples of the fields of view of the image capture devices. FIG. 14 depicts the fields of view of image capture devices 1320 and 1330 positioned along side arms 430 and 440. FIG. 15 depicts the fields of view of image capture devices 1315 and 1325 positioned along side arms 425 and 435. FIG. 16 depicts the fields of view of image capture devices 1335 and 1340 positioned below conveyors 110. Image capture devices 1335 and 1340 may also serve as sensors 710a, 710b of lateral object sensor system 705. FIG. 17 depicts the fields of view of image capture devices 1305 positioned along top portion 1306. FIG. 18 depicts the fields of view of image capture devices 1310 positioned along top portion 1311.

Figure 19:
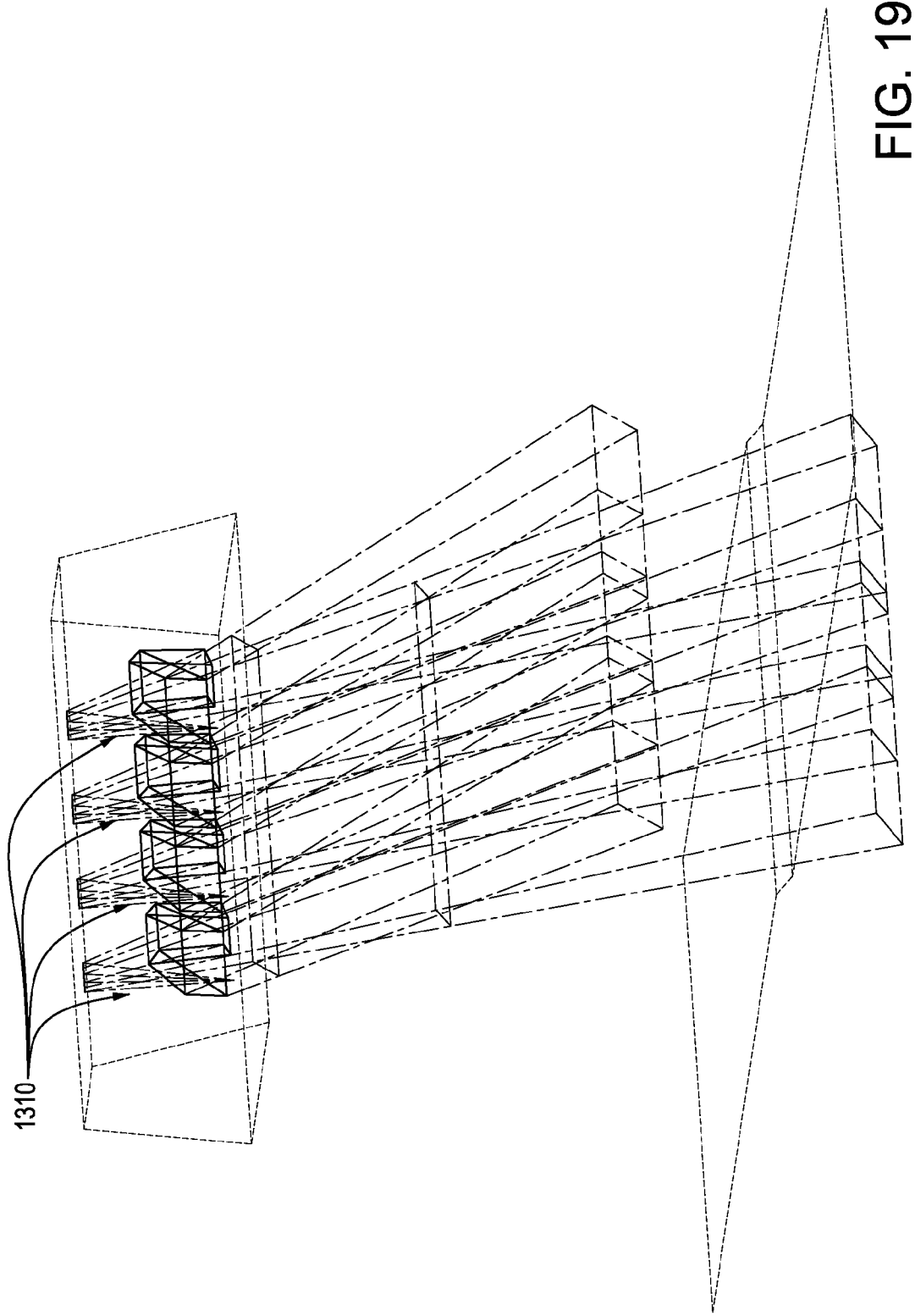
Figure 21B:
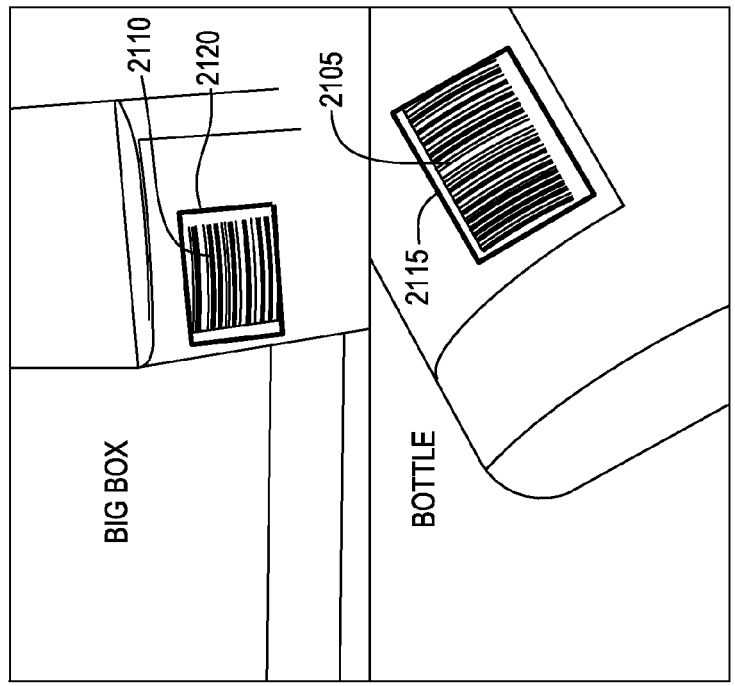
FIG. 21b is an image captured by an image capture device of FIG. 13.
Figure 21A:
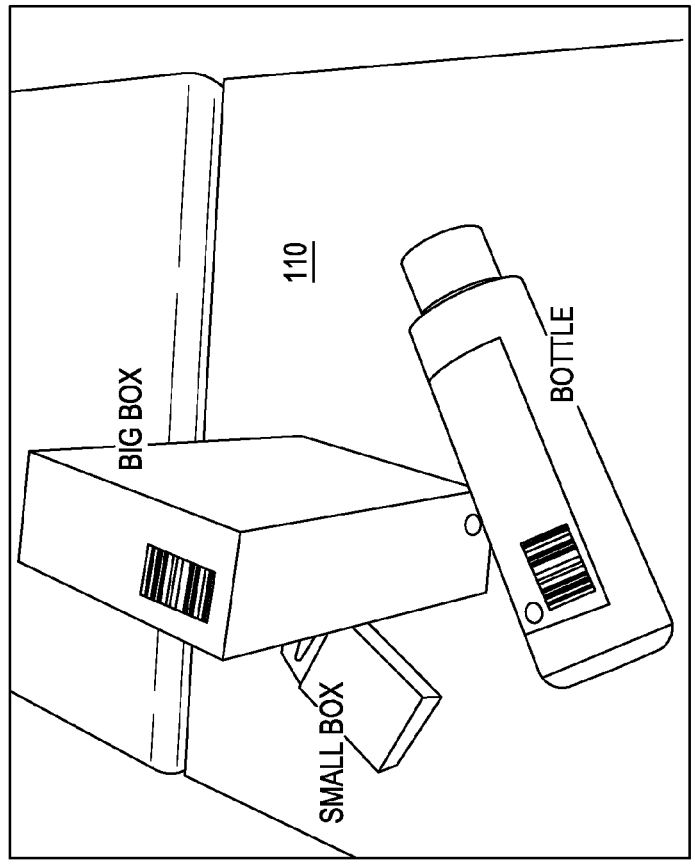
FIG. 21a is a photograph of objects on a conveyor of the automated optical code reading system of FIG. 1.

In one embodiment, the image capture devices 1305, 1310, 1315, 1320, 1325, 1330, 1335, and 1340 include light directing optics (e.g., mirrors, lenses) that split the image capture devices' field of view in two or more views. For example, FIGS. 19 and 20 are, respectively, isometric and side elevation views of the split fields of view of image capture devices 1305. In this example, the fields of view of image capture devices 1305 are split in two—a high field of view and a low field of view. The split fields of view of image capture devices 1305, 1310, 1315, 1320, 1325, 1330, 1335, and 1340 enables them to potentially capture optical codes on more than one object, even in the same frame. For example, FIG. 21a is a rendering of conveyor 110 with a small box, a large box, and a bottle positioned thereon. FIG. 21b is a rendering of an image captured by one of image capture devices 1310 having split fields of view. The low field of view of image capture device 1310 is able to capture an image of an optical code 2105 on the bottle, shown in the bottom half of FIG. 21b, and the high field of view of image capture device 1310 is able to capture an image of an optical code 2110 on the large box, shown in the top half of FIG. 21b. Details of the image capture devices are further described in U.S. Patent Application No. 61/435,777, and U.S. patent application Ser. No. 13/357,356, both applications of which are referenced above.

If an optical code is captured in an image, and if the image of the optical code is of acceptable quality (e.g., resolution, size), optical code reading system 120 reads the optical code and decodes it to add the associated object to a transaction list, for example. In a preferred embodiment, optical code reading system 120 also computes a bounding box that surrounds the optical code. For example, bounding boxes 2115, 2120 are shown surrounding optical codes 2105, 2110 in FIG. 21b. Optical code reading system 120 is configured to use bounding boxes 2115, 2120 to correlate the locations of the optical codes in the image to back projection rays that project from virtual imagers into view volume 445.

Figure 22:
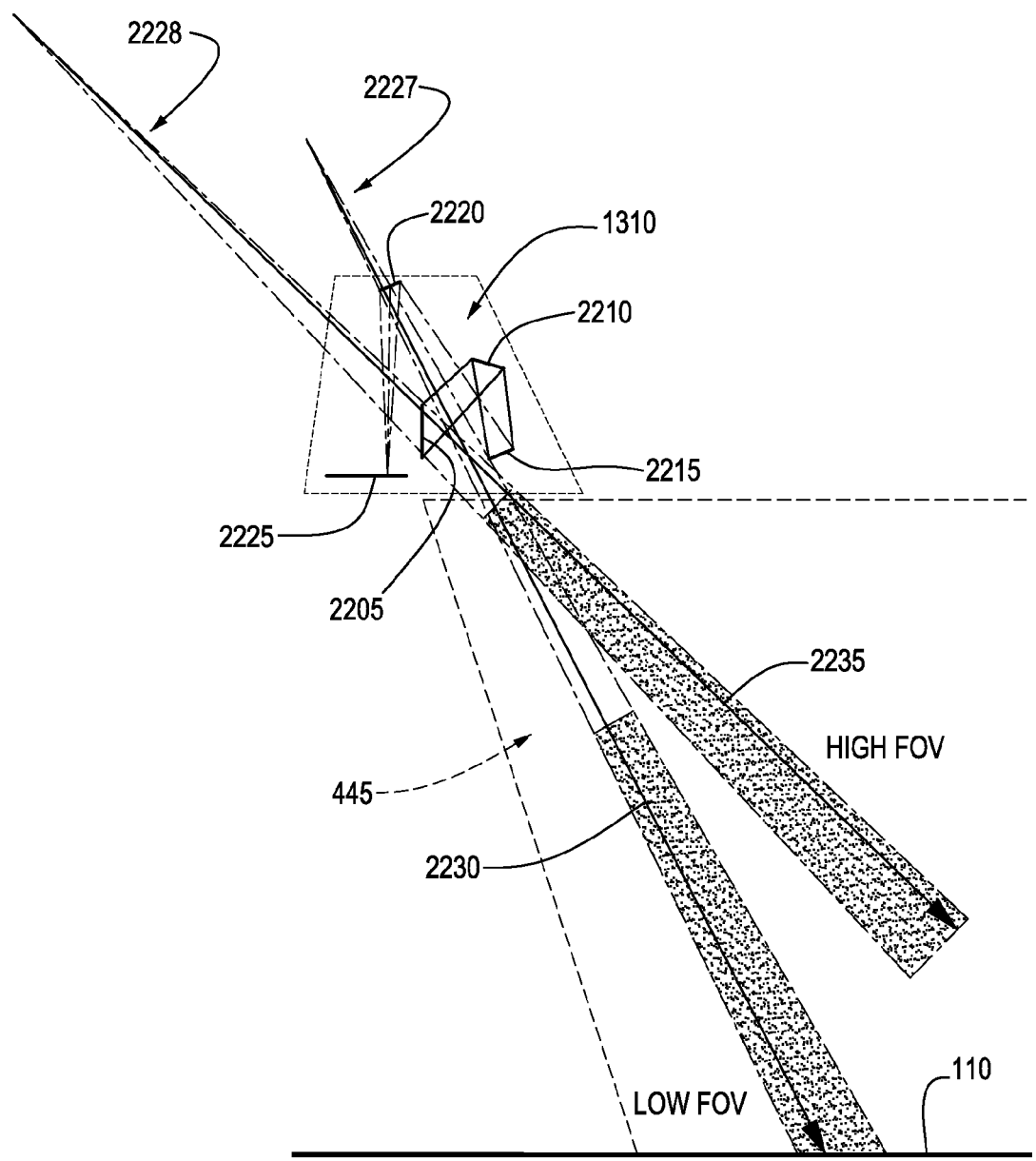
FIG. 22 is a side elevation view of an image capture device of FIG. 13 showing its fields of view and back projection rays generated by the optical code reading system.

FIG. 22 is a side elevation view of image capture device 1310 that captured the image of FIG. 21b. Image capture device 1310 includes mirrors 2205, 2210, 2215, and 2220 that direct light from view volume 445 to an imager 2225. Mirrors 2205, 2210, 2215, and 2220 are arranged to provide two fields of view for imager 2225. Mirrors 2205, 2210, 2215, and 2220 fold or reflect light, and it should be understood that the arrangement (e.g., location, aim) of mirrors 2205, 2210, 2215, and 2220 can be used to model the fields of view as virtual imagers 2227 and 2228. Virtual imager 2227 is aligned with the low field of view, and virtual imager 2228 is aligned with the high field of view. FIG. 22 depicts a back projection ray 2230 corresponding to optical code 2105 and a back projection ray 2235 corresponding to optical code 2110. Back projection rays 2230, 2235 extend from locations on their corresponding virtual imagers 2227, 2228 (or locations on mirrors 2205, 2220) into view volume 445 within their corresponding field of view. The physical locations of optical codes 2105, 2110 lie along their corresponding back projection rays 2230, 2235. These physical locations of optical codes 2105, 2110 are determined by optical code intersection system 125 described in detail below.

To compute back projection rays 2230, 2235, according to one embodiment, optical code reading system 120 uses a pinhole camera model, together with dynamic data and static information. The dynamic data includes information such as the coordinates (e.g., pixel location) of bounding boxes 2115, 2120 and the frame number of the image (which indicates the time the image frame was captured). In one example, centroids (e.g., geometric centers) of bounding boxes 2115, 2120 are computed and used as the coordinates of bounding boxes 2115, 2120. Static information includes the position of the lens of image capture device 1310, its focal length, and its aim vector.

Figure 23:
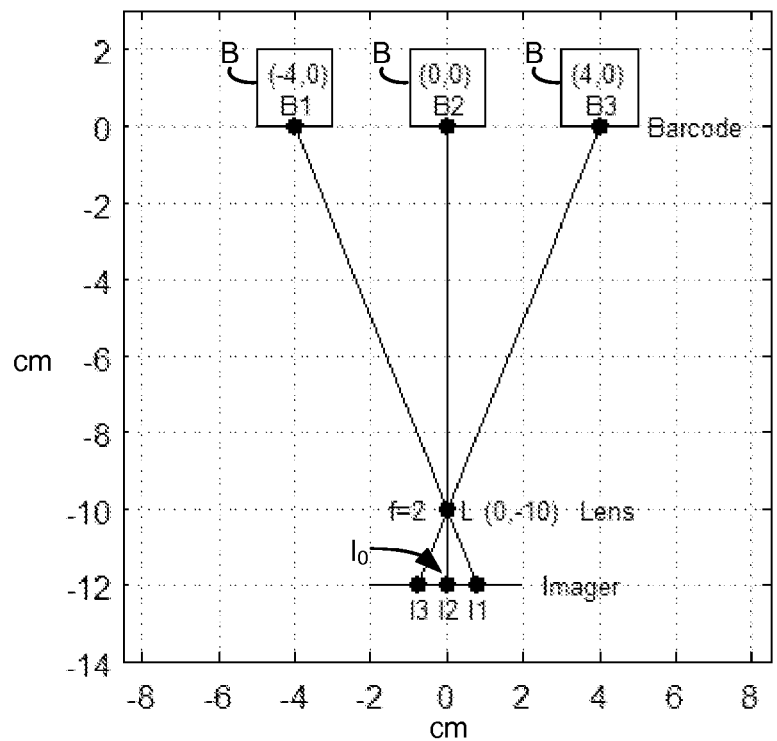
FIG. 23 is a graph representing an object moving through a field of view of an image capture device of FIG. 13.

The following examples demonstrate one example method in which back projection rays may be computed using a pinhole camera model. For simplicity, the following examples are given using a one-dimensional imager in two-dimensional affine space. However, it should be recognized, given the description herein, that the principles, methods, and computations provided in these examples may be applied to a two-dimensional imager in three-dimensional affine space. FIG. 23 is a graph representing an object B moving from left to right in a field of view of an image capture device of optical code reading system 120. Object B contains an optical code, and the image capture device includes a lens at lens point L and an imager. The image capture device captures a first image when a location B1 of the optical code (e.g., the location of the optical code's centroid) is at (−4, 0) cm, a second image when a location B2 of the optical code is at (0, 0) cm, and a third image when a location B3 of the optical code is at (4, 0) cm. The lens point L of the image capture device is located at (0, −10) cm. The pinhole camera model uses a focal length parameter, f, that corresponds to the lens-to-imager distance, which in this example is 2 cm. The center point $I_0$ of the imager, which also corresponds to I2 in this example, is located at (0, −12) cm. An imager plane is defined from point $I_0$ and corresponds to the plane normal to a vector:

$$\vec{n} = L - I_0 \qquad (1)$$

When the first image is captured by the image capture device, the optical code of object B is represented in the first image at a location I1 in the imager plane. Location I1 can be computed as the intersection line connecting lens point L to optical code location B1 and the imager plane. It can be said for a point p on the imager plane that:

$$(p - I_0) \cdot \vec{n} = 0 \qquad (2)$$

where · is the dot product of two vectors. The equation for a line including lens point L and location B1 may be in the form of:

$$p = L + d\vec{v} \qquad (3)$$

where $\vec{v}$ is a line direction vector defined as:

$$\vec{v} = B1 - L \qquad (4)$$

and d is the distance (in units of length of $\vec{v}$) along the line including lens point L and location B1. If d=0, point p in equation 3 is lens point L, and if d=1, point p in equation 3 corresponds to location B1. Setting the points p in equations 2 and 3 equal (i.e., a point on the line including L and B1 equals a point on the imager plane) yields a value of d defining the distance along the line including L and B1. Setting points p in equations 2 and 3 equal yields an equation for d in the form of:

$$d = \frac{(I_0 - L) \cdot \vec{n}}{\vec{v} \cdot \vec{n}} \qquad (5)$$

The point p of intersection with the imager plane is found by substituting d into equation 3—the line equation. Specifically, for the example of FIG. 23 in which the parameters are B1=(−4, 0) cm, L=(0, −10) cm, f=2, $\vec{n}$=(0, 2) cm, $\vec{v}$=(−4, 10) cm, solving for d yields d=−0.2 cm. Thus, the location I1 on the imager plane is equal to (0.8, −12) cm. In this example, a location I2 corresponding to optical code location B2 is equal to (0, −12) cm, and a location I3 corresponding to optical code location B3 is equal to (−0.8, −12) cm.

The above calculations for a point p in the imager plane can be performed in reverse to compute a back projection ray from the imager plane, through lens point L to the optical code locations B1, B2, and B3. For example, if the pixel coordinates of a centroid of an image of an optical code on the imager are known, the pixel offset from the center of the imager can be calculated. This pixel offset can be converted to a distance by multiplying the pixel offset by the pixel size. The distance of the pixel offset can then be used with the other known parameters (e.g., L, f, $\vec{n}$) and the above equations to compute a back projection ray from the pixel coordinates through the lens to the optical code.

Figure 24:
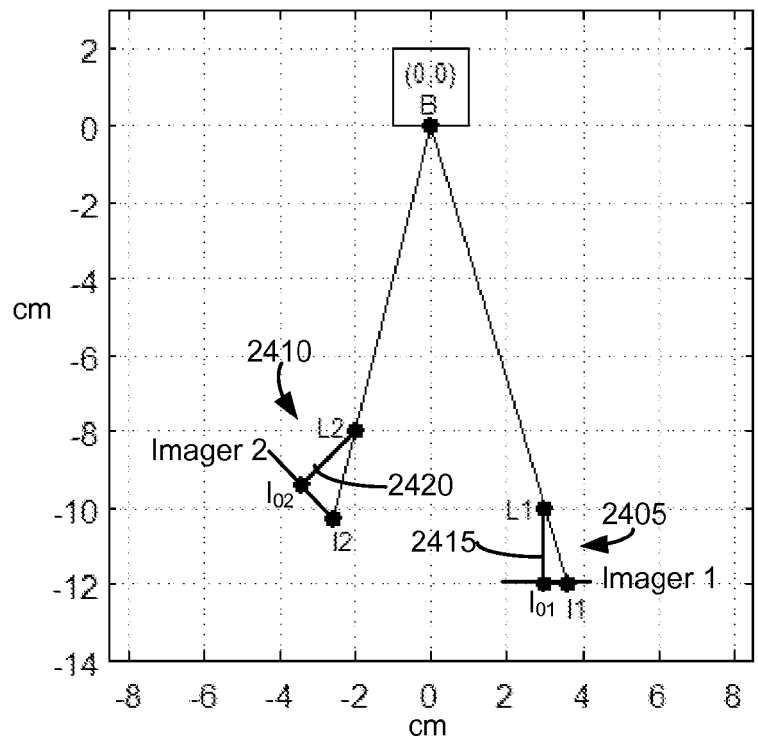
FIG. 24 is a graph representing an object in the field of view of two image capture devices of FIG. 13.

The example of FIG. 23 includes one image capture device. The following example depicted in FIG. 24 corresponds to a scenario in which two image capture devices 2405, 2410 capture images of the optical code on object B and back projection rays are computed for both devices 2405, 2410. FIG. 24 shows the geometry of devices 2405, 2410 in which a lens point L1 of device 2405 is at (3, −10) cm and a lens point L2 of device 2410 is at (−2, −8) cm. Imager 1 and Imager 2 of devices 2405, 2410 are arranged to provide a focal length, f, of 2 cm. A vector 2415 from the center point $I_{01}$ of imager 1 to lens point L1 indicates the aim of device 2405, and a vector 2420 from the center point $I_{02}$ of imager 2 to lens point L2 indicates the aim of device 2410. Device 2405 aims vertically with a vector direction (0, 1) cm, and device 2410 aims at a 45° angle, with a vector direction of (1, 1) cm. Using equations (1)-(5) above, a location I1 corresponding to an image of the centroid of object B's optical code on imager 1 is equal to about (3.6, −12) cm, and a location I2 corresponding to an image of the centroid of object B's optical code on imager 2 is equal to about (−2.57, −10.26) cm. The magnitude of vectors (I1−$I_{01}$) and (I2−$I_{02}$) defines the distance offset from the center of imager 1 and imager 2 to the images of the centroid of the optical code on object B. In this simplified example, the distance offset for device 2405 is 0.6 cm, and the distance offset for device 2410 is 1.2 cm. Dividing the distance offsets by the pixel size yields the offset in pixels from the center pixels of imagers 1, 2. The back projection ray from location I1 through L1 to the centroid of the optical code on object B, and the back projection ray from location I2 through L2 to the centroid of the optical code on object B, can be calculated using one or more of equations (1)-(5) and known parameters (e.g., distance offset of I1 and I2 from the center pixel, focal length, aim of devices).

Although optical code reading system 120 has been described as including image capture devices to capture images of optical codes to decode them, optical code reading system 120 may include, in addition to or in place of the image capture devices, a laser-based scanning system to detect and decode the optical codes of objects. The positioning and aim of lasers of the laser-based scanning system may be used to generate back projection rays that project into view volume 445 along paths corresponding to those of laser beams generated by the lasers.

IV. Optical Code Intersection System

After optical code reading system 120 computes a back projection ray for an optical code, the projection data representing the back projection ray is communicated to optical code intersection system 125. Optical code intersection system 125 also receives the object's model data generated by object measurement system 115. From the projection data and the model data, optical code intersection system 125 determines whether the back projection ray intersects the three-dimensional model of the object.

In a preferred embodiment, optical code intersection system 125 attempts to intersect the back projection ray with the three-dimensional model of the object after the object leaves view volume 445. In an alternative embodiment, optical code intersection system 125 may attempt the intersection as soon as the three-dimensional model is generated by object measurement system 115 and the back projection ray is generated by optical code reading system 120. A back projection ray may be generated right after an optical code is decoded from an image. A three-dimensional model and its location may be generated based on an estimate derived from incomplete modeling data produced by object measurement system 115 up to the point that the back projection ray is generated, and optical code intersection system 125 may determine whether the back projection ray intersects the three-dimensional model. The intersection determination may be performed multiple times as the object moves through view volume 445 and as new decodable images of the optical code are captured, which may improve system 100's ability to handle objects that roll or fall while in view volume 445.

The following description pertains to the preferred embodiment in which the intersection is attempted after the object leaves view volume 445. If the object is tall enough to block one or more elements 422 of vertical object sensor system 410, optical code intersection system 125 attempts the intersection once the exiting light curtain 415 or 420 becomes unblocked. If the object is relatively short (e.g., a greeting card) so that elements 422 are not blocked, optical code intersection system 125 attempts the intersection a certain time delay (e.g., a time delay coordinated with the speed of conveyors 110) after the object unblocks the trailing sensor(s) of lateral object sensor system 705.

In addition to attempting the intersection after the object leaves view volume 445, generation of the back projection ray and the three-dimensional model may occur after the object leaves view volume 445. In one example, each image capture device of optical code reading system 120 is assigned a camera identification number. In real time and for each image capture device that captures an image from which an optical code is decoded, optical code reading system 120 records the camera identification number, image frame number, and location (e.g., centroid location) of the optical code in the image. When the object exits view volume 445, this recorded information is used to derive a back projection ray for the image by considering the image capture device's lens location, aim, and focal point. The amount of time that has elapsed from the time that the optical code was decoded to the time the back projection ray is calculated (e.g., the time when the object leaves view volume 445 and the three-dimensional model is generated) is determined using the image frame number information recorded for the decoded optical code. The elapsed time may be converted to a distance by dead reckoning—assuming the object has moved at a constant velocity for the elapsed time. The back projection ray is advanced by this distance to match the current location of the object and its three-dimensional model. Optical code intersection system 125 then determines whether the back projection ray intersects the three-dimensional model of the object. If multiple back projection rays are generated (from the same image capture device or from multiple image capture devices), the back projection rays should intersect the three-dimensional model at or near the same point if they correspond to the same optical code.

Figure 25:
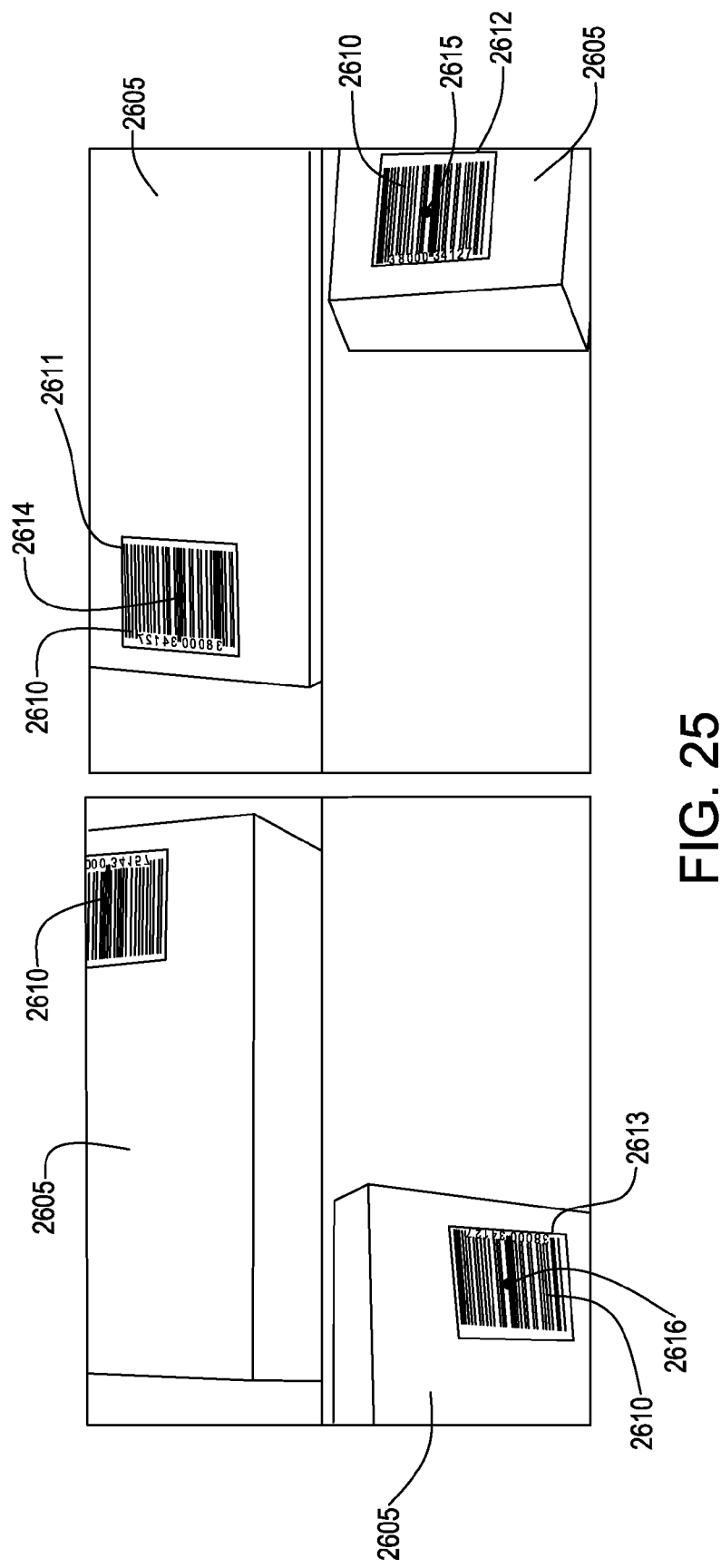
FIG. 25 shows renderings of two images of an object captured by two image capture devices of FIG. 13 according to one example.
Figure 26:
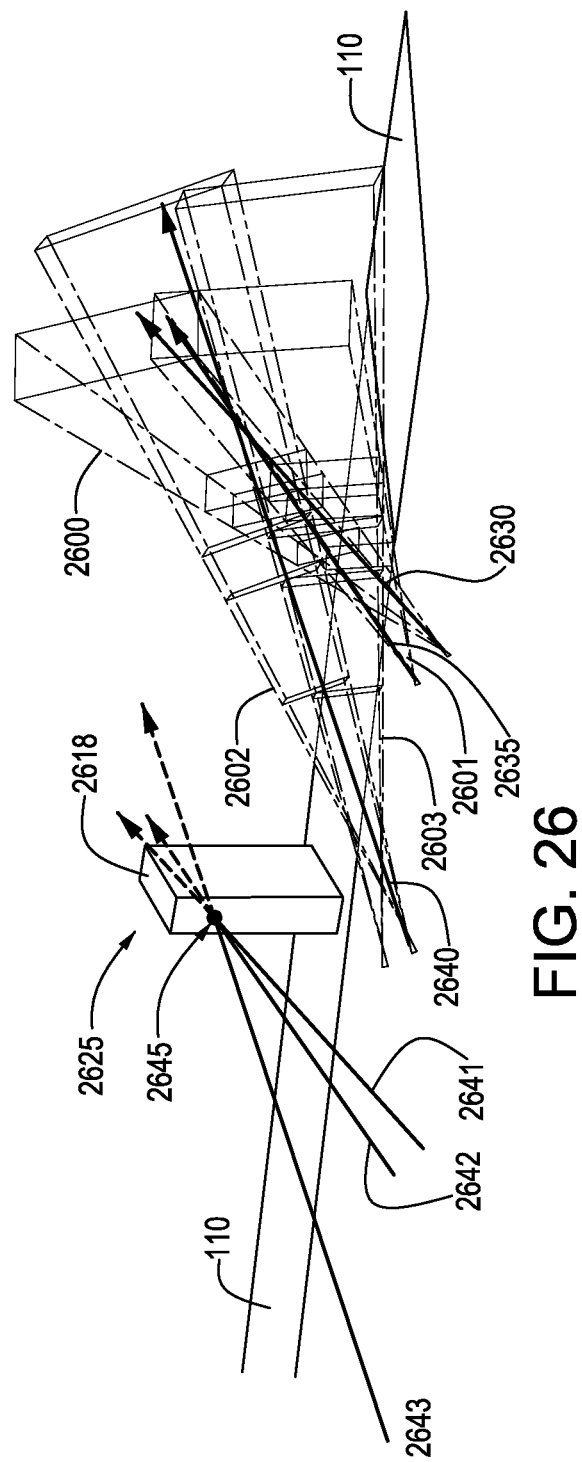
FIG. 26 is an isometric view of the fields of view of the image capture devices that captured the images of FIG. 25 and a three-dimensional model generated by the object measurement system of the automated optical code reading system of FIG. 1.

FIGS. 25 and 26 correspond to one example of the processes and methods performed by object measurement system 115, optical code reading system 120, and optical code intersection system 125. FIG. 25 shows two renderings corresponding to images captured by image capture devices 1320 and 1330 shown in FIG. 13. The rendering at the right corresponds to the image captured by image capture device 1330 when the optical code was in the fields of view of device 1330, and the rendering at the left corresponds to the image captured by image capture device 1320 when the optical code was in the fields of view of device 1320. FIG. 26 shows fields of view 2600, 2601 of image capture device 1330 and fields of view 2602, 2603 of image capture device 1320. The top half of the rendering at the left in FIG. 25 corresponds to field of view 2603; the bottom half of the rendering at the left in FIG. 25 corresponds to field of view 2602; the top half of the rendering at the right in FIG. 25 corresponds to field of view 2601; and the bottom half of the rendering at the right in FIG. 25 corresponds to field of view 2600. As shown in FIGS. 25 and 26, the fields of view of image capture devices 1320, 1330 are split in two.

As an object 2605 moves along conveyors 110 and through fields of view 2600, 2601, 2602, 2603, devices 1320, 1330 capture the images of the object 2605 as shown in FIG. 25. The images corresponding to fields of view 2600, 2601, 2602 include decodable images of an optical code 2610 on object 2605, while the image corresponding to field of view 2603 includes only part of optical code 2610. Optical code reading system 120 decodes optical code 2610 for the images corresponding to fields of view 2600, 2601, 2602 and records the locations of optical code 2610 in the images. In one example, optical code reading system 120 computes bounding boxes 2611, 2612, 2613 and centroids 2614, 2615, 2616 for optical code 2610 and uses centroids 2614, 2615, 2616 as the locations of optical code 2610 in the images.

As object 2605 moves along conveyors 110, object measurement system 115 measures object 2605 using one or both of vertical object sensor system 410 and lateral object sensor system 705. From the measurements, object measurement system 115 generates a three-dimensional model 2618 of object 2605. Object measurement system 115 uses known parameters such as conveyor belt speed to translate three-dimensional model 2618 along conveyors 110 to a position 2625 corresponding to a reference position, such as the downstream edge of the view volume.

Once object 2605 leaves the view volume, optical code reading system 120 computes back projection rays 2630, 2635, 2640. The frame number(s) in which the images of FIG. 25 were captured and the speed of conveyors 110 are used to determine a distance to longitudinally translate back projection rays 2630, 2635, 2640 along conveyors 110 to correspond to a reference position, such as the downstream edge of the view volume; and back projection rays 2630, 2635, 2640 are translated the distance (represented by corresponding back projection rays 2641, 2642, 2643) to coincide with position 2625 of the translated three-dimensional model 2618 of object 2605. Optical code intersection system 125 then determines whether back projection rays 2641, 2642, 2643 intersect with three-dimensional model 2618. As shown in FIG. 26, back projection rays 2641, 2642, 2643 intersect three-dimensional model 2618 at a point 2645 on three dimensional model 2618.

It should be recognized, given the description herein, that if multiple back projection rays from different image capture devices, or from multiple frames captured by the same image capture device, are calculated, triangulation may be used to determine the physical location of an optical code even without intersecting the back projection rays with a three-dimensional model of an object. For example, point 2645 at which back projection rays 2641, 2642, 2643 intersect corresponds to the physical location of optical code 2610 on object 2605. Knowing the physical location of optical code 2610 and what image capture devices captured optical code 2610 provides system 100 with spatial information about object 2605, even if system did not implement object measurement system 115.

In some applications, the intersection of two or more back projection rays may be unlikely due to numeric precision issues, noise, and other system defects. In such a case, the minimal distance between non-intersecting back projection rays (e.g., skew lines) may be calculated, as described in the example below, to determine whether the minimum distance is at or below a given tolerance. If the minimum distance is below the given tolerance, system 100 determines that the back projection rays correspond to the same optical code. For example, if the back projection ray from device 2405 of FIG. 24 is in the form of the line equation:

$$p1 = L1 + d1\vec{v1} \quad (6)$$

where $$\vec{v1} = L1 - I1, \quad (7)$$

and the back projection ray from device 2410 is in the form of the line equation:

$$p2 = L2 + d2\vec{v2} \quad (8)$$

where $$\vec{v2} = L2 - I2, \quad (9)$$

then the perpendicular to the back projection rays is:

$$\vec{m} = \frac{\vec{v1} \times \vec{v2}}{norm(\vec{v1} \times \vec{v2})} \quad (10)$$

where × is the vector cross product. The distance d3 between the back projection rays is:

$$d3 = norm(\vec{m} \cdot (L1 - L2)) \quad (11)$$

If d3 is at or below the given tolerance (e.g., a tolerance of 1-10 millimeters), then optical code intersection system 125 determines that the back projection rays correspond to the same optical code.

V. Exception Identification System

From the results of optical code intersection system 125, exception identification system 130 can determine whether one or more of various types of exceptions occur. If an ideal case occurs in which all back projection rays that intersect a three-dimensional model of a single object correspond to the same optical code at the same location on the object, and if there was at least one back projection ray that intersected the three-dimensional model of the object, exception identification system 130 may indicate (e.g., through one or more of a visual indicator or an audio indicator) that a normal "good read" occurred. However, various types of exceptions to the ideal case may occur and be identified by exception identification system 130. Exception identification system 130 can be programmed to identify various types of exceptions and assign exceptions to categories and sub-categories. The following list includes some of the types and subtypes of exceptions that may be identified by exception identification system 130:

1) The number of objects that are modeled by object measurement system 115 does not equal the number of optical codes decoded by optical code reading system 120;
   a) "No code" exception: A three-dimensional model is generated by object measurement system 115, but no back projection ray intersects the three dimensional model (e.g., an object passes through view volume 445, but an optical code is not decoded by optical code reading system 120);
   b) "Multiple code" exception: Multiple back projection rays intersect a single three-dimensional model, and different optical codes are associated with the back projection rays (e.g., an object passes through view volume 445 and multiple different optical codes are associated with it);
   c) "No object" exception: A back projection ray is generated that does not intersect a three-dimensional model of an object (e.g., an optical code is decoded by optical code reading system 120 but object measurement system 115 does not detect an object);
   d) "Multiple object" exception: A back projection ray is generated that intersects more than one three-dimensional model (e.g., multiple closely-spaced objects are in view volume 445 at the same time).
2) An optical code associated with an object suddenly moves on the object;
   a) Back projection rays do not intersect the three-dimensional model of the object at the same location (e.g., the object rolls or falls while in view volume 445);
3) Two or more objects are too close to one another.

Other types of exceptions may be detected and handled, and as new exceptions arise that are of interest to an operator, exception identification system 130 may be programmed to identify these new exceptions. In one example, exception identification system 130 may be configured to recognize when the dimensions of an object do not correspond with the physical dimensions of an object associated with the decoded optical code. For example, the three-dimensional model is used to calculate a measured size (e.g., a volume, a footprint area, a side profile area) of the object. The decoded optical code associated with the object is used (e.g., by a price look up unit) to search through stored object information including the expected size (e.g., volume, footprint area, side profile area) of different objects. The expected object size associated with the optical code is compared to the measured size to determine whether the expected and measured sizes are compatible (e.g., whether the absolute difference between the expected and measured sizes is at or below a selected threshold). For example, if the volume of the object is measured and compared to a stored value of the expected volume, an exception may be indicated if the measured volume differs from the expected volume by more than 25%. A 25% threshold is just one example, and other thresholds are contemplated. If the sizes are incompatible (e.g., the measured size is a relatively large, like that of a television, but the optical code corresponds to a greeting card), exception identification system 130 generates an exception and the object may be flagged as a suspicious object.

The expected sizes of objects may be manually keyed into system 100 and stored therein (e.g., stored in database 140 or another database), or a database of expected sizes for different objects may be automatically created by system 100 during a training routine as object measurement system 115 measures the objects and as optical code intersection system 125 associates read optical codes with the measurements. The expected sizes may also be generated (or updated) over time during real-time operation as system 100 conducts transactions with different objects.

In another example, exception identification system 130 may not be 100% confident that an optical code corresponds to an object. For example, only one optical code is associated with an object, but back projection rays of the optical code intersect the three-dimensional model at different locations. Accordingly, exception identification system 130 may generate a confidence level that is indicative of how confident exception identification system 130 is in its decision that an exception does or does not exist.

Figure 27:
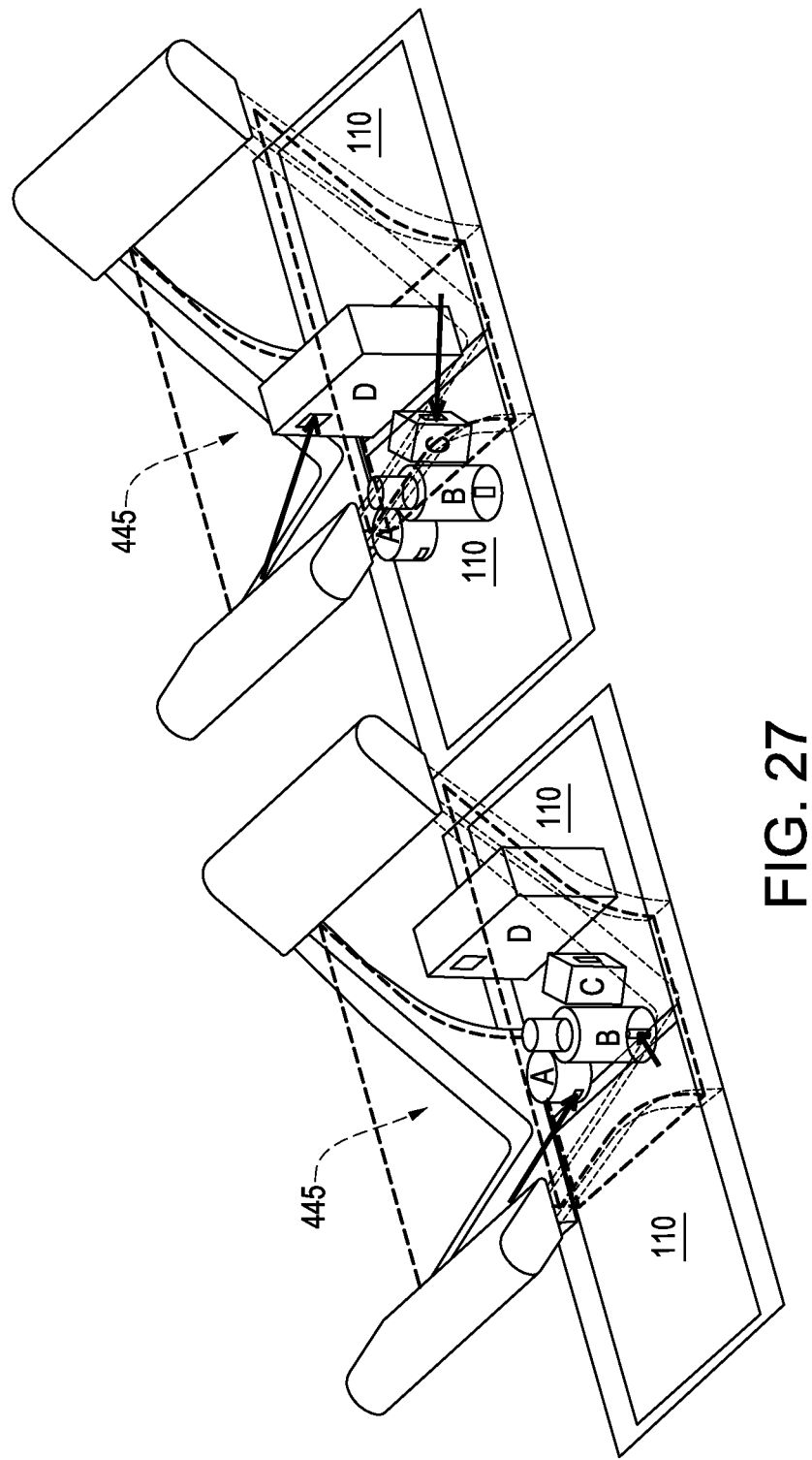
FIG. 27 includes two isometric views of multiple objects passing through a view volume of the optical code reading system of the automated optical code reading system of FIG. 1.

In another example, exception identification system 130 can also recognize when multiple objects are in view volume 445 simultaneously and whether each of those objects has only one optical code associated with it. FIG. 27 includes two isometric views of four objects A, B, C, D moving along conveyors 110 through view volume 445 from right to left. In the left isometric view, optical codes on objects A, B are in view volume 445 at the same time. In the right isometric view, optical codes on objects C, D are in view volume 445 at the same time. Object measurement system 115 generates three-dimensional models of the objects A, B, C, D. When the optical codes of objects A, B are in view volume 445, different image capture devices of optical code reading system 120 capture images of the optical codes and system 120 decodes the optical codes and generates back projection rays for them. When the optical codes of objects C, D are in view volume 445, different image capture devices of optical code reading system 120 capture images of the optical codes and system 120 decodes the optical codes and generates back projection rays for them. Optical code intersection system 125 intersects the back projection rays with the corresponding three-dimensional models. In this example, the back projection rays intersect only one of the three-dimensional models. Exception identification system 130 recognizes that objects A, B were in view volume 445 at the same time and that objects C, D were in view volume 445 at the same time, but that only one back projection ray intersected each of the three-dimensional models of objects A, B, C, D. Exception identification system 130 recognizes this example as multiple "good reads."

Figure 28:
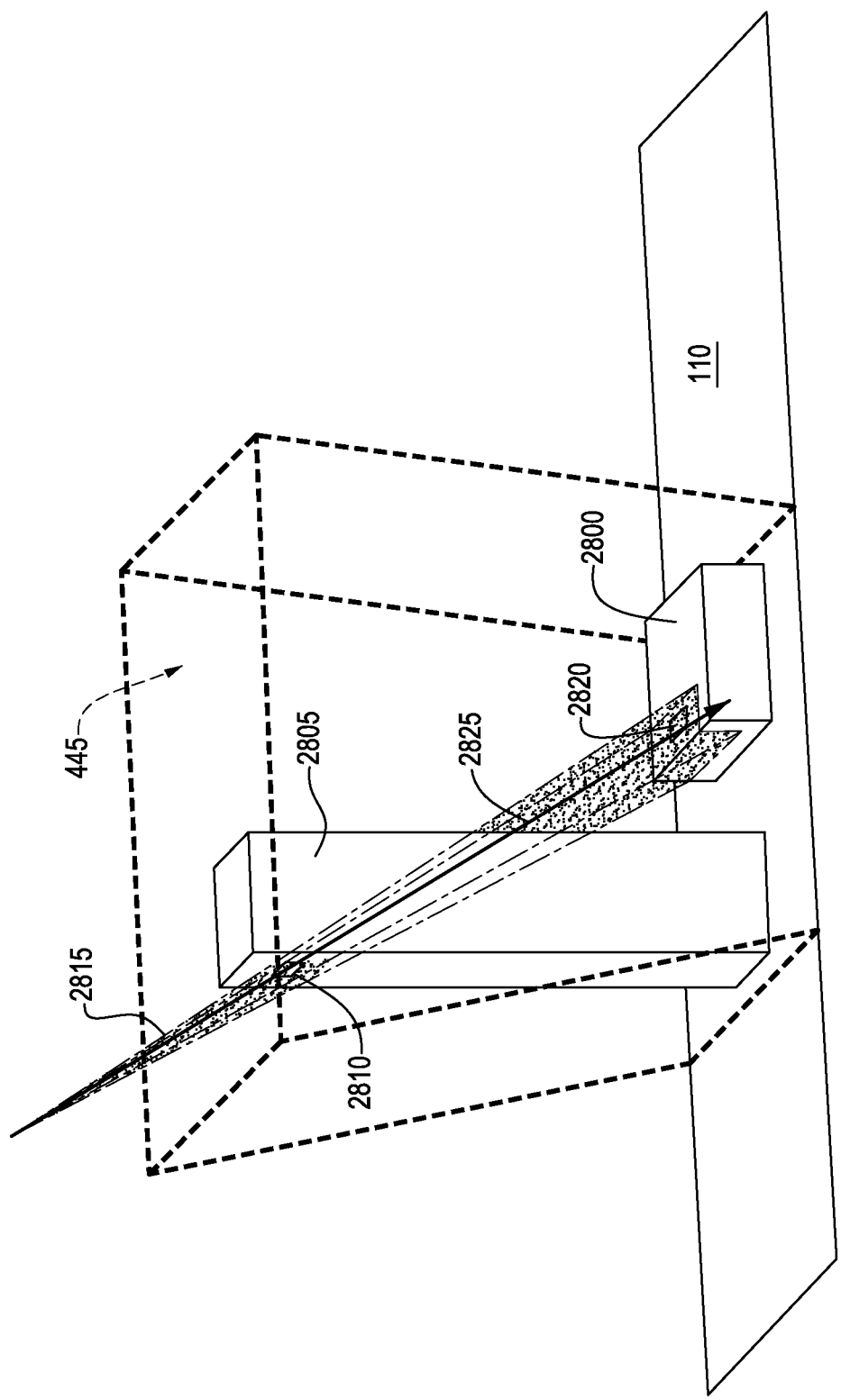
FIG. 28 is an isometric view of two objects in the view volume of the optical code reading system in which one of the objects blocks an optical code of the other object from a field of view of an image capture device.

Exception identification system 130 can also recognize when multiple objects are in view volume 445 and a back projection ray intersects more than one three-dimensional model of an object. For example, FIG. 28 is an isometric view of objects 2800, 2805 moving from left to right on conveyor 110 through view volume 445. An optical code 2810 of object 2805 is in a field of view 2815 of an image capture device of optical code reading system 120. An optical code 2820 of object 2800 would also be in field of view 2815, but object 2805 blocks field of view 2815. A back projection ray 2825 is generated for optical code 2810 that intersects both objects 2800, 2805.

In one embodiment, object 2800 will exit view volume 445 first and a three-dimensional model of object 2800 will be generated before object 2805 exits view volume 445. Because ray 2825 intersects object 2800, optical code intersection system 125 may incorrectly assign optical code 2810 to object 2800. If another image capture device of optical code reading system 120 captures a decodable image of optical code 2820 and a back projection ray is generated from that image, object 2800 may have two optical codes associated with it. Exception identification system 130 may, thus, generate a "multiple code" exception for object 2800. Moreover, because optical code 2810 may be associated with object 2800, when object 2805 leaves view volume 445, no optical code may be associated with object 2805, and exception identification system 130 may generate a "no code" exception for object 2805.

To avoid the "multiple code" exception for object 2800 and the "no code" exception for object 2805, exception identification system 130 identifies that objects 2800, 2805 are in view volume 445 simultaneously through measurement data generated by object measurement system 115, and optical code intersection system 125 delays attempting to intersect ray 2825 (and any other rays associated with images of optical code 2820) with the three-dimensional model of object 2800 until the three-dimensional model of object 2805 is generated (e.g., until object 2805 exits view volume 445). Thus, optical code intersection system 125 may be configured to determine that ray 2825 intersects both object 2800 and object 2805. Exception identification system 130 recognizes that ray 2825 intersects both objects 2800, 2805 and generates a "multiple objects" exception for optical code 2815. If back projection rays, including ray 2825, generated from images of optical code 2810 are the only back projection rays that intersect the three-dimensional model of object 2805, exception handling system 135, described in more detail below, may automatically resolve the "multiple objects" exception by assigning optical code 2810 to object 2805, which may leave back projection rays generated from images of optical code 2820 as the only back projection rays that intersect the three-dimensional model of object 2800 so that optical code 2820 can be assigned to object 2800.

Figure 29:
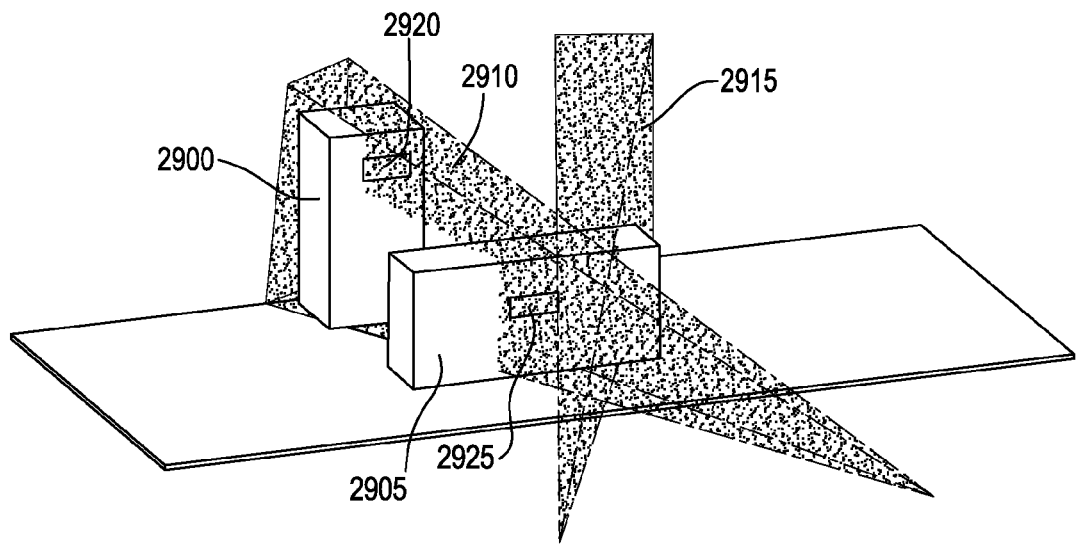
FIG. 29 is an isometric view of two objects traveling side-by-side through fields of view of image capture devices of the optical code reading system of the automated optical code reading system of FIG. 1.
Figure 30:
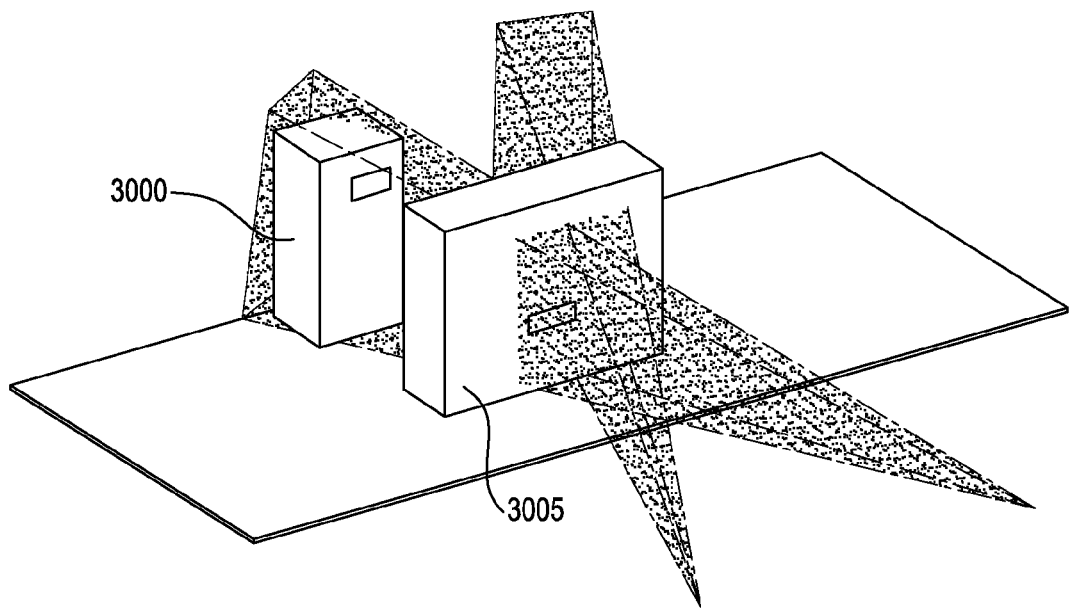
FIG. 30 is an isometric view of three-dimensional models generated for the objects of FIG. 29.

In another example, object measurement system 115 may not be able to generate confident measurements when multiple objects are in view volume 445 at the same time. FIG. 29 is an isometric view of objects 2900, 2905 traveling side-by-side past fields of view 2910, 2915 of side image capture devices. Vertical object sensor system 410 measures the height of objects 2900, 2905, but cannot measure their lateral position. Lateral object sensor system 710 measures the lateral position of objects 2900, 2905, but cannot measure their height. These measurement limitations may lead to an ambiguity when objects 2900, 2905 are not the same height and their optical codes 2920, 2925 are facing the side image capture devices as shown in FIG. 29. For example, when generating three-dimensional models 3000, 3005 of objects 2900, 2905, as shown in FIG. 30, object measurement system 115 may assume incorrectly that objects 2900, 2905 are the same height and optical code intersection system 125 may associate both optical codes 2920, 2925 with object 2905. However, this exception may be resolved by taking into consideration back projection rays produced from images captured by both of the side image capture devices and identifying which three-dimensional model 3000 or 3005 best intersects the back projection rays at the same location on the three-dimensional model. This exception may also be resolved by additional object sensing hardware (e.g., a light stripe triangulation range finder) that is able to distinguish height differences of objects 2900, 2905.

When exception identification system 130 identifies an exception, exception identification system 130 is operable to generate exception category identification information corresponding to the exception. The exception category identification information may include various types of data and information. In one example, the exception category identification information includes a category label that identifies the type of the exception and data generated by systems 115, 120, 125 such as: three-dimensional model data, data identifying whether an optical code was decoded, data identifying the type of object based on a decoded optical code, image data representing images of the optical code, image data representing images of the object, a confidence level representing how confident exception identification system 130 is that an optical code is associated with an object, and the like.

VI. Exception Handling System

Once exception identification system 130 identifies an exception and generates the exception category identification information, exception handling system 135 determines how to resolve the exception. Exceptions can be resolved in various ways such: as ignoring the exception, automatically resolving the exception, and/or manually resolving the exception. Exception handling system 135 may be user-programmable to handle various exceptions in different ways.

Figure 31:
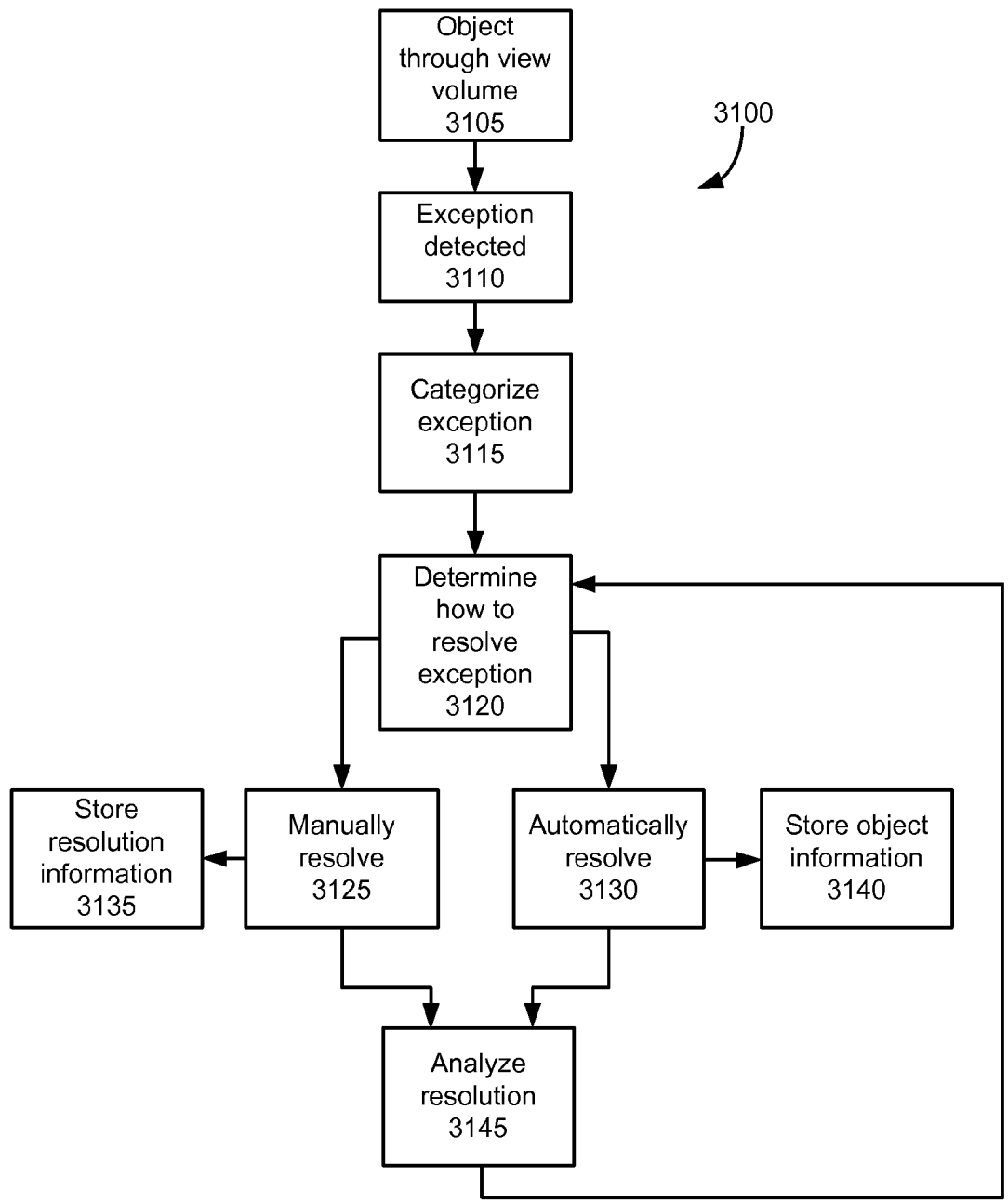
FIG. 31 is a flowchart of a process performed by an exception handling system of the automated optical code reading system of FIG. 1.

FIG. 31 is a flowchart showing one example of a process 3100 that may be implemented by exception handling system 135 in combination with other parts of system 100. First, an object passes through view volume 445 (step 3105). Object measurement system 115 attempts to generate a three-dimensional model of the object; optical code reading system 120 attempts to decode an optical code, if any, by capturing images of the object; and optical code intersection system 125 attempts to intersect back projection rays, if any, generated by optical code reading system 120 with the three-dimensional model of the object. If the ideal case does not occur in which a single optical code is associated with the object and found to be at a stationary location on the object, exception identification system 130 may detect that an exception occurred (step 3110). Exception identification system 130 categorizes the exception into one or more categories and/or sub-categories and generates exception category identification information for the exception (step 3115).

Exception handling system 135 receives the exception category identification information and uses the category label of the exception to determine how to resolve the exception (step 3120). In one example, exception handling system 135 determines that the exception should be manually resolved based on the type of exception (step 3125). In another example, exception handling system 135 determines that the exception should be automatically resolved based on the type of exception (step 3130). Exception handling system 135 can be programmed to resolve the exception differently for different applications. For example, the way in which exception handling system 135 resolves the exception may be configured to account for the location at which the exception occurred (e.g., the end-user facility, grocery store, auto parts store), the time of day the exception occurred, whether other exceptions have occurred within a certain period (e.g., the exception rate), the price of the object, or some other suitable criteria. According to one example in which system 100 is deployed in a grocery store that has a high customer volume between 4-7 pm, exception handling system 135 may be programmed to automatically resolve (e.g., ignore) certain types of exceptions that occur between 4-7 pm, such as exceptions that are associated with objects that cost $1 or less. During other store hours, exception handling system 135 may determine that all exceptions, including those associated with objects that cost $1 or less should be manually resolved (e.g., system 100 requests operator assistance to manually enter object information). In another example, exception handling system 135 may be programmed to ignore exceptions corresponding to low-cost objects until a selected number (e.g., 5) of those exceptions occur within a selected amount of time (e.g., 30 seconds).

If exception handling system 135 determines that the exception should be manually resolved, an operator (e.g., a checkout clerk) is notified (e.g., by lack of a "good read" alert for the object, or by an audible or visual exception alarm) that the exception needs to be resolved by the operator. The operator resolves the exception in one of several ways. For example, the operator may choose to ignore the exception, the operator may scan the optical code of the object with an optical code scanner, or the operator may type in a number (e.g., a UPC number) associated with the optical code. Information corresponding to the way in which the operator resolves the exception is stored in storage device 140 for use by exception handling system 135 (step 3135). Additionally, the exception category identification information may be stored in storage device 140.

When exception handling system 135 determines that the exception should be automatically resolved, the exception can be resolved in various ways. For example, the exception can be ignored. In another example, conveyors 110 can be stopped and/or reversed so that the object can travel through view volume 445 again. In another example, an alternative system, such as an object recognition system that uses extracted visual features (e.g., scale-invariant features, such as scale-invariant feature transformation (SIFT) features) to identify an object, or an optical character recognition system that can recognize an optical code from its printed value, may be automatically employed to resolve the exception. In another example, a mechanical arm or other device may automatically push the object to the side of conveyors 110 (e.g., in an exception bin) for further handling. In another example, a visual indication can be generated by object annotation system 145 and displayed on display 150 as described in more detail below. When the exception is automatically resolved, the exception category identification information is stored in storage device 140 (step 3140). In one example, information corresponding to the way in which the exception was automatically resolved is stored in storage device 140.

In another example, exception handling system 135 may be configured to automatically resolve "multiple codes" exceptions by taking into account size (e.g., volume) data associated with a three-dimensional model and the optical codes whose back projection rays intersect the three-dimensional model. For example, if three objects are positioned too close together on conveyors 110, object measurement system 115 may generate a single three-dimensional model that encompasses the three objects. Optical code reading system 120 may read the three optical codes, and optical code intersection system 125 may intersect back projection rays of the three optical codes with the single three-dimensional model. Exception handling system 135 may resolve this "multiple codes" exception by retrieving from a database the expected sizes (e.g., volumes) associated with the three optical codes and summing the expected sizes. Exception handling system 135 may then compare the summed sizes to the measured size of the single three-dimensional model. If the absolute difference between the summed sizes and the measured size is at or below a selected threshold (signifying that all three of the objects are represented by the single three-dimensional object), then exception handling system 135 may automatically resolve the "multiple codes" exception by adding the three objects to the transaction. For example, suppose that two objects, such as two cans of soup, each with volumes of about 32 cubic inches, are placed on top of each other on conveyors 110. Suppose that the measured volume as computed by object measurement system 115 is 60 cubic inches, and suppose that the selected threshold is 25%. The measured volume is within 25% of the sum (64 cubic inches) of the volumes of the individual objects, and, accordingly, exception handling system 135 may automatically resolve the "multiple codes" exception by adding the two objects to the transaction.

Exception handling system 135 is configured to analyze the information stored in storage device 140 corresponding to a resolution of the exception to determine whether to modify how future exceptions (e.g., future exceptions with the same category label) are to be resolved (step 3145). For example, if a certain type of exception is being resolved manually and the operator ignores the exception most of the time (e.g., ≥70% of the time), exception handling system 135 may decide to automatically ignore future exceptions of that type. In another example, if analysis of the information stored in data storage system 140 indicates that a high percentage of exceptions (e.g., ≥50% exceptions) are occurring for objects of a certain size, exception handling system 135 can be automatically configured to ensure that exceptions corresponding to objects of that size are manually resolved.

Moreover, the information stored in storage device 140 may be analyzed to determine whether to improve other parts of system 100 including, for example, conveyor system 105 (e.g., adjust conveyor speed), object measurement system 115 (e.g., adjust sensors of vertical object sensor system 410 and/or lateral object sensor system 705), optical code reading system 120 (e.g., adjust image capture devices), optical code intersection system 125, and exception identification system 130. The information stored in storage device 140 may also be analyzed to detect certain patterns that may indicate ways in which customers and/or system operators attempt to compromise system 100 (e.g., arrange objects in a certain manner to steal one or more of them). Exception handling system 135 may then be programmed to pay particular attention to exceptions that may indicate that system 100 is being compromised.

In another example, information stored in storage device 140 may be utilized to assist an operator (e.g., a store manager) in managing inventory files. For example, exception identification system 130 may identify that an optical code is associated with an object, but that the optical code has not been set up in the user's inventory file. An image of the object and the decoded information from the optical code may be stored in storage device 140 and used to notify the operator that the object and its associated optical code information need to be added to the operator's inventory file.

VII. Object Annotation System

Once an exception is identified by exception identification system 130, exception handling system 135 may determine that a visual indication of the exception is to be generated to assist an operator in identifying the object associated with the exception. When a visual indication is to be generated, exception handling system 135 calls on object annotation system 145 to create the visual indication. Object annotation system 145 receives image data from an image capture device, such as one of the image capture devices of optical code reading system 120 or one of security image capture devices 3200, 3205 positioned on data capture devices 111, 112 as shown in FIG. 2. Security image capture devices 3200, 3205 preferably include color imagers to produce color images of view volume 445. One or more artificial illumination sources may be positioned near security image capture devices 3200, 3205 and illuminate the object when security image capture devices 3200, 3205 capture images of the object. Model data from object measurement system 115 may be used to determine which image capture device to use to create the visual indication. For example, the shapes and sizes of objects may indicate that one image capture device has the best view of the objects.

The following example is directed to an embodiment in which security image capture device 3200 is used by object annotation system 145. This example, however, may also be applicable to security image capture device 3205 and the image capture devices of optical code reading system 120. Initially, the field of view, location, and orientation of security image capture device 3200 is recorded. The image data communicated to object annotation system 145 represent one or more images of a scene captured by security image capture device 3200. Object annotation system 145 also receives model data generated by object measurement system 115. The relative positioning of security image capture device 3200 with that of elements 422 and sensors 710 of object measurement system 115 is determined. Based on parameters such as the relative positioning of device 3200 and elements 422 and sensors 710, the time an image is captured by device 3200, the time when elements 422 and sensors 710 measure an object, and conveyor belt speed, the model data is correlated with the image captured by device 3200 to identify the location of the object in the image. Exception identification system 130 notifies object annotation system 145 whether the object in the image has an exception associated with it.

By knowing where objects are located in the image and which objects have an exception, object annotation system 145 is able to generate annotated image data representing an annotated image of the scene captured by security image capture device 3200. The annotated image data is then communicated to a display screen to display the annotated image of the scene. Security image capture device 3200 may capture multiple video images, and the annotated image data may represent a video clip of the scene when objects are passing through the scene.

Figure 32:
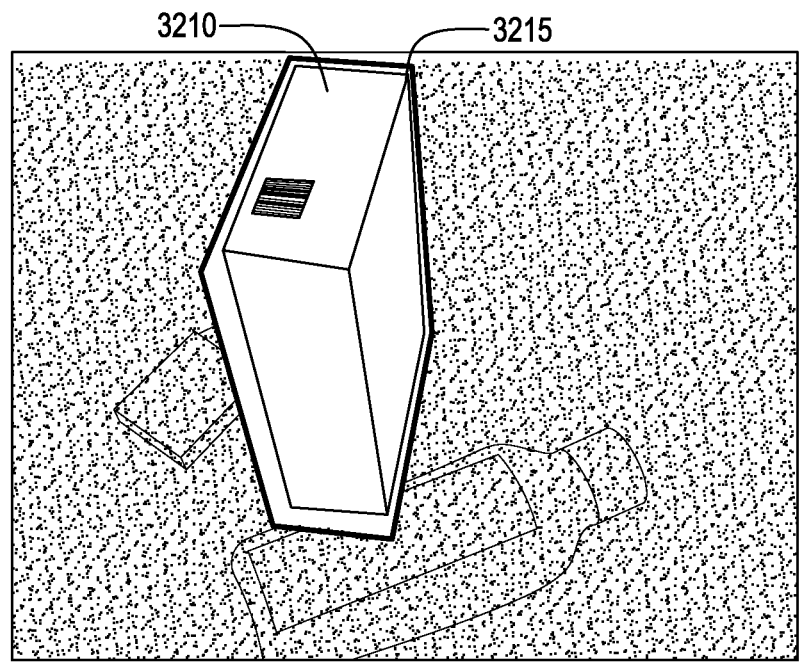
FIGS. 32 and 33 are example renderings of annotated images generated by an object annotation system of the automated optical code reading system of FIG. 1.

Two examples of annotated images that object annotation system 145 may generate are described below with reference to FIGS. 32 and 33. FIG. 32 shows an annotated image of a scene in which an object 3210 is present that has an exception associated with it. The annotated image includes an outline 3215 surrounding object 3210 that corresponds to a three-dimensional model of object 3210 generated by object measurement system 115. In other words, the three-dimensional model of the object is projected onto the image of the scene captured by security image capture device 3200 to indicate in an intuitive manner that object 3210 has an exception associated with it. Moreover, portions of the image that do not correspond to object 3210 are darkened to further highlight object 3210.

Figure 33:
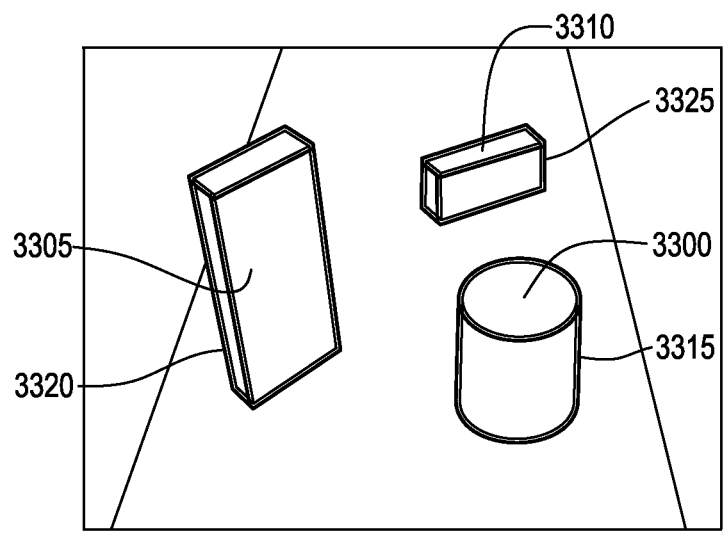

FIG. 33 shows an annotated image of a scene in which three objects 3300, 3305, 3310 are present. Object 3300 has an exception associated with it, and objects 3305, 3310 do not have exceptions associated with them. The annotated image includes outlines 3315, 3320, 3325 surrounding objects 3300, 3305, 3310 that correspond to three-dimensional models projected onto the image captured by security image capture device 3200. Outline 3315 may be one color (e.g., red) to indicate that an exception is associated with object 3300, and outlines 3320, 3325 may be a different color (e.g., green) to indicate that objects 3305, 3310 do not have exceptions associated with them.

VII. Alternative Embodiments for the Lateral Object Sensor System

As described above with reference to FIGS. 7-9, lateral object sensor system 705 may include sensors 710a, 710b positioned underneath conveyors 110 and artificial illumination sources 711 to illuminate from the bottom an object that passes over gap 715. Light produced by illumination sources 711 reflects off the object toward sensors 710a, 710b to enable sensors 710a, 710b to produce a footprint image of the object.

In an alternative embodiment, lateral object sensor system 705 may use a transmissive light (e.g., backlight illumination) approach, instead of a reflective light approach, to produce a silhouette footprint image of the object. A transmissive light approach may be advantageous when the object is dark (e.g., black), shiny/reflective (e.g., a metallic surface), and/or transparent. For example, FIG. 49 shows footprints of various types of objects that are produced by a transmissive light approach. The left column of images are renderings of the objects, and the right column of images are the footprints of the objects. The transmissive light approach in these examples provides a clear discrimination of the footprint shape of the objects, even when the objects are reflective, shiny, or dark.

The transmissive light approach may be implemented by having sensors (e.g., cameras), such as sensors 710a, 710b, below conveyor 110 and artificial illumination sources above the object, such as illumination sources positioned along top portions 1306, 1311 of data capture devices 111, 112, that illuminate the object from the top. For example, the illumination sources associated with image capture devices 1305, 1310 or security image capture devices 3200, 3205 may illuminate the top side of the object when sensors 710a, 710b capture images of the object. Alternatively, sensors (e.g., light receivers such as photodiodes) may be positioned above the object (e.g., along top portions 1306, 1311 of data capture devices 111, 112) and illumination sources may be positioned below conveyors 110 to illuminate the object from the bottom. For example, illumination sources associated with image capture devices 1335, 1340 may illuminate the bottom side of the object when overhead sensors capture images of the object.

Figure 34:
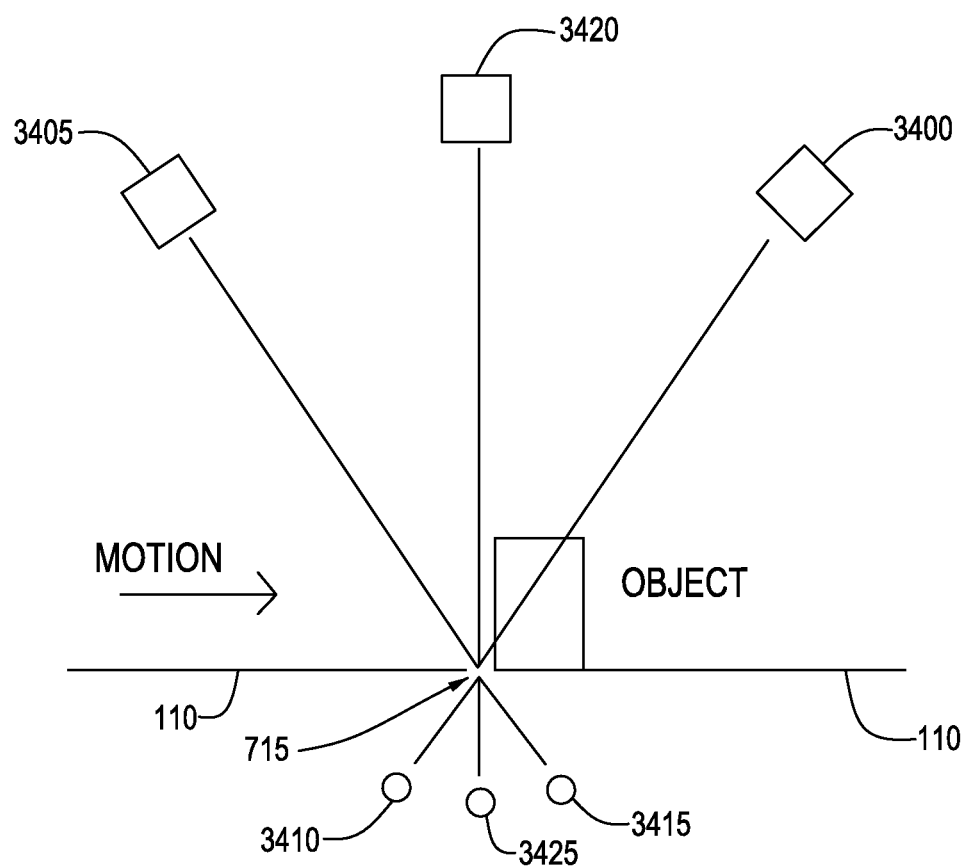
FIG. 34 is a side view diagram of sensors and artificial light sources used in a transmissive light approach for the lateral object sensor system of FIG. 7, according to one embodiment.
Figure 35:
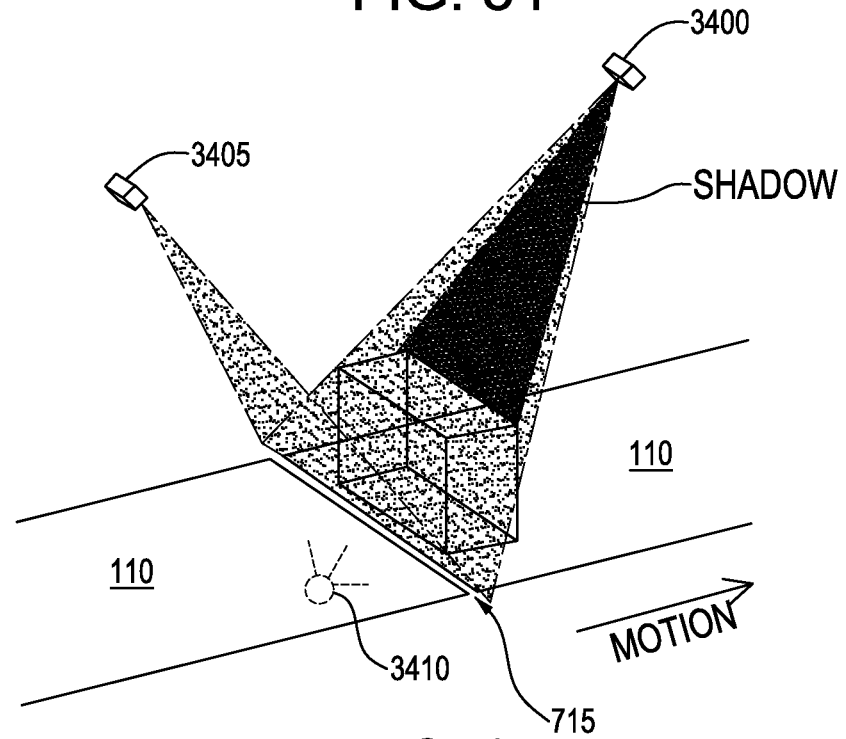
FIG. 35 is an isometric view of the sensors of the lateral object sensor system and an object on a conveyor that casts a shadow on one of the sensors in the transmissive light approach of FIG. 34.

FIG. 34 is a side view diagram of a transmissive light approach for lateral object sensor system 705 in which exit and entry sensors 3400, 3405 are aimed at angles toward gap 715 between conveyors 110. Artificial illumination sources 3410, 3415 (e.g., line illuminators) are provided below conveyors 110 to provide backlights for sensors 3400, 3405 (e.g., light receivers such as photodiodes). Specifically, illumination source 3410 provides a backlight for sensor 3400, and illumination source 3415 provides a backlight for sensor 3405. Sensors 3400, 3405 capture line-scan or area images of the backlit illumination seen through gap 715 between conveyors 110. Line-scan images may be produced by a linear sensor (e.g., a line-scan camera) or by a linear portion of an area sensor. Sensors 3400, 3405 may be positioned along top portions 1306, 1311 of data capture devices 111, 112 shown in FIG. 13. FIG. 35 is an isometric view of sensors 3400, 3405 and conveyors 110 when an object has traversed gap 715 between conveyors 110 but is still shadowing the light produced by illumination source 3410 and aimed toward sensor 3400.

FIG. 34 shows an optional overhead sensor 3420 positioned directly above gap 715 between conveyors 110 and a corresponding artificial illumination source 3425 positioned directly below gap 715 to provide backlight illumination for sensor 3420. In one example, sensor 3420 may attach to and extend from one of top portions 1306, 1311 to be positioned directly above gap 715.

The following example corresponds to an embodiment in which sensor 3420 and illumination source 3425 are not used. In operation, illumination sources 3410, 3415 may be illuminated and reference linescan images may be captured by sensors 3400, 3405 when no object is over gap 715. However, reference images need not be captured such as when background images captured by sensors 3400, 3405 are saturated (e.g., the backlight intensities of illumination sources 3410, 3415 are relatively strong). When a footprint of an object is to be captured, backlit linescan images are sequentially and simultaneously captured by sensors 3400, 3405. The captured rows represented in the linescan images may then be binarized by detecting sufficient intensity change from the reference images to create binarized row data. A sufficient intensity change may be determined according to the application in which system 100 is used. In one example, a transparent object, such as one having acrylic plastic or glass, may have about an 8% transmission loss through each surface. A typical plastic bag or bottle may have two such surfaces that light may transmit through from an illumination source to a sensor, which amounts to about a 16% total transmission loss. Thus, in this example, an intensity reduction of about 16% or more may indicate the presence of an object. In another example, to account for noise and the possibility of single surface transparent objects, such as a clear plastic card, a threshold intensity change of about 5% may be used to indicate the presence of an object.

Subsequent binarized rows may be sequenced into a 2-D raster image. The binarized row data from each sensor 3400, 3405 represents the shadow of the object as it passes over gap 715 and through the view of sensors 3400, 3405. For a relatively short object, the binarized row data from each sensor 3400, 3405 may be the same. However, for a relatively tall object, entry sensor 3405 will be shadowed by the object before it reaches gap 715 and exit sensor 3400 will be shadowed by the object for a period of time after the object has traversed gap 715. A logical AND of the raster images produced by sensors 3400, 3405 may be computed to yield a close approximation of the footprint of the object. A logical AND operation is explained in greater detail above with respect to FIG. 10.

Figure 36:
FIGS. 36-40 are a simulated side profile image and simulated footprint images of an object produced by the vertical object sensor system of FIG. 4 and the lateral object sensor system of FIG. 7, according to one embodiment.

FIGS. 37-40 show simulated raster images of a rectangular object that are produced by lateral object sensor system 705 over time using the transmissive light approach. The vertical extents of FIGS. 37-40 represent locations laterally across conveyors 110 captured by lateral object sensor system 705, and the horizontal extents of FIGS. 37-40 represent time. FIG. 36 represents the VOS profile of the object that is produced by vertical object sensor system 410 as the object passes through one or more light curtains 415, 420 described with reference to FIGS. 4-6.

Figure 37:
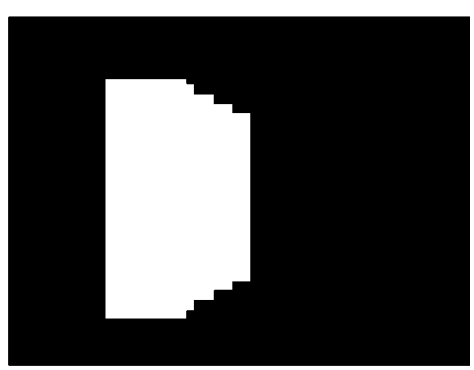

FIG. 37 represents a backlit 2-D binarized raster image produced by entry sensor 3405. Entry sensor 3405 senses the top of the leading side of the object first and then along the length of the top side of the object to the top of the trailing side. Sensor 3405 then senses progressively down the trailing side, which appears narrower and narrower as sensor 3405 senses down the trailing side. Sensor 3405 senses the bottom of the trailing side and then no longer senses the object.

Figure 38:
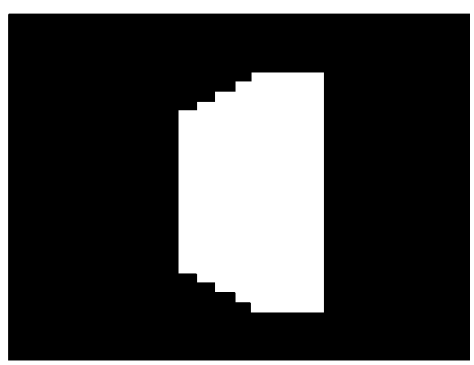

FIG. 38 represents a backlit 2-D binarized raster image produced by exit sensor 3400. As the object moves across gap 715, exit sensor 3400 senses the bottom of the leading side of the object first, then up the leading side of the object. As sensor 3400 senses progressively up the leading side, the object appears wider and wider because the object becomes closer to sensor 3400. After sensor 3400 senses the top of the leading side, sensor 3400 senses along the length of the top side of the object. The top side of the object appears to sensor 3400 to have a constant width throughout the length of the top side. After sensor 3400 senses the top of the trailing side of the object, sensor 3400 no longer senses the object.

Figure 39:
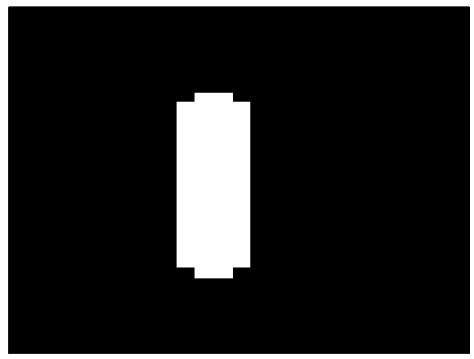
Figure 40:
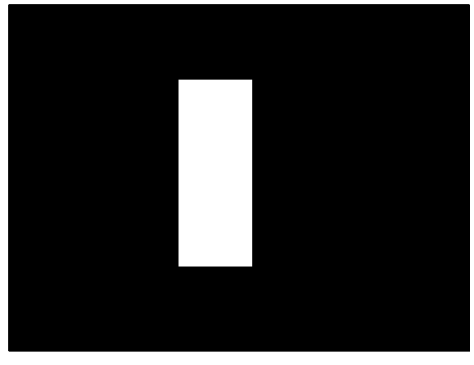

FIG. 39 represents a logical AND of the 2-D binarized raster images produced by sensors 3400, 3405. The logical AND produces a close approximation of the footprint of the object. For reference, FIG. 40 shows a backlit 2-D binarized raster image of the object produced by sensor 3420 that is positioned directly over gap 715.

Sensors 3400, 3405 have titled view planes, which may lead to the creation of merged or phantom objects when two or more objects are closely spaced apart. For example, if entry sensor 3405 sees the top of the leading side of a second object before it sees the bottom of the trailing side of a first object, sensor 3405 cannot distinguish between the two objects. FIG. 41 is an example diagram of sensors 3400, 3405 that shows various measurement parameters that are used to calculate a minimum spacing between two objects to prevent the formation of merged and phantom objects. If sensors 3400, 3405 are aimed at an angle $\theta$ with respect to vertical, the minimum spacing between objects to prevent the formation of merged and phantom objects may be determined by the following equation:

$$\text{Spacing} = (H1 + H2)\tan\theta \quad (12)$$

where H1 represents the height of one of the objects and H2 represents the height of the other object. For example, when θ=30°, H1=29.2 cm (11.5 inches (in.)), and H2=10.2 cm (4 in.), the minimum spacing between the objects to prevent merged and phantom objects is about 22.7 cm (8.9 in.).

FIGS. 42-46 show one example of a simulation in which two objects have a length L of 100 mm, a height H of 150 mm, and a spacing S between them of 225 mm as shown in the VOS profile represented in FIG. 42. The angle θ of exit and entry sensors 3400, 3405 in this example is about 34°. FIG. 43 shows a representation of a 2-D binarized raster image generated by exit sensor 3400 over time, FIG. 44 shows a representation of a 2-D binarized raster image generated by entry sensor 3405 over time, FIG. 45 is a representation of a logical AND of the 2-D raster images generated by exit and entry sensors 3400, 3405, and FIG. 46 shows a representation of a 2-D binarized raster image generated by overhead sensor 3420 over time. Using equation 12, the minimum spacing for this example is about 202.4 mm. FIGS. 43 and 44 show that exit and entry sensors 3400, 3405 see not only the two objects' footprints, but also the bottom edges of either the leading or trailing sides of the objects because the spacing S is not less than the minimum spacing calculated using equation 12. As shown in FIG. 45, the logical AND of the 2-D raster images of sensors 3400, 3405 produces an image in which the two objects are distinguished without their representations overlapping each other.

Figure 47:
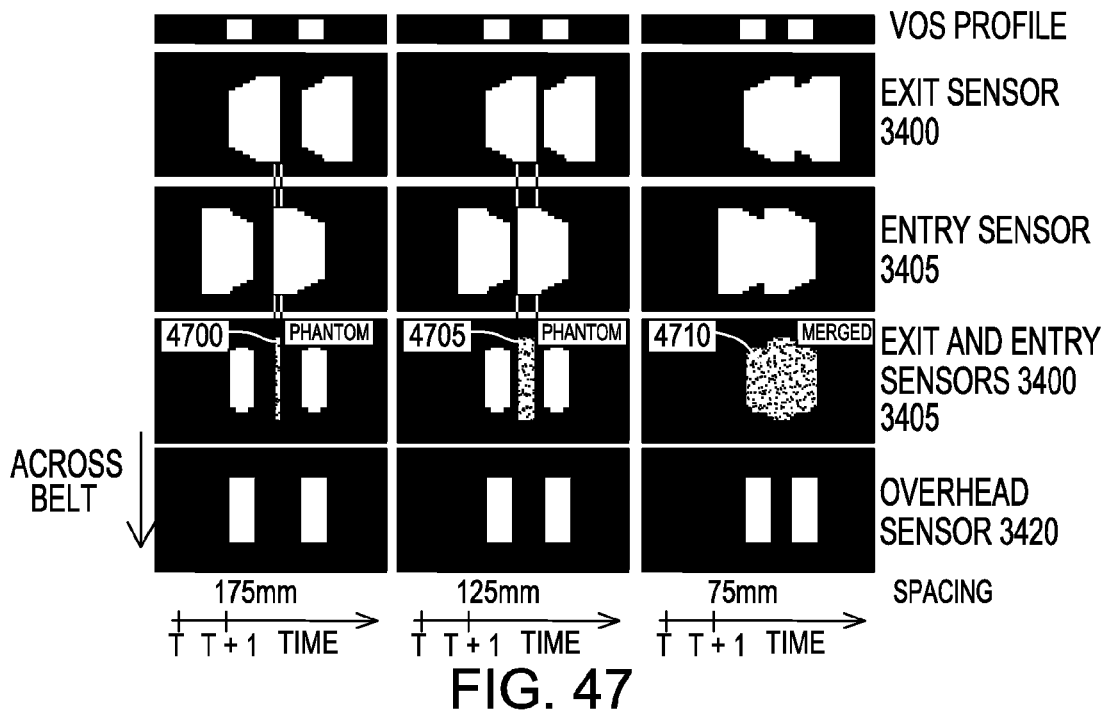
FIG. 47 are images corresponding to three simulations that show the formation of phantom and merged objects when the objects shown in FIGS. 42-46 are spaced apart by distances that are less than the minimum spacing calculation represented in FIG. 41.

In contrast, FIG. 47 shows three different simulations when the spacing S between the objects represented in FIGS. 42-46 is less than the minimum spacing of 202.4 mm. The left most column of images shows simulation results when the spacing S is about 175 mm, which creates a phantom object 4700 in the logical AND of the images produced by sensors 3400, 3405. The center column of images shows simulation results when the spacing S is about 125 mm, which creates a phantom object 4705 that is wider than phantom object 4700. The right most column of images shows simulation results when the spacing S is about 75 mm, which creates a merged object 4710 in the logical AND of the images produced by sensors 3400, 3405. Phantom objects 4700, 4705 and merged object 4710 may cause spurious exceptions. For example, phantom objects 4700, 4705 may be recognized as objects that do not include optical codes associated with them. In another example, merged object 4710 may be recognized as an object that has multiple optical codes (e.g., the optical codes from the two objects) associated with it.

Figure 48:
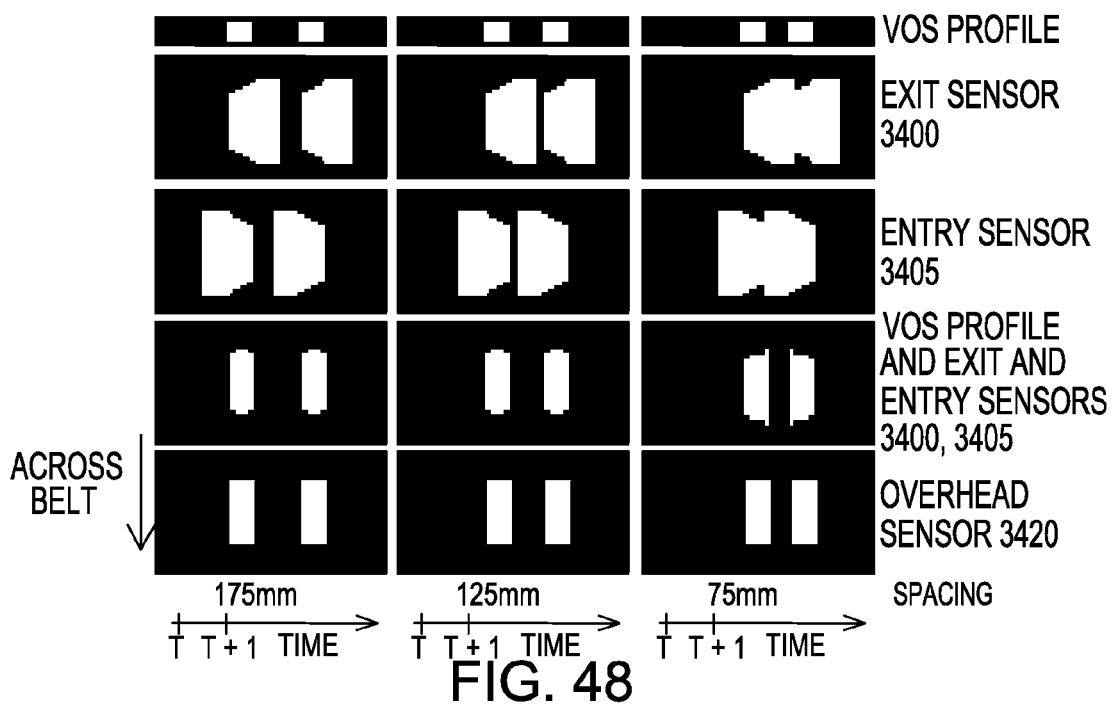
FIG. 48 shows the three simulations of FIG. 47 in which a logical AND is performed using a profile from the vertical object sensor system of FIG. 4 and images produced by the lateral object sensor system to eliminate the phantom and merged objects.

In one embodiment, phantom objects 4700, 4705 and merged object 4710 may be eliminated by using the VOS profile produced by vertical object sensor system 410. For example, a logical AND of the VOS profile and the 2-D raster images produced by sensors 3400, 3405 may eliminate phantom objects 4700, 4705 and merged object 4710. FIG. 48 shows the three simulations of FIG. 47 in which a logical AND is performed with the VOS profile and the raster images produced by sensors 3400, 3405 as shown in the second from bottom row of images. This row of images shows that phantom objects 4700, 4705 and merged object 4710 are eliminated because the height in the VOS profiles at the locations of phantom objects 4700, 4705 and merged object 4710 is about 0.

Figure 50:
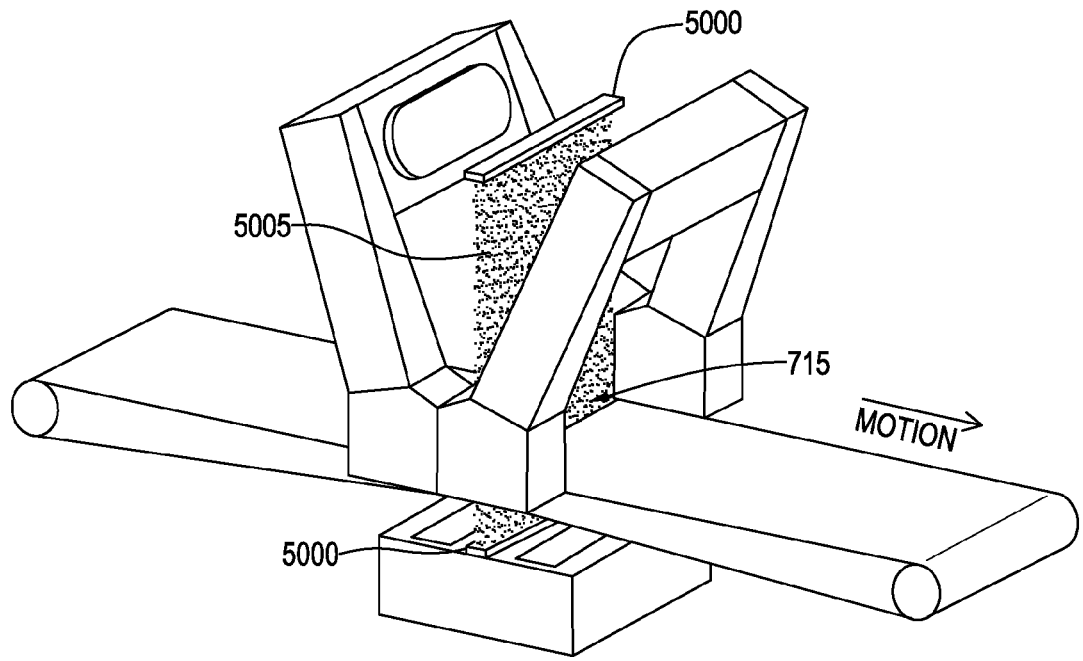
FIG. 50 is an isometric view of an embodiment of the automated optical code reading system of FIG. 1 in which the lateral object sensor system includes elements that are positioned directly above and directly below a gap between conveyors to provide a vertically oriented, non-tilted view plane for the lateral object sensor system.

In another embodiment, a sensor, such as overhead sensor 3420 or a light curtain, that is positioned directly above and/or below gap 715 may be used to avoid producing phantom and merged objects. FIG. 50 is an isometric view of an embodiment in which system 100 includes a sensor 5000 that that includes elements (e.g., light receivers, artificial illumination sources) that are positioned directly above and/or directly below gap 715 to provide a vertically oriented, non-tilted view plane 5005 for sensor 5000. Sensor 5000 may use a reflective light approach or a transmissive light approach as described above to detect an object's footprint. For example, in a reflective light approach, sensor 5000 may include one or more light receivers and one or more artificial illumination sources positioned directly above or directly below gap. In a transmissive light approach, sensor 5000 may include one or more light receivers positioned directly above gap 715 and one or more artificial illumination sources positioned directly below gap 715. Alternatively, one or more light receivers may be positioned directly below gap 715 and one or more artificial illumination sources may be positioned directly above gap 715. In another example, sensor 5000 may include a set of laterally spaced-apart transmitters (e.g., infrared transmitters) that are positioned directly above or directly below gap 715 and a set of laterally spaced-apart light receivers (e.g., photodiodes) positioned directly above or below gap 715 and opposite the light transmitters to form a light curtain.

Figure 51:
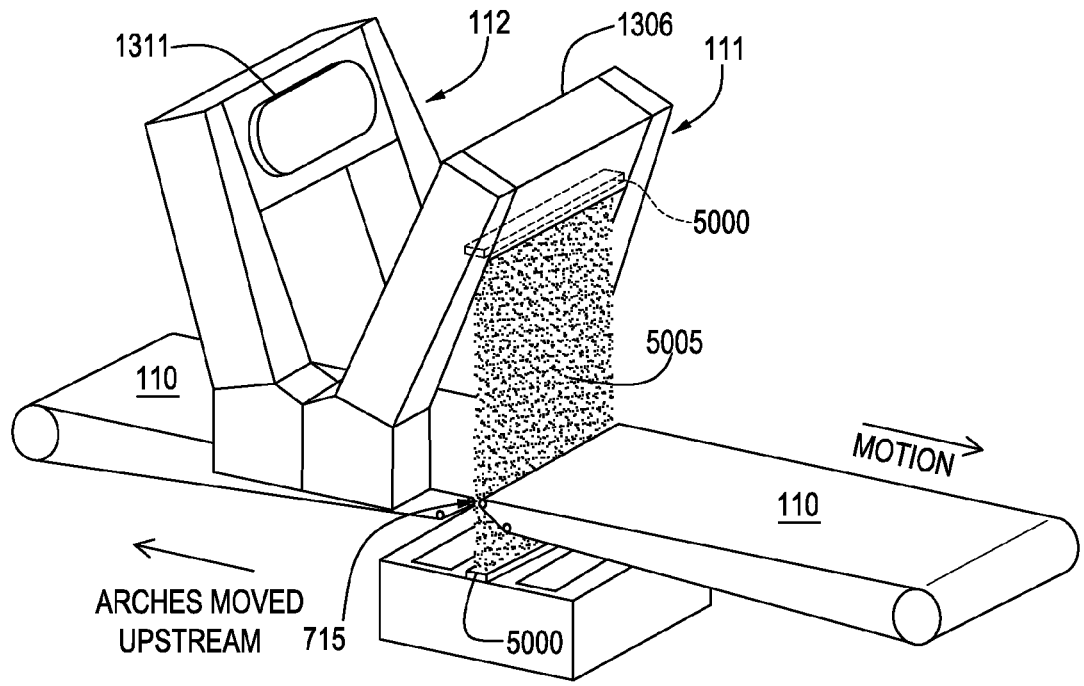
FIG. 51 is an isometric view of an embodiment of the automated optical code reading system of FIG. 50 in which data capture devices are moved upstream (opposite conveyor motion) so that the gap between the conveyors is directly under a top portion of one of the data capture devices and an element of the lateral object sensor system is positioned along the top portion of the data capture device.

In an alternative embodiment to that shown in FIG. 50, conveyors 110 and data capture devices 111, 112 may be positioned so that gap 715 lies directly under one of top portions 1306, 1311 of data capture devices 111, 112. For example, FIG. 51 is an isometric view of an embodiment in which data capture devices 111, 112 are moved upstream (opposite the direction of conveyor motion) so that gap 715 is directly under top portion 1306. Data capture devices 111, 112 may be positioned upstream from gap 715 so that images and measurements of an object may be obtained before the object traverses gap 715, which may cause the object to roll, fall, or otherwise shift. In the example of FIG. 51, elements of sensor 5000 are positioned along top portion 1306 of data capture device 111 directly over gap 715 instead of being positioned between data capture devices 111, 112 as is the case in FIG. 50. In the embodiment of FIG. 51, sensor 5000 may implement a reflective or transmissive light approach or a light curtain approach as described above. As shown in FIG. 51, system 100 maintains an open look (without having a sensor positioned between top portions 1306, 1311). System 100 also allows accurate lateral presence, position, and size detection of objects by having a vertically oriented, non-tilted view plane 5005 for the lateral object sensor system 705.

VII. System Architecture Example

Figure 52:
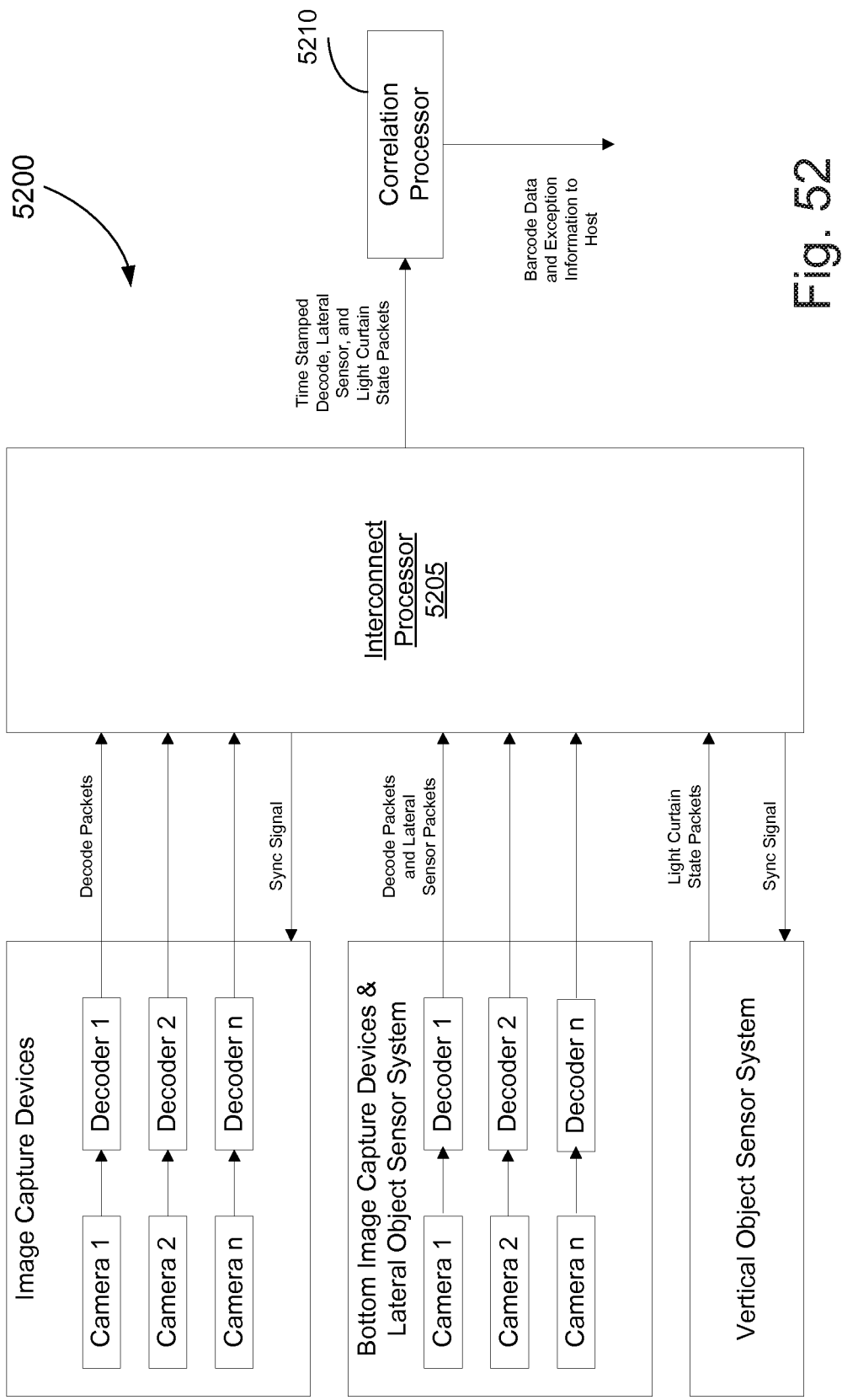
FIG. 52 is an example of processing system architecture of the automated optical code reading system of FIG. 1.

FIG. 52 illustrates an exemplary system architecture 5200 for system 100, according to one embodiment in which one or more bottom image capture devices 1335, 1340 are used as the sensors in lateral object sensor system 705. In view of the present disclosure, it should be recognized that the architecture of system 100 may be implemented in various other ways. Images from the image capture devices 1305, 1310, 1315, 1320, 1325, 1330, 1335, and 1340 are decoded via decode processors and the decoded information (decode packets and lateral sensor packets (e.g., information from lateral object sensor system 705)) is sent to an interconnect processor 5205. Light curtain information from vertical object sensor system 410 (pertaining to the size and position of item being passed through the read region) is processed by a light curtain processor and the corresponding information (light curtain state packets) is also sent to the interconnect processor 5205. Interconnect processor 5205 applies time stamps to the packets and sends the time stamped packet data to a correlation processor 5210. Correlation processor 5210 generates object models (e.g., three-dimensional models of objects) from the light curtain and lateral sensor packets and correlates object data with the decode packets to determine which objects correspond to the decoded data. Successfully correlated barcode information as well as exception data is then transmitted to a point-of-sale (POS) host. Exception data corresponds to any number of events when the object models and decode packets indicate that an error may have occurred. Examples of exceptions include, but are not limited to: (a) more than one barcode is correlated with an object; and (2) no barcode is correlated with an object model; (3) a barcode is read but is not correlated with an object model.

Figure 53:
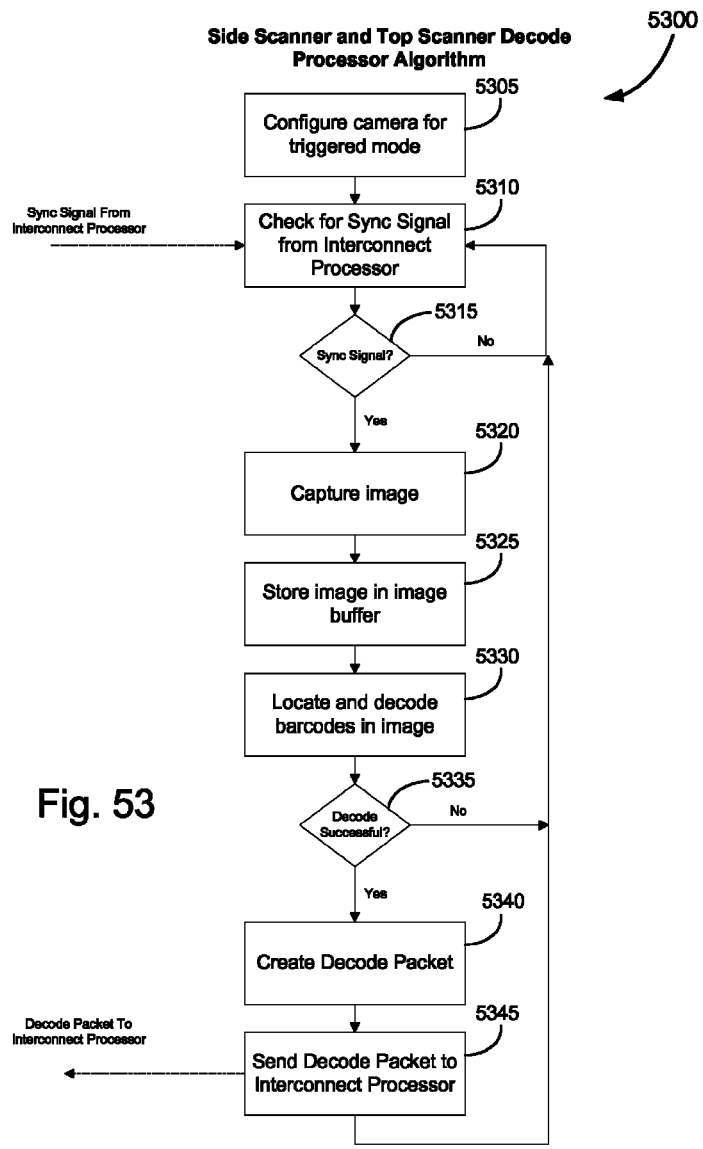
FIG. 53 is a flow chart of a side scanner and top scanner decode processor algorithm according to one embodiment.

FIG. 53 is a flow chart of a side scanner and top scanner (corresponding to side and top image capture devices 1305, 1310, 1315, 1320, 1325, and 1330) decode processor algorithm 5300 according to an embodiment, having the following steps:

Step 5305—configuring image capture devices 1305, 1310, 1315, 1320, 1325, and 1330 for triggered mode.

Step 5310—checking for synchronization signal from interconnect processor 5205.

Step 5315—if synchronization signal is detected, (Yes) proceed to Step 5320; if No, return to Step 5310.

Step 5320—capturing image (trigger the image capture devices to capture an image).

Step 5325—reading out image from the imager into processor memory image buffer.

Step 5330—processing image to locate and decode optical codes in image buffer. The image may be processed using a suitable image processing algorithm.

Step 5335—determining whether a barcode was successfully decoded: if Yes, proceed to Step 5340, if No, return to Step 5310 to process additional images. For each optical code found in image buffer, record the symbology type (UPC, Code 39, etc), decoded data, and coordinates of the bounding box corners that locate the decoded optical code in the image. The coordinates of the centroid of the bounding box may also be recorded.

Step 5340—creating decode packet (with the recorded symbology type, decoded data and coordinates).

Step 5345—sending recorded data (decode packet) to the interconnect processor 5205 and then returning to Step 5310 to process additional images.

Figure 54:
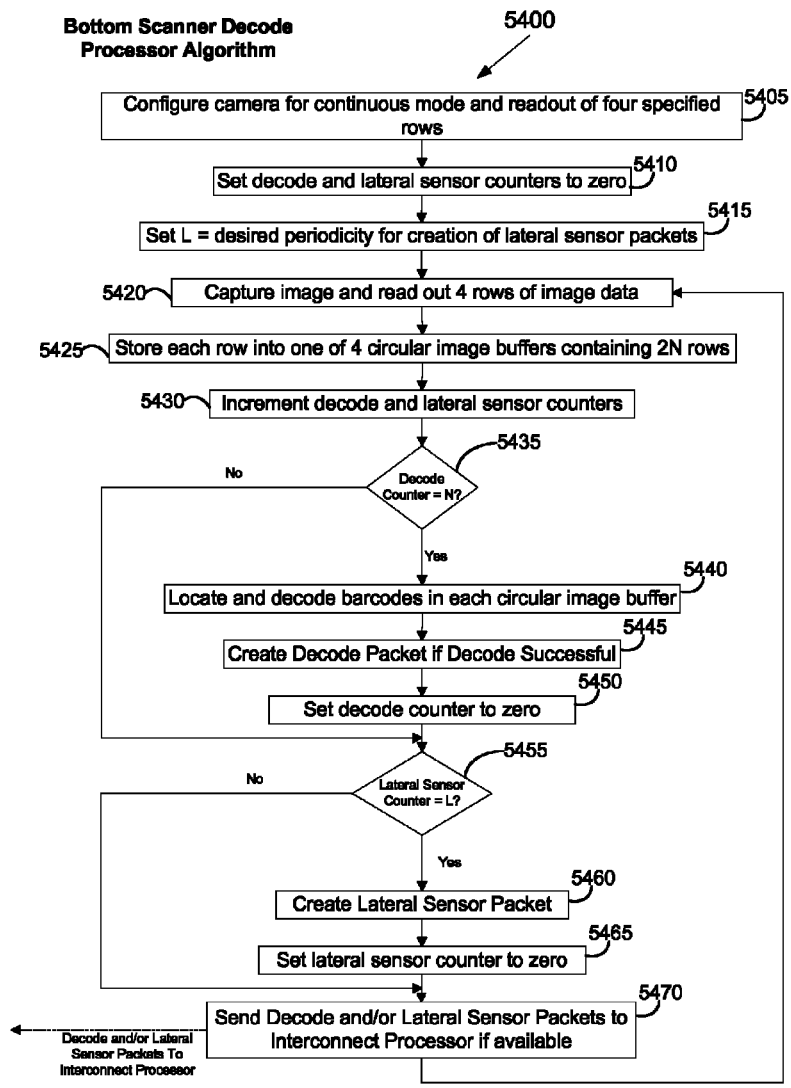
FIG. 54 is a flow chart of a bottom scanner decode processor algorithm according to one embodiment.

FIG. 54 is a flow chart of a bottom scanner (corresponding to image capture devices 1335 and 1340 and lateral object sensor system 705) decode processor algorithm 5400 according to an embodiment, having the following steps:

Step 5405—Configuring the image capture devices to continuously capture images and read out 4 rows of data. In a preferred reading method, the frame rate of reading out frames of 4 rows each is 2.5 KHz (2500 frames/second).

Step 5410—Setting decode and lateral sensor counters to zero.

Step 5415—Setting L to equal the desired periodicity for creation of lateral sensor packets. In one example the value of L=20.

Step 5420—capturing image and reading out each of the 4 rows of data from the imager(s) (e.g., imagers of image capture devices 1335, 1340) into a temporary buffer.

Step 5425—storing each row of data into one of four circular image buffers containing 2N rows to generate 4 separate linescan images in processor memory.

Step 5430—increment decode and lateral sensor counters.

Step 5435—Determining if decode counter=N: if Yes proceed to Step 5440; if No proceed to Step 5455. N represents how tall the decode buffer is. In one example, N=512, which corresponds to about 2.5 inches of belt movement (e.g., belt speed of 12 inches/sec. divided by a line-scan speed of 2500 Hz times N of 512 equals 2.5 inches).

Step 5440—Processing each of the 4 image buffers sequentially (using the image processing algorithm) to locate and decode barcodes. The image processing algorithm analyzes an image using horizontal and vertical scan lines to find start and/or stop patterns of an optical code. The algorithm then traverses the image roughly in the direction of the optical code (also moving in a transverse direction as necessary) to decode the digits of the optical code similar to an adaptive VSL algorithm.

Step 5445—creating a decode packet if the decode is successful. If the number of rows in the circular buffer is 2N, then for every N rows, an image of the previous 2N pixels is decoded as a frame. For each barcode found in image buffer, record the symbology type (UPC, Code 39, etc), decoded data, and coordinates of the bounding box corners that locate the decoded label in the image. The recorded symbology type, decoded data and coordinates constitute the decode packet.

Step 5450—setting decode counter to zero. The decode counter represents a variable that counts the number of rows that have been put into the circular buffer.

Step 5455—determining if lateral sensor counter=L: if Yes, proceed to Step 5460; if No, proceed to Step 5470. L represents the number of rows to skip between outputting lateral sensor data. In one example, the resolution of the lateral object sensor of lateral object sensor system 705 is about 5 mils (e.g., 12 inches/sec divided by 2500 Hz). An L value of 20 provides a spacing of the lateral sensor data of about 0.1 inch.

Step 5460—creating lateral sensor packet. As an example, periodically (for example every 20 rows of data captured) a lateral sensor packet is created by: selecting a subset of the columns in the 4 rows of data (e.g., every 20 columns) and binarizing the data by comparing the pixel intensity to a fixed threshold. This creation of the lateral sensor packet process provides a coarse resolution binary representation of the objects passing by the bottom scanner. This binary representation corresponds to a footprint of the object. For any object viewable by the lateral object sensor, the object's longitudinal length is determined by the number of rows in the object footprint multiplied by the object footprint pixel size.

Step 5465—setting lateral sensor counter to zero.

Step 5470—sending recorded data (decode packets and lateral sensor packets) to interconnect processor 5205 and then returning to Step 5420 to capture/read out more images.

Figure 55:
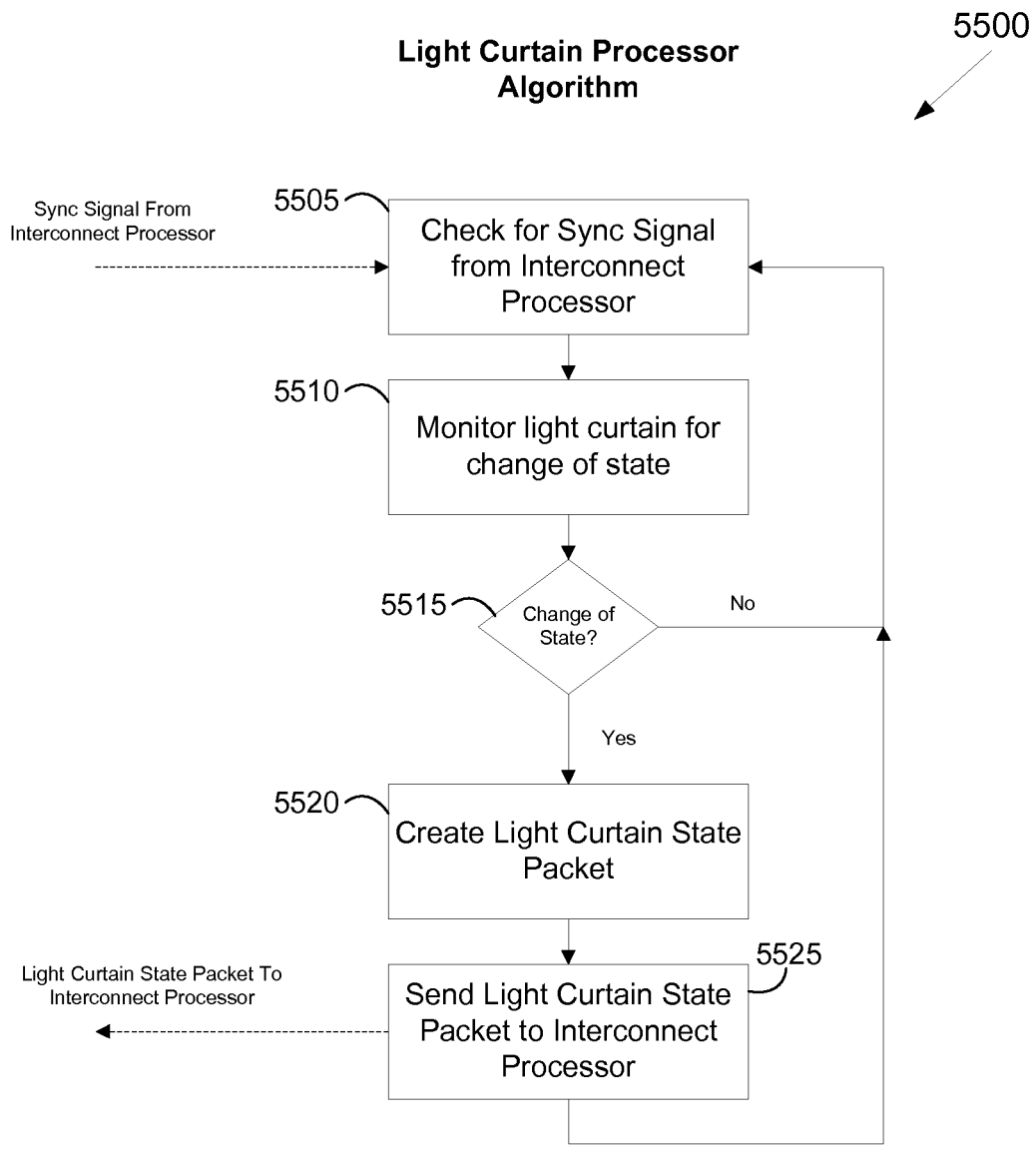
FIG. 55 is a flow chart of a light curtain processor algorithm according to one embodiment.

FIG. 55 is a flow chart of a light curtain processor algorithm 5500 related to vertical object sensor system 410, according to an embodiment, and having the following steps:

Step 5505—checking for synchronization signal from interconnect processor 5205. Light curtain sensor elements 422 are monitored to determine the height of an object. For example, an object's height is determined by tallest light curtain sensor element that was blocked when object passed by. Light curtain sensor elements 422 may also be used to determine the longitudinal length of the object. For example, for objects tall enough to block at least one beam in the light curtain, object length is determined by time difference (as measured by Frame Count difference) between trailing light curtain being first blocked to being unblocked multiplied by assumed object velocity (typically the conveyor belt velocity).

Step 5510—monitoring light curtain beams and waiting for a change of state (where a beam is just interrupted or just cleared).

Step 5515—determining if a change of state has not occurred: if No, returning to Step 5505; if Yes, proceeding to Step 5520.

Step 5520—creating light curtain state packet that represents the current light curtain state (e.g., corresponding to a bit pattern (for example, 1=vertically aligned sensors blocked, 0=vertically aligned sensors unblocked)).

Step 5525—transmitting light curtain state packet (indicating current state of light curtain beams) to the interconnect processor and then returning to Step 5505.

Figure 56:
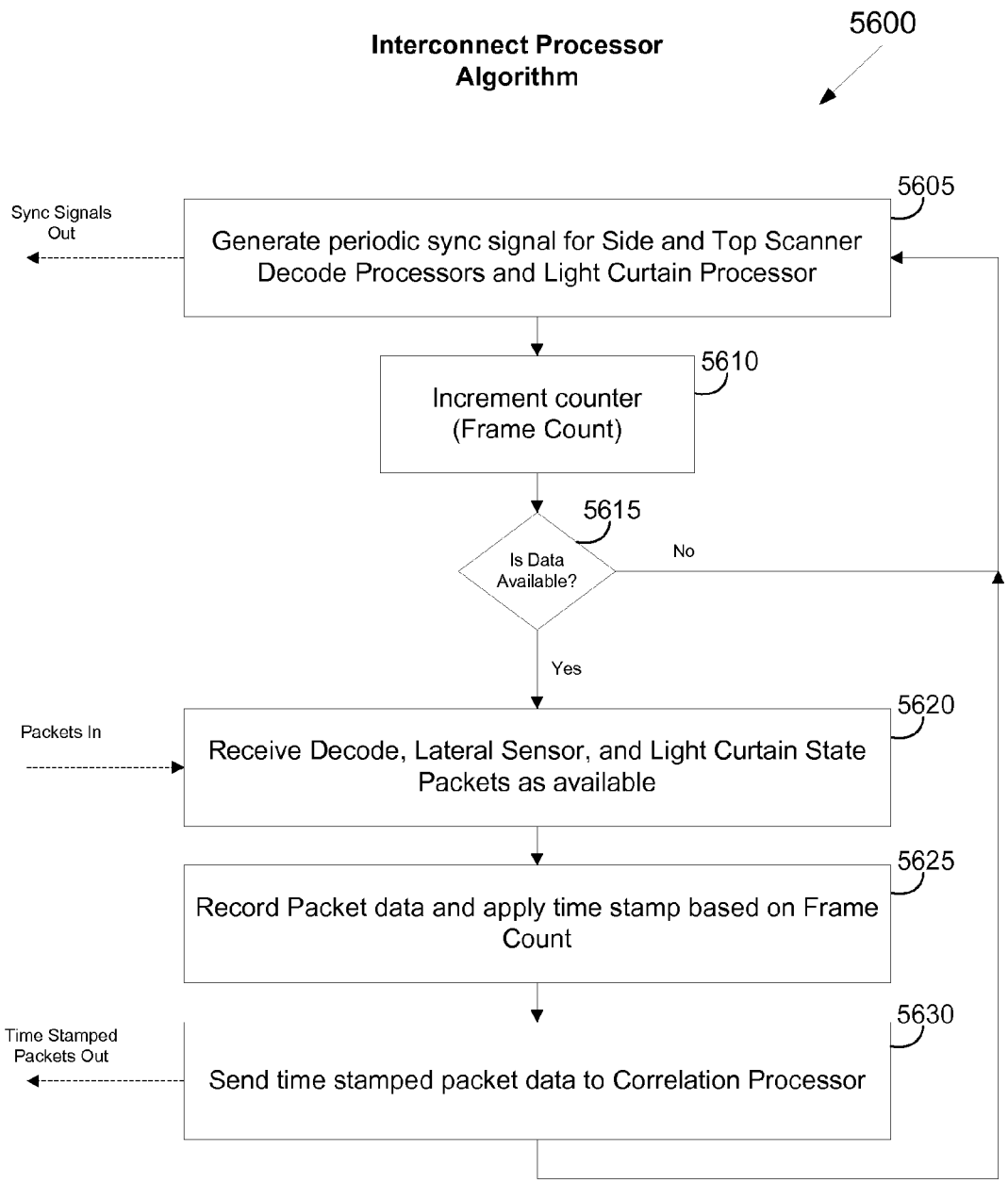
FIG. 56 is a flow chart of an interconnect processor algorithm according to one embodiment.

FIG. 56 is a flow chart of an interconnect processor algorithm 5600 according to an embodiment, having the following steps:

Step 5605—Generating a periodic synchronization signal and sending it to the decode processors. This periodic synchronization signal sets the frame rate of the system. In a preferred example herein, periodic synchronization signal is 30 Hz (30 frames/second).

Step 5610—incrementing a counter (a frame count) each time the synchronization pulse is emitted. In one example, the synchronization pulse is emitted periodically at 30 Hz.

Step 5615—determining whether data is available; if Yes, proceed to step 5620; if No, return to step 5605.

Step 5620—receiving decode packets from the top, side, and bottom decode processors; and receiving lateral sensor packets from the bottom decode processors and the light curtain state packets from the light curtain processor.

Step 5625—recording the decode packets and the lateral sensor packets and recording the value of the frame count when the packets were received (referred to as time stamping of the packets).

Step 5630—sending the time stamped packet data to the correlation processor.

Figure 57:
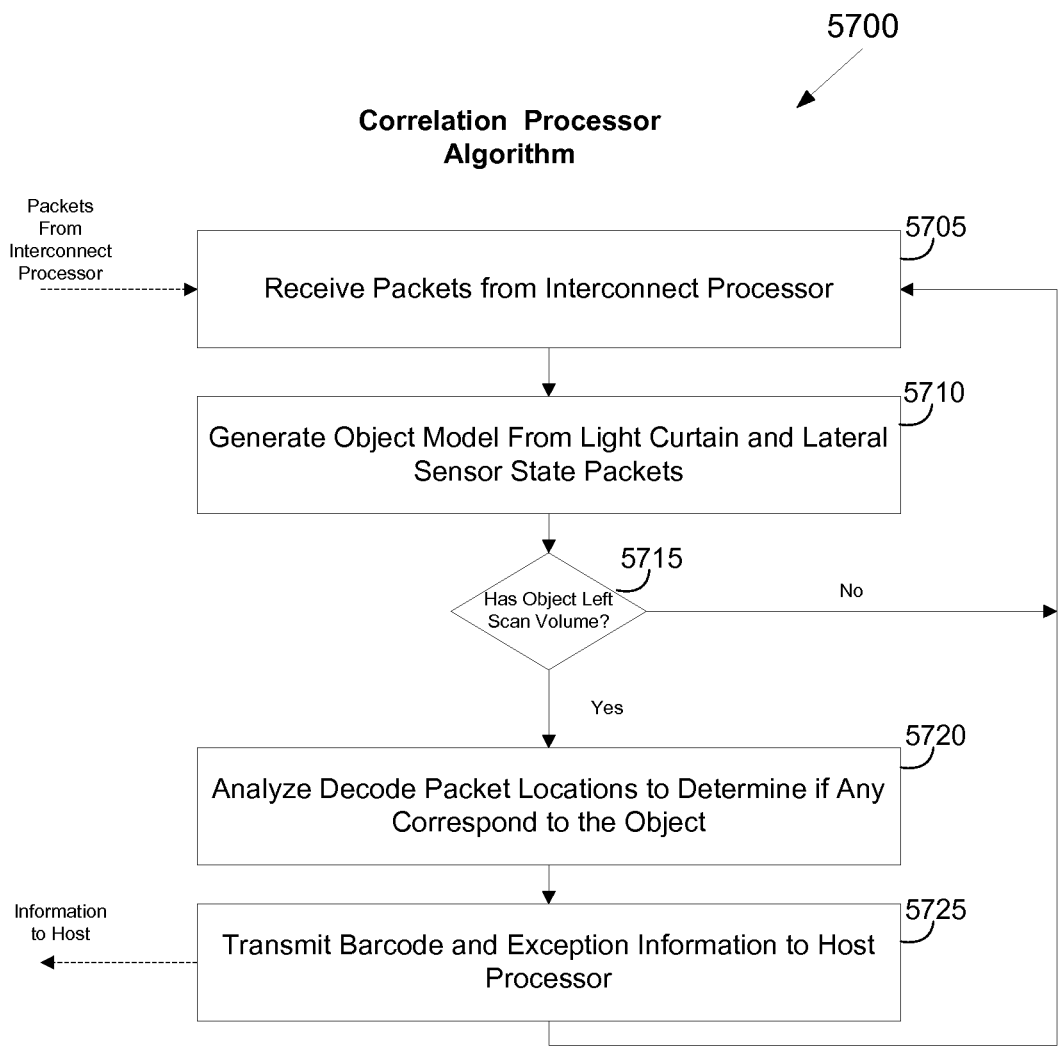
FIG. 57 is a flow chart of a correlation processor algorithm according to one embodiment.

FIG. 57 is a flow chart of an example correlation processor algorithm 5700 according to an embodiment, having the following steps:

Step 5705—waiting to receive packets (i.e., decode packets from the decode processors associated with top and side scanners, the decode packets and lateral sensor packets from the decode processor(s) associated with the bottom scanner, and the light curtain state packets from the light curtain processor) from interconnect processor 5205.

Step 5710—generating a three-dimensional object model (e.g., from an object footprint and side profile (LOS and VOS profiles)) from the light curtain state packets and lateral sensor packets. An object model may be a volume solid with base equivalent to the object footprint, or simplified representation thereof (such as a rectangle) and a height as measured by the light curtain sensor data.

Step 5715—determining if the object has left the read region: if No, return to Step 5705; if Yes, proceeding to Step 5720. Whether the object has left the read region may be determined in various ways. For example, the light curtain state packet or lateral sensor packet may indicate that an object has left the scan volume. In one example, transition of the trailing light curtain from a blocked state to an unblocked state indicates that an object has left the scan volume. In other examples, the leading light curtain and/or the lateral object sensor may be used to determine when an object leaves the read region. If data from the leading light curtain or lateral object sensor is used, the location of the object model is translated by the distance between the locations of the leading light curtain (and/or lateral object sensor) and the trailing light curtain so that the object model is at the edge of the trailing light curtain.

Step 5720—analyzing decode packet locations to determine if any of the locations correspond to the object. For example, a decode trajectory or a back projection ray is generated for each decode packet by considering the camera parameters of the camera that decoded the barcode and bounding box coordinates. Back projection rays are translated by the assumed movement of the object that would have occurred from the decode time until the present moment (by computing the time difference as measured by frame count difference between the moment the object left the scan volume and the moment when the decode occurred). After the back projection rays are translated, it is determined whether any back projection rays intersect the object model.

Step 5725—transmitting optical code data and exception information to host processor. If a single barcode value is associated with an object, a "Good Read" indication may be sent to the host processor. The exception information may correspond to one or more of various exceptions. In one example, the exception information may indicate that multiple different optical code values are associated with an object (e.g., a "multiple code" exception). In another example, the exception information may indicate that an object was seen but no barcode was associated with it (e.g., a "no code" exception). In another example, the exception information may indicate that a barcode was decoded but no object was associated with it (e.g., a "no object" or "phantom read" exception).

The terms and descriptions used above are set forth by way of illustration only and are not meant as limitations. Skilled persons will recognize that many variations, enhancements and modifications of the concepts described herein are possible without departing from the underlying principles of the invention. The scope of the invention should therefore be determined only by the following claims and their equivalents.

The invention claimed is:

1. An automated system for reading optical codes of objects, comprising:
   a conveyor system configured to transport the objects through a view volume;
   an object measurement system positioned along the conveyor system to measure the objects as the objects are transported by the conveyor system, the object measurement system operable to generate model data representing three-dimensional models of the objects;
   an optical code reading system providing the view volume and including multiple image capture devices positioned along the conveyor system at different locations to provide different fields of view of the view volume, the optical code reading system operable to capture images as the objects are transported through the view volume and to read optical codes that are captured in the images, the optical code reading system operable to generate optical code data in response to reading the optical codes captured in the images; and
   an exception identification system in communication with the optical code reading system and the object measurement system, the exception identification system operable to associate the optical code data with the three-dimensional models of the objects represented in the model data to determine whether an exception has occurred.

2. The system of claim 1, further comprising a security image capture device positioned along the conveyor system to capture security images of a scene in which the objects are present, the security image capture device operable to produce image data representing the security images of the scene.

3. The system of claim 2, further comprising:
- an object annotation system configured to communicate with the security image capture device and the exception identification system, the object annotation system configured to produce from the image data annotated image data representing annotated images of the scene that include markings that indicate whether or not exceptions are associated with the objects in the scene, the object annotation system operable to communicate with the object measurement system, wherein the markings of the annotated images correspond to colored outlines of the three-dimensional models that are superimposed on the security images of the objects; and
- a display screen operable to receive the annotated image data and display the annotated images of the scene.

4. The system of claim 1, wherein the object measurement system includes a vertical object sensor and a lateral object sensor.

5. The system of claim 4, wherein the vertical object sensor is a dual light curtain that bounds vertical sides of the view volume.

6. The system of claim 4, wherein the object measurement system includes an artificial illumination source that illuminates the objects to facilitate generation of footprint representations of the objects with the lateral object sensor.

7. The system of claim 6, wherein the artificial illumination source is configured to provide backlight illumination for the lateral object sensor to enable the lateral object sensor to generate silhouette footprint representations of the objects.

8. The system of claim 4, wherein the conveyor system includes first and second conveyors that are separated from each other to form a gap.

9. The system of claim 8, wherein the lateral object sensor includes a sensor element that is positioned directly above the gap formed between the first and second conveyors to provide a vertically-oriented non-tilted view plane for the lateral object sensor.

10. The system of claim 8, wherein the lateral object sensor includes a sensor element that is positioned below the first and second conveyors and directly under the gap to provide a vertically-oriented non-tilted view plane for the lateral object sensor.

11. The system of claim 8, further comprising a data capture device that houses at least part of the object measurement system and one or more of the image capture devices of the optical code reading system, the data capture device configured to form an arch over one or more of the first and second conveyors, the data capture device including a top portion along which a first element of the lateral object sensor is positioned, the lateral object sensor system including a second element positioned below one or more of the first and second conveyors.

12. The system of claim 11, wherein:
- the lateral object sensor has a view plane provided by the first and second elements;
- the data capture device is positioned along the first and second conveyors so that the first element of the lateral object sensor is directly above the gap between the first and second conveyors; and
- the second element of the lateral object sensor is positioned directly below the gap and in-line with the first element so that the view plane of the lateral object sensor has a vertical, non-tilted orientation.

13. The system of claim 1, wherein the optical code reading system includes light directing optics that split the fields of view of the image capture devices into multiple portions directed to different areas of the view volume.

14. The system of claim 1, wherein the optical code reading system is operable to generate projection data for the optical codes captured in the images, the projection data representing back projection rays that project into the view volume and are associated with locations of the optical codes in the images, the automated system further comprising:
- an optical code intersection system operable to receive the model data and the projection data and to determine whether the back projection rays generated by the optical code reading system intersect the three-dimensional models generated by the object measurement system, the exception identification system configured to associate the optical code data with the three-dimensional models of the objects based on intersection determinations of the optical code intersection system.

15. The system of claim 14, wherein the optical code intersection system is operable to determine whether the back projection rays intersect with the three-dimensional models after the objects exit the view volume.

16. The system of claim 14, wherein the optical code reading system is operable to calculate bounding boxes for the optical codes captured in the images and centroids of the bounding boxes, and wherein the optical code reading system uses the centroids to produce the back projection rays.

17. The system of claim 1, wherein the exception identification system is operable to identify one or more of:
- a first exception type in which a three-dimensional model generated by the object measurement system does not have an associated optical code;
- a second exception type in which different optical codes read by the optical code reading system are associated with a single three-dimensional model generated by the object measurement system;
- a third exception type in which an optical code read by the optical code reading system is not associated with a three-dimensional model; and
- a fourth exception type in which a single optical code read by the optical code reading system is associated with multiple three-dimensional models generated by the object measurement system.

18. The system of claim 1, wherein the exception identification system is operable to identify an exception type in which a difference between: (a) a size of a three-dimensional model generated by the object measurement system, and (b) an expected size stored in a database and identified by an optical code associated with the three-dimensional model, is greater than a selected threshold.

19. The system of claim 1, wherein the exception identification system is operable to categorize exceptions according to exception types and to produce exception category identification information associated with the exceptions.

20. The system of claim 19, wherein the exception category identification information includes category labels corresponding to the exception types.

21. The system of claim 19, further comprising an exception handling system configured to receive the exception category identification information, the exception handling system operable to automatically determine how to resolve the exceptions based on the exception types.

22. The system of claim 21, wherein the exception handling system is configured to ignore exceptions of a first one of the exception types.

23. The system of claim 21, wherein the exception handling system is configured to automatically resolve exceptions of a first one of the exception types.

24. The system of claim 23, wherein:
an exception of the first exception type corresponds to an event in which different optical codes read by the optical code reading system are associated with a single three-dimensional model generated by the object measurement system, the different optical codes identifying object information stored in a database, and the object information including expected sizes of objects associated with the different optical codes; and
the exception handling system is configured to automatically resolve the exception of the first exception type by:
determining a sum of the expected sizes of the objects associated with the different optical codes;
comparing the sum of the expected sizes to a measured size of the single three-dimensional model generated by the object measurement system; and
identifying that a difference between the sum of the expected sizes and the measured size is below a selected threshold.

25. The system of claim 21, wherein the exception handling system is configured to determine that exceptions of a first one of the exception types are to be manually resolved.

26. The system of claim 25, wherein the exception handling system is configured to receive feedback information produced in response to a user manually resolving exceptions of the first exception type, and wherein the exception handling system is operable to use the feedback information to adapt how exceptions of the first exception type are resolved.

27. The system of claim 26, wherein the exception handling system is configured to automatically ignore exceptions of the first exception type in response to the user manually ignoring a selected number of exceptions of the first exception type.

28. The system of claim 21, further comprising a storage device configured to store information associated with exceptions that are resolved.

29. A method of identifying an exception in an automatic optical code reading system in which an object bearing an optical code is automatically moved along a path, comprising:
measuring the object as it moves along the path to generate a three-dimensional model of the object;
capturing an image of the object as it moves along the path and through a view volume, the image including a representation of the optical code;
reading the optical code based on analysis of the image; and
determining whether the optical code is associated with the three-dimensional model of the object to thereby identify whether an exception is associated with the object.

30. The method of claim 29, further comprising:
calculating a back projection ray for the optical code that corresponds to a correlation of a location of the representation of the optical code in the image to a number of three-dimensional coordinate points in the view volume;
computing an amount of time that has elapsed from the reading step to the determining step;
deriving a distance the object has traveled along the path during the amount of time that has elapsed; and
shifting the back projection ray by the distance the object has traveled to determine whether the back projection ray intersects the three-dimensional model.

31. The method of claim 30, wherein the determining step is performed after the object leaves the view volume.

32. The method of claim 29, wherein the three-dimensional model has a measured size, further comprising:
retrieving an expected object size stored in a database and associated with the optical code;
comparing the expected object size to the measured size to determine a difference therebetween;
identifying that an exception is associated with the object in response to the difference exceeding a selected threshold.

33. The method of claim 29, wherein the three-dimensional model has a measured size, further comprising:
determining that different optical codes are associated with the three-dimensional model thereby generating a multiple code exception;
retrieving multiple expected object sizes stored in a database and associated with the different optical codes;
summing the expected object sizes to generate a sum;
comparing the sum to the measured size of the three-dimensional model to determine a difference between the sum and the measured size; and
automatically resolving the multiple optical code exception in response to the difference being less than a selected threshold.

* * * * *

UNITED STATES PATENT AND TRADEMARK OFFICE
CERTIFICATE OF CORRECTION

| | |
|---|---|
| PATENT NO. | : 8,939,369 B2 |
| APPLICATION NO. | : 13/357459 |
| DATED | : January 27, 2015 |
| INVENTOR(S) | : Bryan L. Olmstead and Michael P. Svetal |

Page 1 of 1

It is certified that error appears in the above-identified patent and that said Letters Patent is hereby corrected as shown below:

Specification

<u>Column 5</u>
Line 43, change "13/357,357" to --13/357,356--.

<u>Column 16</u>
Line 58, after "system" insert --100--.

<u>Column 18</u>
Line 39, before "relatively" delete "a".

<u>Column 24</u>
Line 43, change "VII" to --VIII--.

<u>Column 28</u>
Line 3, after "that" delete "that".
Line 12, after "gap" insert --715--.
Line 49, change "VII" to --IX--.

<u>Column 29</u>
Line 11, change "(a)" to --(1)--.
Line 12, before "(2)" delete "and".
Line 13, before "(3)" insert --and--.

Signed and Sealed this
Twenty-third Day of February, 2016

Michelle K. Lee
*Director of the United States Patent and Trademark Office*